United States Patent
Gong et al.

(10) Patent No.: US 12,301,768 B2
(45) Date of Patent: May 13, 2025

(54) SYSTEM, METHOD, AND APPARATUS FOR TRANSFER TO VOIP CALL

(71) Applicant: HUAWEI TECHNOLOGIES CO., LTD., Guangdong (CN)

(72) Inventors: Weilin Gong, Shenzhen (CN); Jingjing Yao, Shanghai (CN); Yuwei Fan, Shanghai (CN); Hai Lian, Shenzhen (CN); Yinyuan Jia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 18/015,373

(22) PCT Filed: Jul. 23, 2021

(86) PCT No.: PCT/CN2021/108234
§ 371 (c)(1),
(2) Date: Jan. 10, 2023

(87) PCT Pub. No.: WO2022/022427
PCT Pub. Date: Feb. 3, 2022

(65) Prior Publication Data
US 2023/0319189 A1  Oct. 5, 2023

(30) Foreign Application Priority Data
Jul. 31, 2020 (CN) .......................... 202010762039.2

(51) Int. Cl.
*H04M 7/00* (2006.01)
(52) U.S. Cl.
CPC .................. *H04M 7/0075* (2013.01)

(58) Field of Classification Search
CPC ................................................... H04M 7/0075
(Continued)

(56) References Cited

U.S. PATENT DOCUMENTS

| 2009/0209224 A1* | 8/2009 | Borislow | H04M 1/72418 |
| | | | 455/404.1 |
| 2010/0195641 A1* | 8/2010 | Tsai | H04M 7/0075 |
| | | | 370/352 |

(Continued)

FOREIGN PATENT DOCUMENTS

| CN | 101404704 A | 4/2009 |
| CN | 102355538 A | 2/2012 |

(Continued)

*Primary Examiner* — Ahmad F. Matar
*Assistant Examiner* — Jirapon Tulop

(57) ABSTRACT

This application discloses a call method and system, and a related apparatus. When a specific condition is met (for example, a callee fails to be paged), a network device forwards, to a VoIP server, a first call request to a target number, where the first call request is a call request initiated by a calling terminal to the target number, and the target number has been subscribed to a call forwarding service. Then the VoIP server parses a forwarding message from the network device to obtain a called number, searches, based on the called number, for the called terminal associated with the called number, and initiates a VoIP call to the called terminal, so that the callee in an out-of-service state (for example, there is no signal of an operator network or the callee is in an airplane mode) can still receive the call request from the caller.

16 Claims, 35 Drawing Sheets

(58) Field of Classification Search
USPC .......................................................... 370/259
See application file for complete search history.

(56) References Cited

U.S. PATENT DOCUMENTS

| | | | | |
|---|---|---|---|---|
| 2013/0155842 | A1* | 6/2013 | Moore | ................ H04L 41/0663 |
| | | | | 370/221 |
| 2015/0257045 | A1* | 9/2015 | LaBauve | ............. H04L 65/1069 |
| | | | | 370/332 |
| 2016/0309035 | A1 | 10/2016 | Li | |

FOREIGN PATENT DOCUMENTS

| | | | |
|---|---|---|---|
| CN | 102377887 A | 3/2012 | |
| CN | 103166914 A | 6/2013 | |
| CN | 104506523 A | 4/2015 | |
| CN | 105119937 A * | 12/2015 | ......... H04L 65/1069 |
| CN | 105337956 A | 2/2016 | |
| CN | 106921627 A | 7/2017 | |
| CN | 107708078 A | 2/2018 | |
| CN | 107864460 A | 3/2018 | |
| WO | 2016168217 A1 | 10/2016 | |
| WO | 2017028567 A1 | 2/2017 | |

\* cited by examiner

SYSTEM, METHOD, AND APPARATUS FOR TRANSFER TO VOIP CALL

CROSS-REFERENCE TO RELATED APPLICATIONS

This application is a national stage of International Application No. PCT/CN2021/108234, filed on Jul. 23, 2021, which claims priority to Chinese Patent Application No. 202010762039.2, field on Jul. 31, 2020. Both of the aforementioned applications are hereby incorporated by reference in their entireties.

TECHNICAL FIELD

This application relates to the field of communication technologies, and in particular, to a call method and system, and a related apparatus.

BACKGROUND

As communication technologies continuously develop, a coverage area of an operator network is increasingly wide.

However, there may still be an area where a signal of the operator network is poor or there is no signal at all, for example, a basement, an underground passage, or a low floor and a high floor with dense buildings. When a called terminal (for example, a mobile phone) is located in the area where the signal of the operator network is poor or there is no signal, the called terminal may fail to receive a call request from a calling terminal. Consequently, the calling terminal fails to establish a call connection to the called terminal.

Further, the calling terminal may also fail to establish the call connection to the called terminal in a dual-card single-pass audio scenario. For example, the called terminal (for example, the mobile phone) supports dual cards, and the dual cards share one set of radio frequency resources, and therefore cannot implement simultaneous sending. If one card is in a call, the other card cannot receive the call request from the calling terminal because there is no radio frequency resource. As a result, the calling terminal fails to establish the call connection to the called terminal. In addition, the called terminal cannot receive the call request from the calling terminal due to another reason, for example, the called terminal is in an airplane mode.

SUMMARY

Embodiments of this application provide a call method and system, and a related apparatus, to resolve a problem that a called terminal cannot receive a call request from a calling terminal due to a signal problem of an operator network or another reason (for example, dual-card single-pass or an airplane mode).

According to a first aspect, an embodiment of this application provides a call system. The system includes a first terminal device, a network device, a VoIP server, and a second terminal device, and the second terminal device is installed with a first application serving as a VoIP client.

The first terminal device is configured to: after detecting a first operation, send a first call request to the network device in response to the first operation, where the first call request is a call request initiated to a target number. The network device is configured to: after receiving the first call request, send a first message to the VoIP server based on the first call request, where the first message carries the target number, and the target number has been subscribed to a call forwarding service. The VoIP server is configured to: after receiving the first message, send, based on the first message, a second call request to the second terminal device associated with the target number. The second terminal device is configured to receive the second call request. The second call request is a VoIP call request.

In this embodiment of this application, the network device sends, to the VoIP server based on the call request to the target number for which the call forwarding service has been subscribed, the first message carrying the target number. That is, the network device forwards the first call request to the VoIP server. The VoIP server initiates, based on the target number in the first message, a VoIP call to the second terminal device associated with the target number, so that the callee in an out-of-service state (for example, there is no signal of an operator network or the callee is in an airplane mode) can still receive the call request from the mobile origination call.

For example, the call forwarding service subscribed for the target number includes a call forwarding unreachable service, and the target number is a SIM card number of the second terminal device. The first terminal device initiates a cellular call request (namely, the first call request) to the target number. After the cellular call request is transferred to the network device, the network device pages the target number. In this case, because the second terminal device is in the airplane mode, there is no signal of the operator network, or the like, a SIM card is in an out-of-service state, and the paging fails in the network device. When the paging fails, the network device generates the first message carrying the target number, and sends the first message to the VoIP server. Then the VoIP server parses the first message to obtain the target number, finds, by using the target number, the second terminal device associated with the target number, and initiates the VoIP call to the second terminal device. In this way, the second terminal device can still receive, when the SIM card is in the out-of-service state, the call initiated by the first terminal.

The network device may indicate an operator network device, and the first message may refer to a forwarding message, for example, an invite message.

In some possible implementations of the first aspect, the call forwarding service includes a call forwarding unreachable service. In this case, the network device is specifically configured to: page the target number based on the first call request; when the paging fails, and an unreachable call forwarding number preset for the target number is a preset number, generate the first message based on the preset number and the first call request; and send the first message to the VoIP server.

In some possible implementations of the first aspect, the call forwarding service subscribed for the target number may also include at least one of a call forwarding unconditional service, a call forwarding busy service, or a call forwarding no answer service. In this case, when receiving the call request to the target number and determining that a call forwarding condition is met, the network device sends, to the VoIP server, the first message carrying the target number.

In some possible implementations of the first aspect, the VoIP server includes a first VoIP server and a second VoIP server.

The first VoIP server is configured to: receive the first message from the network device, parse the first message to obtain the target number, and send the target number to the second VoIP server. The second VoIP server is configured to:

receive the target number from the first VoIP server, search for VoIP communication information associated with the target number, and send the second call request to the second terminal device based on the VoIP communication information.

In this implementation, the first VoIP server can be a VoIP gateway. In some other implementations, the first VoIP server and the second VoIP server can also be integrated on a same server.

In some possible implementations of the first aspect, the VoIP communication information includes at least one of the following: a physical address of the second terminal device, a mobile equipment identifier (Mobile Equipment Identifier, MEID) of the second terminal device, and an international mobile equipment identity (International Mobile Equipment Identity, IMEI) of the second terminal device. The information can be used as unique device identifier information of the second terminal device. In this case, the VoIP server can initiate the VoIP call to the second terminal device based on the unique device identifier information.

Certainly, in some other implementations, the VoIP communication information may also be represented in another form. For example, the VoIP communication information may include a VoIP number.

According to a second aspect, an embodiment of this application provides a call system. The system includes a first terminal device and a second terminal device, and the second terminal device is installed with a first application serving as a VoIP client.

The first terminal device is configured to: after detecting a first operation, send a first call request to a network device in response to the first operation, where the first call request is a call request initiated to a target number.

The second terminal device is configured to receive a second call request from a VoIP server, where the second call request is a VoIP call request, that is sent by the VoIP server based on a first message from the network device, to the second terminal device associated with the target number, the first message is a message sent by the network device to the VoIP server based on the first call request, the first message carries the target number, and the target number has been subscribed to a call forwarding service.

It may be understood that the first operation can be a user operation used to trigger a call to the target number, and the operation can include one action, or can include a plurality of actions. For example, the first operation is a dialing operation of a user.

The call forwarding service subscribed for the target number includes at least one of the following: call forwarding unreachable, call forwarding unconditional, call forwarding busy, and call forwarding no answer.

In some possible implementations of the second aspect, after receiving the second call request, the second terminal device is further configured to: display a first interface in response to the second call request by using the first application, where the first interface includes at least one of the following: a number of the first terminal device, a first button, and a second button, the first button is used to answer a call, and the second button is used to reject a call. For example, the first interface is an incoming call interface.

In some possible implementations of the second aspect, the second terminal device is further configured to: after detecting a second operation on the first button, establish a call connection to the first terminal device in response to the second operation by using the first application. For example, the second terminal device displays the incoming call interface, and when receiving an answer operation (namely, the second operation) of a user, the second terminal device establishes the call connection to the first terminal device.

In some possible implementations of the second aspect, after detecting the first operation, the first terminal device is further configured to: display a second interface in response to the first operation, where the second interface includes at least one of the following: the target number and a third button, and the third button is used to hang up a call. In this case, when making a call, the first terminal device further displays a dialing interface (namely, the second interface).

In some possible implementations of the second aspect, the first terminal device is installed with a second application serving as a VoIP client, and the first terminal device is further configured to: when determining that a target condition is met, hang up a call corresponding to the first call request, and send a third call request to the VoIP server by using the second application, where the third call request is a VoIP call request to the target number.

The second terminal device is further configured to receive the third call request from the VoIP server.

In this implementation, when the target condition is met, the first terminal device can automatically hang up the current cellular call, and automatically initiate a VoIP call to the target number. This improves user experience.

In some possible implementations of the second aspect, after determining that the target condition is met, the first terminal device is further configured to: display first prompt information in the second interface, where the first prompt information is used to indicate whether to switch to a VoIP call; detect a third operation, where the third operation is used to indicate the first terminal device to switch to the VoIP call; and in response to the third operation, enter the step of hanging up a call corresponding to the first call request, and sending a third call request to the VoIP server by using the second application.

In this implementation, the second interface can be a dialing interface. After determining that the target condition is met, the first terminal device may prompt, in the dialing interface, the user whether to switch to the VoIP call. The first terminal device receives a confirm operation (namely, the third operation) of the user, considers that the user confirms switching to the VoIP call, and initiates the VoIP call to the target number.

In some possible implementations of the second aspect, after hanging up the call corresponding to the first call request, and sending the third call request to the VoIP server by using the second application, the first terminal device is further configured to: display second prompt information in the second interface, where the second prompt information is used to indicate that the first terminal device has been switched to the VoIP call. In this implementation, after switching to the VoIP call, the user can be prompted, in the dialing interface, that the user has switched to the VoIP call. This improves user experience.

In some possible implementations of the second aspect, the first terminal device is specifically configured to: determine whether a first preset condition is met; when the first preset condition is met, obtain related information associated with the target number; determine, based on the related information, whether a second preset condition is met; and when the second preset condition is met, determine that the target condition is met; or when the first preset condition is not met and/or the second preset condition is not met, determine that the target condition is not met.

In some possible implementations of the second aspect, the first terminal device is specifically configured to: when a second message returned by the network device is received, determine that the first preset condition is met, where the second message is used to indicate that the target number fails to be paged; or when time detected by a timer exceeds a preset time threshold, determine that the first preset condition is met, where the timer is configured to detect time from call initiation to ringing; or when the second message returned by the network device is not received and/or the time detected by the timer does not exceed the preset time threshold, determine that the first preset condition is not met.

The second message can include a network error code or the like returned by the network device. Based on the network error code, the first terminal device can learn that the target number fails to be paged. The timer may be a T-Alerting timer.

In some possible implementations of the second aspect, the first terminal device is specifically configured to: send a query request to the VoIP server by using the second application, where the query request carries the target number; and receive, from the VoIP server, the related information associated with the target number.

In some possible implementations of the second aspect, the related information includes first information, second information, third information, and fourth information, the first information is used to describe whether the target number is stored on the VoIP server, the second information is used to describe whether the first application is in an online state, the third information is used to describe a signal status of an operator network of the second terminal, and the fourth information is used to describe whether the target number has been subscribed to the call forwarding service.

The first terminal device is specifically configured to: when the target number is stored on the VoIP server, the first application is in the online state, a signal of the operator network of the second terminal is in an out-of-service state, and the target number has not been subscribed to the call forwarding service, determine that the second preset condition is met.

In some possible implementations of the second aspect, after detecting the first operation, the first terminal device is further configured to: display a third interface, where the third interface includes third prompt information used to prompt a user to select a call manner, a cellular call option, and a VoIP call option; and when detecting an operation on the cellular call option, enter the step of sending a first call request to a network device in response to the first operation; or when detecting an operation on the VoIP call option, send a fourth call request to the VoIP server by using the second application, where the fourth call request is used to indicate the VoIP server to initiate a VoIP call to the second terminal device associated with the target number, and the fourth call request is a VoIP call request to the target number.

In this implementation, the first terminal device can prompt, before the user triggers the cellular call to the target number, the user to select the call manner. In addition, further, the first terminal device can further first perform a call initiation decision procedure, to determine whether the cellular call can be initiated to the target number. In addition, the first terminal device can further query information such as whether the second terminal device associated with the target number supports the VoIP call, to determine whether the VoIP call can be initiated to the target number. Finally, a call manner selection prompt is given based on these determining results, so as to prompt the user to select the call manner.

In some possible implementations of the second aspect, the second terminal device meets at least one of the following: the target number is bound to an account of the first application, the target number is a SIM card number of the second terminal device, and a SIM card of the second terminal device is in an out-of-service state.

The second terminal device is associated with the target number. Specifically, the target number can be the SIM card number of the second terminal device; or the target number can be bound to the account of the first application, and the target number may not be the SIM card number of the second terminal device in this case.

A reason why the SIM card of the second terminal device is in the out-of-service state may be as follows: There is no signal of an operator network, the signal of the operator network is poor, the second terminal device is in an airplane mode or in a dual-card single-pass scenario, or the like.

According to a third aspect, an embodiment of this application provides a call method, applied to a VoIP server. The method may include:

receiving a first message from a network device, where the first message carries a target number, the first message is a message sent by the network device to the VoIP server based on a first call request after the first call request is received from a first terminal device, the target number has been subscribed to a call forwarding service, and the first call request is a call request initiated by the first terminal device to the target number; and sending, based on the first message, a second call request to a second terminal device associated with the target number.

In some possible implementations of the third aspect, a process of sending, based on the first message, a second call request to a second terminal device associated with the target number may include: parsing the first message to obtain the target number; searching, based on the target number, for VoIP communication information associated with the target number; and sending the second call request to the second terminal device based on the VoIP communication information.

In some possible implementations of the third aspect, the VoIP communication information includes at least one of the following: a physical address of the second terminal device, a mobile equipment identifier of the second terminal device, and an international mobile equipment identity of the second terminal device.

In some possible implementations of the third aspect, the method further includes: receiving a first registration request from the first terminal device, where the first registration request includes a number of the first terminal device, an account of a second application, and device identifier information of the first terminal device, and the second application is an application serving as a VoIP client on the second terminal device; and associating the account of the second application and the device identifier information of the first terminal device with the number of the first terminal device; and/or receiving a second registration request from the second terminal device, where the second registration request includes the target number, an account of a first application, and device identifier information of the second terminal device, and the first application is an application serving as a VoIP client on the second terminal device; and associating the account of the first application and the device identifier information of the second terminal device with the target number.

The device identifier information can be information such as a physical address, an IMEI, and an MEID of the device.

According to a fourth aspect, an embodiment of this application provides a call method, applied to a first terminal device. The first terminal device is installed with a second application serving as a VoIP client, and the method includes:

detecting a first operation; sending a first call request to a network device in response to the first operation, where the first call request is a call request initiated to a target number; and when determining that a target condition is met, hanging up a call corresponding to the first call request (for example, hanging up a cellular call to the target number), and sending a third call request to a VoIP server by using the second application, where the third call request is a VoIP call request to the target number, and the third call request is used to indicate the VoIP server to initiate a VoIP call to a second terminal device associated with the target number.

In this embodiment of this application, when determining that the target condition is met, for example, when the callee fails to be paged, the first terminal device automatically hangs up the current cellular call, and automatically initiates the VoIP call to the target number when determining that the second terminal device associated with the target number supports the VoIP call, so that the callee can still receive the call request from the first terminal device even if the callee is in an airplane mode, there is no signal of an operator network, or the like. In addition, a call manner is automatically switched based on the target condition. This improves user experience.

In some possible implementations of the fourth aspect, after the detecting a first operation, the method further includes: displaying a second interface in response to the first operation, where the second interface includes the target number and a third button, and the third button is used to hang up a call.

In some possible implementations of the fourth aspect, after the determining that a target condition is met, the method further includes: displaying first prompt information in the second interface, where the first prompt information is used to indicate whether to switch to a VoIP call; detecting a third operation, where the third operation is used to indicate the first terminal device to switch to the VoIP call; and in response to the third operation, entering the step of hanging up a call corresponding to the first call request, and sending a third VoIP call request to the target number to the VoIP server by using the second application.

In some possible implementations of the fourth aspect, after the hanging up a call corresponding to the first call request, and sending a third call request to the target number to the VoIP server by using the second application, the method further includes: displaying second prompt information in the second interface, where the second prompt information is used to indicate that the first terminal device has been switched to the VoIP call.

In some possible implementations of the fourth aspect, a process of determining whether the target condition is met may include: determining whether a first preset condition is met; when the first preset condition is met, obtaining related information associated with the target number; determining, based on the related information, whether a second preset condition is met; and when the second preset condition is met, determining that the target condition is met; or when the first preset condition is not met and/or the second preset condition is not met, determining that the target condition is not met.

In some possible implementations of the fourth aspect, a process of determining whether a first preset condition is met may include:

when a second message returned by the network device is received, determining that the first preset condition is met, where the second message is used to indicate that the target number fails to be paged; or when time detected by a timer exceeds a preset time threshold, determining that the first preset condition is met, where the timer is configured to detect time from call initiation to ringing; or when the second message returned by the network device is not received and/or the time detected by the timer does not exceed the preset time threshold, determining that the first preset condition is not met.

In some possible implementations of the fourth aspect, a process of obtaining related information associated with the target number may include: sending a query request to the VoIP server by using the second application, where the query request carries the target number; and receiving, from the VoIP server, the related information associated with the target number.

In some possible implementations of the fourth aspect, the related information may include first information, second information, third information, and fourth information, the first information is used to describe whether the target number is stored on the VoIP server, the second information is used to describe whether the first application is in an online state, the third information is used to describe a signal status of an operator network of the second terminal, and the fourth information is used to describe whether the target number has been subscribed to the call forwarding service.

In this case, a process of determining, based on the related information, whether a second preset condition is met may include: when the target number is stored on the VoIP server, the first application is in the online state, a signal of the operator network of the second terminal is in an out-of-service state, and the target number has not been subscribed to the call forwarding service, determining that the second preset condition is met, where the second terminal device is installed with a first application serving as a VoIP client.

In some possible implementations of the fourth aspect, after the detecting a first operation, the method further includes: displaying a third interface, where the third interface includes third prompt information used to prompt a user to select a call manner, a cellular call option, and a VoIP call option; and when detecting an operation on the cellular call option, entering the step of sending a first call request to a network device in response to the first operation; or when detecting an operation on the VoIP call option, sending a fourth call request to the VoIP server by using the second application, where the fourth call request is a VoIP call request to the target number, and the fourth call request is used to indicate the VoIP server to initiate a VoIP call to the second terminal device associated with the target number.

According to a fifth aspect, an embodiment of this application provides a call system, including a first terminal device, a VoIP server, and a second terminal device. The second terminal device is installed with a first application serving as a VoIP client, and the first terminal device is installed with a second application serving as a VoIP client.

The first terminal device is configured to: after detecting a first operation, send a first call request to a network device in response to the first operation, where the first call request is a call request initiated to a target number; and when determining that a target condition is met, hang up a call corresponding to the first call request, and send a third call request to the VoIP server by using the second application, where the third call request is a VoIP call request to the target number. The VoIP server is configured to: receive the third call request, and send the third call request to the second terminal device associated with the target number. The second terminal device is configured to receive the third call request by using the first application.

In some possible implementations of the fifth aspect, the first terminal device is further configured to: display a second interface in response to the first operation, where the second interface includes the target number and a third button, and the third button is used to hang up a call.

In some possible implementations of the fifth aspect, the first terminal device is further configured to: when determining that a target condition is met, display first prompt information in the second interface, where the first prompt information is used to indicate whether to switch to a VoIP call; detect a third operation, where the third operation is used to indicate the first terminal device to switch to the VoIP call; and in response to the third operation, enter the step of hanging up a call corresponding to the first call request, and sending a third VoIP call request to the target number to the VoIP server by using the second application.

In some possible implementations of the fifth aspect, the first terminal device is further configured to: display second prompt information in the second interface, where the second prompt information is used to indicate that the first terminal device has been switched to the VoIP call.

In some possible implementations of the fifth aspect, the first terminal device is specifically configured to: determine whether a first preset condition is met; when the first preset condition is met, obtain related information associated with the target number; determine, based on the related information, whether a second preset condition is met; and when the second preset condition is met, determine that the target condition is met; or when the first preset condition is not met and/or the second preset condition is not met, determine that the target condition is not met.

In some possible implementations of the fifth aspect, the first terminal device is specifically configured to: when a second message returned by the network device is received, determine that the first preset condition is met, where the second message is used to indicate that the target number fails to be paged; or when time detected by a timer exceeds a preset time threshold, determine that the first preset condition is met, where the timer is configured to detect time from call initiation to ringing; or when the second message returned by the network device is not received and/or the time detected by the timer does not exceed the preset time threshold, determine that the first preset condition is not met.

In some possible implementations of the fifth aspect, the first terminal device is specifically configured to: send a query request to the VoIP server by using the second application, where the query request carries the target number; and receive, from the VoIP server by using the second application, the related information corresponding to the target number.

In some possible implementations of the fifth aspect, the related information includes first information, second information, third information, and fourth information, the first information is used to describe whether the target number is stored on the VoIP server, the second information is used to describe whether the first application is in an online state, the third information is used to describe a signal status of an operator network of the second terminal, and the fourth information is used to describe whether the target number has been subscribed to the call forwarding service.

In this case, the first terminal device is specifically configured to: when the target number is stored on the VoIP server, the first application is in the online state, a signal of the operator network of the second terminal is in an out-of-service state, and the target number has not been subscribed to the call forwarding service, determine that the second preset condition is met.

In some possible implementations of the fifth aspect, the second terminal device is further configured to: display a first interface in response to the third call request by using the first application, where the first interface includes at least one of the following: a number of the first terminal device, a first button, and a second button, the first button is used to answer a call, and the second button is used to reject a call.

In some possible implementations of the fifth aspect, the second terminal device is further configured to: detect a second operation on the first button; and establish a VoIP call connection to the first terminal device in response to the second operation by using the first application.

In some possible implementations of the fifth aspect, the VoIP server is further configured to: receive a first registration request from the first terminal device, where the first registration request includes a number of the first terminal device, an account of the second application, and device identifier information of the first terminal device; associate the account of the second application and the device identifier information of the first terminal device with the number of the first terminal device; and/or receive a second registration request from the second terminal device, where the second registration request includes the target number, an account of the first application, and device identifier information of the second terminal device, and associate the account of the first application and the device identifier information of the second terminal device with the target number.

In some possible implementations of the fifth aspect, the first terminal device is further configured to: display a third interface, where the third interface includes third prompt information used to prompt a user to select a call manner, a cellular call option, and a VoIP call option; and when detecting an operation on the cellular call option, enter the step of sending a first call request to a network device in response to the first operation; or when detecting an operation on the VoIP call option, send a fourth call request to the VoIP server by using the second application, where the fourth call request is a VoIP call request to the target number, and the fourth call request is used to indicate the VoIP server to initiate a VoIP call to the second terminal device associated with the target number.

According to a sixth aspect, an embodiment of this application provides a call apparatus, applied to a VoIP server. The apparatus may include:
 a receiving module, configured to receive a first message from a network device, where the first message carries a target number, the first message is a message sent by the network device to the VoIP server based on a first call request after the first call request is received from a first terminal device, the target number has been subscribed to a call forwarding service, and the first call request is a call request initiated by the first terminal device to the target number; and
 a VoIP call module, configured to send, based on the first message, a second call request to a second terminal device associated with the target number.

In some possible implementations of the sixth aspect, the VoIP call module is specifically configured to: parse the first message to obtain the target number; search, based on the target number, for VoIP communication information associated with the target number; and send the second call request to the second terminal device based on the VoIP communication information.

In some possible implementations of the sixth aspect, the VoIP communication information includes at least one of the following: a physical address of the second terminal device, a mobile equipment identifier of the second terminal device, and an international mobile equipment identity of the second terminal device.

In some possible implementations of the sixth aspect, the apparatus further includes a registration module, configured to: receive a first registration request from the first terminal device, where the first registration request includes a number of the first terminal device, an account of a second application, and device identifier information of the first terminal device, and the second application is an application serving as a VoIP client on the second terminal device; and
- associate the account of the second application and the device identifier information of the first terminal device with the number of the first terminal device; and/or
- receive a second registration request from the second terminal device, where the second registration request includes the target number, an account of a first application, and device identifier information of the second terminal device, and the first application is an application serving as a VoIP client on the second terminal device; and associate the account of the first application and the device identifier information of the second terminal device with the target number.

The device identifier information can be information such as a physical address, an IMEI, and an MEID of the device.

The call apparatus has a function of implementing the call method in the third aspect. The function may be implemented by hardware, or may be implemented by hardware executing corresponding software. The hardware or software includes one or more modules corresponding to the foregoing function, and the module may be software and/or hardware.

According to a seventh aspect, an embodiment of this application provides a call apparatus, applied to a first terminal device. The first terminal device is installed with a second application serving as a VoIP client, and the apparatus includes:
- a first detection module, configured to detect a first operation;
- a first sending module, configured to send a first call request to a network device in response to the first operation, where the first call request is a call request initiated to a target number; and
- a switching module, configured to: when it is determined that a target condition is met, hang up a call corresponding to the first call request (for example, hang up a cellular call to the target number), and send a third call request to a VoIP server by using the second application, where the third call request is a VoIP call request to the target number, and the third call request is used to indicate the VoIP server to initiate a VoIP call to a second terminal device associated with the target number.

In some possible implementations of the seventh aspect, the apparatus further includes a first display module, configured to display a second interface in response to the first operation, where the second interface includes the target number and a third button, and the third button is used to hang up a call.

In some possible implementations of the seventh aspect, the apparatus may further include:
- a first prompt module, configured to: display first prompt information in the second interface, where the first prompt information is used to indicate whether to switch to a VoIP call; and
- a second detection module, configured to: detect a third operation, where the third operation is used to indicate the first terminal device to switch to the VoIP call; and in response to the third operation, enter the step of hanging up a call corresponding to the first call request, and sending a third VoIP call request to the target number to the VoIP server by using the second application.

In some possible implementations of the seventh aspect, the apparatus further includes a second prompt module, configured to display second prompt information in the second interface, where the second prompt information is used to indicate that the first terminal device has been switched to the VoIP call.

In some possible implementations of the seventh aspect, the switching module is specifically configured to: determine whether a first preset condition is met; when the first preset condition is met, obtain related information associated with the target number; determine, based on the related information, whether a second preset condition is met; and when the second preset condition is met, determine that the target condition is met; or when the first preset condition is not met and/or the second preset condition is not met, determine that the target condition is not met.

In some possible implementations of the seventh aspect, the switching module is specifically configured to: when a second message returned by the network device is received, determine that the first preset condition is met, where the second message is used to indicate that the target number fails to be paged; or when time detected by a timer exceeds a preset time threshold, determine that the first preset condition is met, where the timer is configured to detect time from call initiation to ringing; or when the second message returned by the network device is not received and/or the time detected by the timer does not exceed the preset time threshold, determine that the first preset condition is not met.

In some possible implementations of the seventh aspect, the switching module is specifically configured to: send a query request to the VoIP server by using the second application, where the query request carries the target number; and receive, from the VoIP server, the related information associated with the target number.

In some possible implementations of the seventh aspect, the related information may include first information, second information, third information, and fourth information, the first information is used to describe whether the target number is stored on the VoIP server, the second information is used to describe whether the first application is in an online state, the third information is used to describe a signal status of an operator network of the second terminal, and the fourth information is used to describe whether the target number has been subscribed to the call forwarding service.

In this case, the switching module is specifically configured to: when the target number is stored on the VoIP server, the first application is in the online state, a signal of the operator network of the second terminal is in an out-of-service state, and the target number has not been subscribed to the call forwarding service, determine that the second preset condition is met, where the second terminal device is installed with a first application serving as a VoIP client.

In some possible implementations of the seventh aspect, the apparatus further includes a second display module, configured to: display a third interface, where the third interface includes third prompt information used to prompt a user to select a call manner, a cellular call option, and a VoIP call option; and when detecting an operation on the cellular call option, enter the step of sending a first call request to a network device in response to the first operation; or when detecting an operation on the VoIP call option, send a fourth call request to the VoIP server by using the second application, where the fourth call request is a VoIP call request to the target number, and the fourth call request is used to indicate the VoIP server to initiate a VoIP call to the second terminal device associated with the target number.

The call apparatus has a function of implementing the call method in the fourth aspect. The function may be implemented by hardware, or may be implemented by hardware executing corresponding software. The hardware or software includes one or more modules corresponding to the foregoing function, and the module may be software and/or hardware.

According to an eighth aspect, an embodiment of this application provides a terminal device, including a memory, a processor, and a computer program that is stored in the memory and that can be run on the processor. When executing the computer program, the processor implements the method according to any one of the third aspect.

According to a ninth aspect, an embodiment of this application provides a terminal device, including a memory, a processor, and a computer program that is stored in the memory and that can be run on the processor. When executing the computer program, the processor implements the method according to any one of the fourth aspect.

According to a tenth aspect, an embodiment of this application provides a computer-readable storage medium. The computer-readable storage medium stores a computer program. When the computer program is executed by a processor, the method according to any one of the third aspect or the fourth aspect is implemented.

According to an eleventh aspect, an embodiment of this application provides a chip system. The chip system includes a processor, the processor is coupled to a memory, and the processor executes a computer program stored in the memory, to implement the method according to any one of the third aspect or the fourth aspect. The chip system may be a single chip or a chip module including a plurality of chips.

According to a twelfth aspect, an embodiment of this application provides a computer program product. When the computer program product runs on an electronic device, the electronic device is enabled to perform the method according to any one of the third aspect or the fourth aspect.

It may be understood that for beneficial effects of the second aspect to the twelfth aspect, refer to related descriptions in the first aspect, and for beneficial effects of the various aspects, refer to each other. Details are not described herein again.

BRIEF DESCRIPTION OF DRAWINGS

FIG. 4A-1 to FIG. 4A-3 are a schematic diagram of a call forwarding setting interface according to an embodiment of this application;

FIG. 4B-1 to FIG. 4B-3 are a schematic diagram of setting a number on MeeTime call according to an embodiment of this application;

FIG. 8B-1 to FIG. 8D-5 each are a schematic diagram of a call interface according to an embodiment of this application;

DESCRIPTION OF EMBODIMENTS

Figure 1:
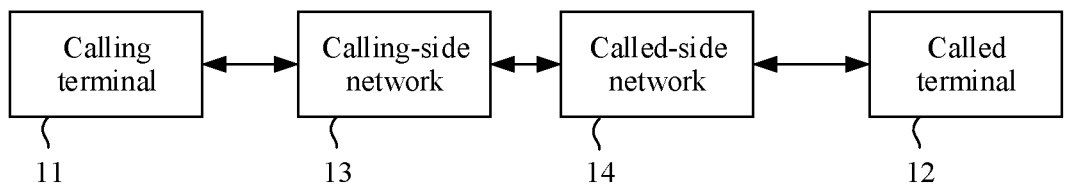
FIG. 1 is a schematic block diagram of an architecture of a conventional call network.

Before embodiments of this application are described, an architecture of a conventional call network is first described. As shown in FIG. 1, the architecture of the conventional call network includes a calling terminal 11, a calling-side network 13, a called-side network 14, and a called terminal 12.

The calling-side network 13 refers to an operator network on a calling terminal side or an operator network in an area in which the calling terminal is currently located. The called-side network 14 refers to an operator network on a called terminal side or an operator network in an area in which the called terminal is currently located.

Generally, a call request initiated by the calling terminal 11 is first transferred to the calling-side network 13, then transferred by the calling-side network 13 to the called-side network 14, and finally transferred by the called-side network 14 to the called terminal 12.

However, if a signal of an operator network in an area in which the called terminal 12 is located is poor (for example, lower than preset signal strength), or there is no signal of the operator network at all, or the called terminal has no available radio frequency resource because the called terminal 12 is in a dual-card single-pass scenario, or the like, the called-side network 14 cannot send the call request to the called terminal 12. As a result, a call fails.

There are several possible solutions to the foregoing problem.

1. Secretary Service

The service may notify, in an SMS text message, a user of the called terminal of an incoming call when a called terminal cannot receive a call request from a calling terminal.

However, this manner cannot implement interworking between the calling terminal and the called terminal. In addition, the called terminal still needs to wait until there is a signal of an operator network to receive the notification in the SMS text message.

2. VoWi-Fi (Voice Over Wi-Fi)

VoWi-Fi enables a call terminal to access an ePDG (Evolved Packet Data Gateway) network element in an operator network through Wi-Fi, so as to access to the operator network. The ePDG network element is a mandatory network element for untrusted Wi-Fi network access.

In this case, a called terminal accesses the operator network through VoWi-Fi, so that when a signal of the operator network is poor, the called terminal can still receive a call request from a calling terminal through VoWi-Fi. However, at present, VoWi-Fi is not deployed in many places.

3. OTT (Over the Top) Call

An OTT service includes instant messaging and a voice over IP (Voice over Internet Protocol, VoIP) service.

In this case, based on a third-party instant messaging tool, a calling terminal may actively initiate the OTT call to a called terminal through an internet. This can implement interworking between the calling terminal and the called terminal. However, the calling terminal and the called terminal need to log in to OTT software at the same time and add friends to each other. The OTT call cannot be initiated if the calling terminal and the called terminal do not add friends to each other. By way of example and not limitation, when the third-party instant messaging tool is WeChat, and a user A cannot make a cellular call to a user B, the user A can manually initiate a WeChat call or a WeChat video to the user B.

It can be learned that the foregoing solutions each have some problems, for example, interworking between the mobile origination call and the callee is not implemented, and the user needs to manually initiate the OTT call when paging fails.

For the problems in the foregoing solutions, embodiments of this application provide several call solutions, so that a call request from a calling terminal can still be transferred to a called terminal when a signal of an operator network on a called terminal side is poor, there is no signal of the operator network at all on the called terminal side, there is no available radio frequency resource for a called number because the called terminal is in a dual-card single-pass scenario, when the called terminal is in an airplane mode, or the like, thereby implementing a call connection between the calling terminal and the called terminal. The following describes in detail the several call solutions provided in embodiments of this application.

First Call Solution

Figure 2:
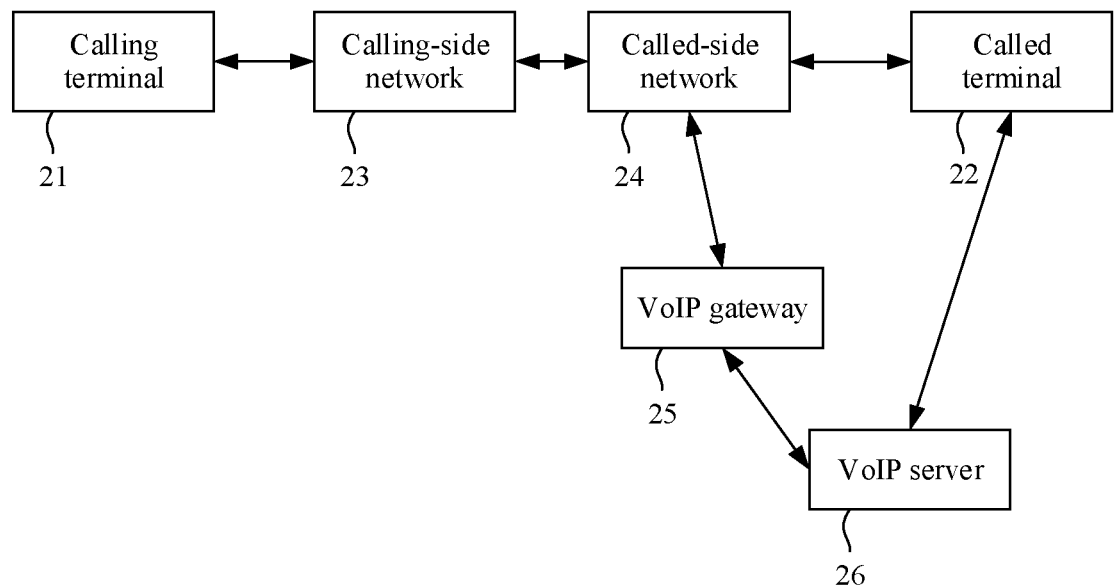
FIG. 2 is a schematic diagram of an architecture of a call network according to an embodiment of this application.

FIG. 2 is a diagram of an architecture of a call network in a call solution (hereinafter referred to as "First call solution") according to an embodiment of this application. The architecture of the call network may include a calling terminal 21, a called terminal 22, a calling-side network 23 (namely, an operator network on a calling terminal side), a called-side network 24 (namely, an operator network on a called terminal side), a VoIP gateway 25, and a VoIP server 26.

Generally, a call request initiated by the calling terminal 21 is transferred to the called terminal 22 through the calling-side network 23 and the called-side network 24 in sequence. After receiving the call request, the called terminal 22 may establish a call connection to the calling terminal.

In some special scenarios, for example, when a signal of the called-side network 24 is poor or there is no signal, or when the called terminal 22 is in a dual-card single-pass scenario, or in another scenario, for example, the called terminal is in an airplane mode, or no SIM card is installed on the called terminal, the called-side network 24 cannot transfer the call request from the calling terminal 21 to the called terminal 22. In this embodiment of this application, to resolve the technical problem, the called-side network 24 forwards the call request to the VoIP gateway 25, and then the VoIP gateway 25 and the VoIP server 26 transfer the call request to the called terminal 22, so that the called terminal 22 can still receive the call request from the calling terminal 21 even if the signal of the called-side network 24 is poor or there is no signal.

Specifically, when paging fails in the called-side network 24, a forwarding message may be generated based on a pre-agreed forwarding number, and the forwarding message is routed to the VoIP gateway 25. After parsing the forwarding message to obtain a called number, the VoIP gateway 25 sends the called number to the VoIP server 26. After finding the called terminal 22 based on the called number, the VoIP server 26 initiates a VoIP call to the called terminal 22.

It can be seen that, compared with the architecture of the conventional call network (in FIG. 1), the architecture of the call network (in FIG. 2) provided in this embodiment of this application adds the VoIP gateway 25 and the VoIP server 26. The VoIP gateway 25 is connected to the called-side network 24, and the VoIP server 26 is connected to the VoIP gateway 25 and the called terminal 22 respectively.

It should be noted that, in the architecture of the conventional call network, the operator network and a VoIP network are independent of each other, that is, there is no communication link connection between the operator network and the VoIP network. Therefore, when the paging fails in the called-side network, the call request cannot be sent to the VoIP server. As a result, the call request cannot be relayed to the called terminal by using the VoIP server.

However, in this embodiment of this application, the VoIP gateway and the VoIP server are deployed, the VoIP gateway is connected to the called-side network, and the VoIP server is connected to the VoIP gateway and the called terminal, so as to connect the operator network to a VoIP network. Therefore, the operator network and the VoIP network are no longer independent of each other. Based on this, when the paging fails in the called-side network, the called-side network may forward the call request to the VoIP gateway by using a call forwarding service, the VoIP gateway sends the called number to the VoIP server, and the VoIP server initiates the VoIP call to the called terminal. Therefore, the call request is relayed to the called terminal when the paging fails.

It should be noted that in the architecture of the call network provided in this embodiment of this application, the called terminal may enable a call forwarding unreachable service in advance. In this way, when the paging fails, the called-side network can forward the call request to the VoIP gateway. In addition, the called terminal may further register with the VoIP server in advance. In this way, when the VoIP server receives the called number sent by the VoIP gateway, the VoIP server can find a corresponding called terminal based on the called number, and initiate the VoIP call to the corresponding called terminal.

It should be further noted that the VoIP gateway and the VoIP server in FIG. 1 may be presented as two servers respectively, or may be integrated on one server, that is, the VoIP gateway and the VoIP server may be integrated on one server, and the server implements functions of the VoIP gateway and the VoIP server.

In contrast, when the VoIP gateway is set independently, and the VoIP gateway and the VoIP server are not integrated on a same server, works such as adaptation, maintenance, and change are more flexible. It can be learned from the foregoing that, in First call solution in this embodiment of this application, the VoIP gateway and the VoIP server on a called side are set up, and the called-side network is connected to the VoIP gateway, so that when the paging fails, the called-side network can forward the call request to the VoIP gateway, and the VoIP gateway and the VoIP server relay the call request to the called terminal, thereby implementing interworking between the called terminal and the calling terminal.

In the call solution, the calling terminal is insensible, that is, a call procedure on the calling terminal side is the same as a call procedure in a normal case. A calling user cannot perceive a case in which the call to the called terminal is unreachable, and does not need to manually hang up the cellular call and manually initiate another call. In addition, the calling terminal and the called terminal do not need to add friends to each other, and only need to know the called number. The normal case indicates that the operator network on the called terminal side is good and can receive the call request from the operator network.

When the signal of the called-side network is poor or there is no signal of the operator network, the called terminal can still receive the call request and establish the call connection to the calling terminal, thereby implementing interworking.

Figure 3A:
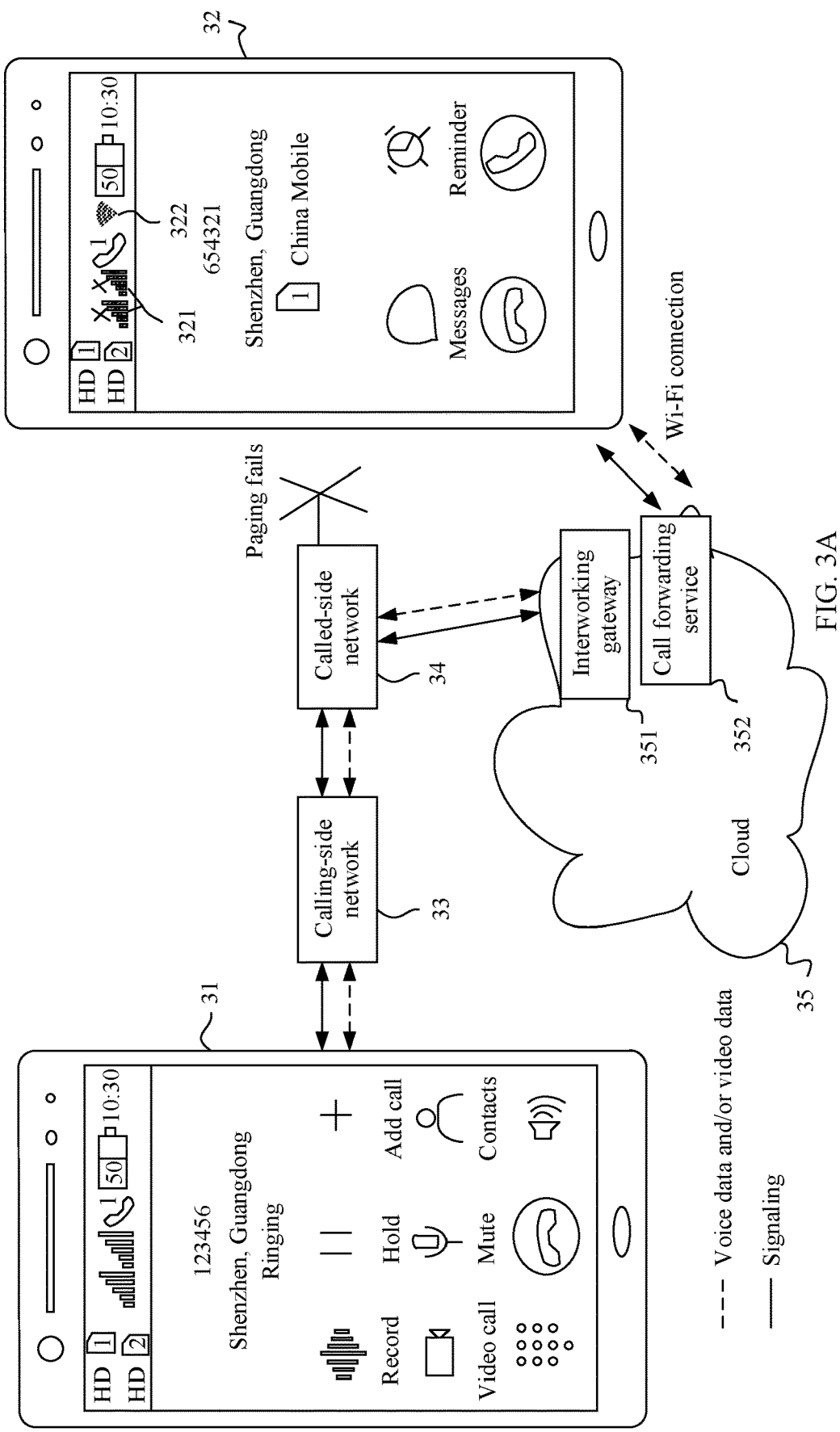
FIG. 3A is a schematic diagram of a call scenario according to an embodiment of this application.

Based on First call solution, the following describes a call scenario in the call solution by using an example with reference to FIG. 3A.

As shown in FIG. 3A, the scenario includes a calling terminal 31, a called terminal 32, a calling-side network 33, a called-side network 34, and a cloud 35. The cloud 35 includes an interworking gateway 351 and a call forwarding service 352. In this scenario, the interworking gateway 351 may be equivalent to the VoIP gateway in FIG. 2, and the call forwarding service 352 may be integrated on a VoIP server as a hardware apparatus and/or a software module.

The calling terminal 31 and the called terminal 32 each have two subscriber identity (Subscriber Identity Module, SIM) cards, and the two SIM cards each support a voice over long-term evolution (Voice over Long-Term Evolution, VOLTE) high definition call. A number of a SIM card 1 of the calling terminal 31 is 654321, and a number of a SIM card 1 of the called terminal is 123456. Signal strength of the SIM card 1 and a SIM card 2 of the calling terminal 31 is full, that is, signals of an operator network on a calling terminal 21 side are good. However, the SIM card 1 and a SIM card 2 of the called terminal 32 each are in an out-of-service state, that is, signals of an operator network on a called terminal side are poor. However, a Wi-Fi signal on the called terminal side is good, and the called terminal 31 is already connected to a Wi-Fi network. A signal status of the operator network of the called terminal 32 is specifically shown in 321 in FIG. 3A, and the Wi-Fi network signal is specifically shown in 322 in FIG. 3A.

In FIG. 3A, the calling terminal 31 displays a dialing interface, and the called terminal 32 displays a waiting-to-answer interface. It can be learned from FIG. 3A that, when the called terminal 32 has no signal of the operator network and is connected to the Wi-Fi network, even if paging fails in the called-side network 34, the called terminal 32 can still receive a call initiated by the calling terminal 31.

In other words, in FIG. 3A, the SIM card signal display area 321 in the called terminal 32 indicates that neither the SIM card 1 nor the SIM card 2 has the signal of the operator network. To be specific, FIG. 3A shows a scenario in which coverage of the called-side network is insufficient, the called-side network 34 generates a forwarding message based on a call request from the calling terminal 31 and a forwarding number, and routes the forwarding message to the interworking gateway 351; and then the interworking gateway 351 and the call forwarding service 352 send the call request from the calling terminal to the called terminal 32 based on the forwarding message.

It should be noted that the calling-side network 33 and the called-side network 34 each are an operator network. The calling-side network 33 may be an IP multimedia subsystem (IP Multimedia Subsystem, IMS) network, a public switched telephone network (Public Switched Telephone Network, PSTN), or a switched circuit (Circuit Switched, CS) network. Certainly, the calling-side network 33 may also include the IMS network, the PSTN, and the CS network.

Correspondingly, the calling terminal 31 may be a mobile phone, and in this case, the calling terminal 31 may talk with the called terminal in the IMS network, or talk with the called terminal in the CS network. Alternatively, the calling terminal 31 may be a fixed-line phone, and in this case, the calling terminal 31 may talk with the called terminal in the PSTN. FIG. 3A shows only an example in which the calling terminal 31 is a mobile phone. Certainly, in addition to the mobile phone, the calling terminal 31 may be another type of mobile terminal that supports an operator call, for example, a wearable device or a tablet computer that can make a call.

The called-side network 34 is usually an IMS network, and the called terminal 32 is usually a mobile phone or another terminal device having a call function other than the mobile phone. The called terminal 32 may be in communication connection to the VoIP server through Wi-Fi. In addition, in a dual-SIM card scenario, when one SIM card has a signal and the other SIM card has no signal, the called terminal may also in communication connection to the VoIP server by using the SIM card having the signal. In this case, the two SIM cards belong to different operators. For example, operators of the SIM card 1 and the SIM card 2 of the called terminal 32 are respectively China Mobile and China Unicom. In a case, the SIM card 1 has the signal, and the SIM card 2 has no signal. Due to a signal problem of the operator network of the SIM card 2, the call request for the SIM card 2 cannot be delivered to the called terminal 32. In this case, the called terminal 32 may be in communication connection to the VoIP server by using cellular data of the SIM card 1, that is, the called terminal 32 may receive, by using the cellular data of the SIM card 1, the VoIP call initiated by the VoIP server. In this way, the call request can still be received by using the cellular data of the SIM card 1 even if the SIM card 2 has no signal.

It should be noted that, in a dual-card single-pass scenario, based on the network architecture in FIG. 2, the called terminal 32 can still receive the call request from the calling terminal. For example, the SIM card 2 of the called terminal 32 is in a call. As a result, the SIM card 1 has no available radio frequency resource, and consequently there is no signal of the operator network. In this case, when the calling terminal 31 initiates the call to the SIM card 1 of the called terminal, based on the network architecture in FIG. 2, the called terminal 32 may receive, by using the Wi-Fi network, the VoIP call initiated by the VoIP server. In this case, the SIM card 1 and the SIM card 2 may belong to a same operator, or may not belong to a same operator.

It should be noted that the called terminal may have dual SIM cards, or may have a single SIM card. When the called terminal has only one SIM card, the called terminal may be in communication connection to the VoIP server in a communication manner such as the Wi-Fi network.

Figure 3B:
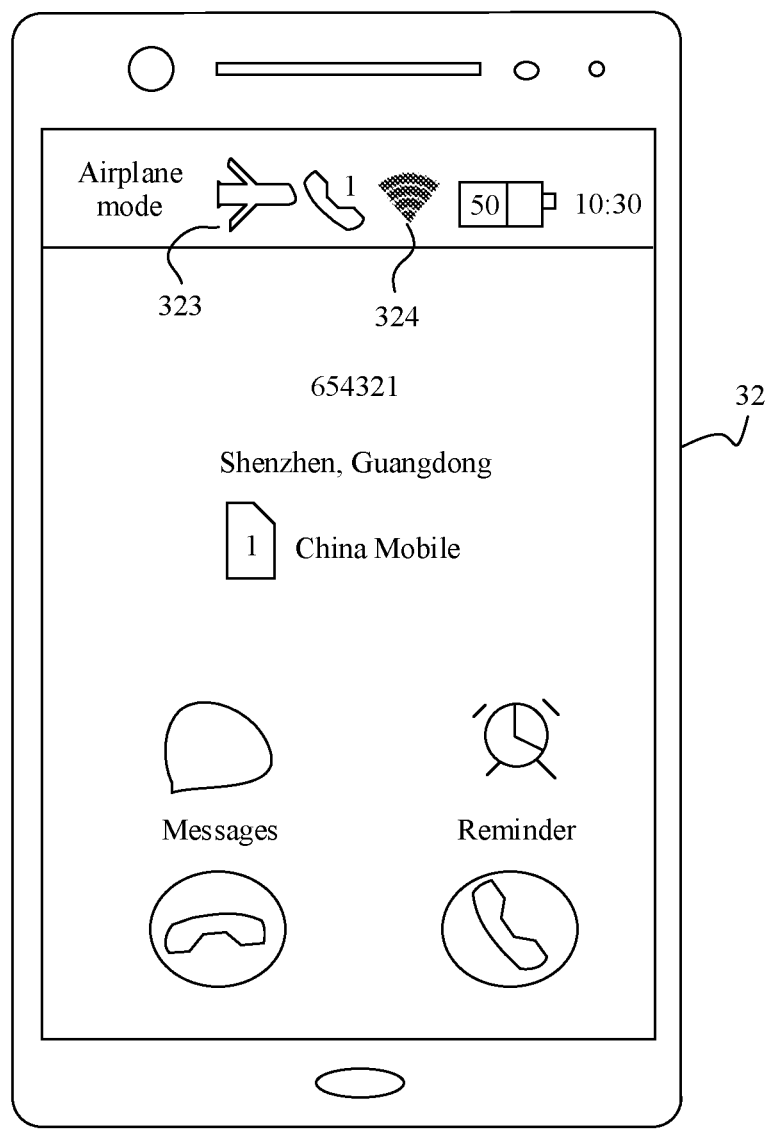
FIG. 3B is a schematic diagram of an incoming call answer interface in an airplane mode according to an embodiment of this application.

In addition, in some other embodiments, the called terminal 32 may be in an airplane mode, or the called terminal is not installed with a SIM card. In this case, the called terminal 32 can still receive the call from the calling terminal 31. FIG. 3B is a schematic diagram of an interface for answering an incoming call from the calling terminal 31 when the called terminal 32 is in the airplane mode. In this case, an airplane mode icon 323 and a Wi-Fi icon 324 are displayed in a status bar of the called terminal 32, to indicate that the called terminal 32 is currently in the airplane mode, and is connected to the Wi-Fi network. In this case, when finding that the paging fails, the called-side network 34 may forward the call request to the interworking gateway 351, and the interworking gateway 351 and the call forwarding service 352 relay or transfer the call request from the calling terminal 31 to the called terminal 32, so that the called terminal 32 in the airplane mode can still receive the incoming call from the calling terminal 31.

For example, when a user of the called terminal 32 is on an airplane, the called terminal 32 needs to be adjusted to be in the airplane mode due to a flight condition limitation, but the user needs to wait for a very important call. In this case, to avoid missing the call, the user may set, based on a process shown in FIG. 4A-1 to FIG. 4A-3, call forwarding on user not reachable to MeeTime call, and operates the called terminal 32 to access a Wi-Fi network on the airplane. In this way, the user can receive, in a flight process, the call initiated by the calling terminal 32, and does not miss the call.

In addition, in some still other embodiments, the called terminal 32 may also be a mobile phone on which no SIM card is installed. In this case, the called terminal 32 only needs to be installed with a VoIP client (for example, MeeTime call), bind the VoIP client to a mobile phone number, and enabled call forwarding unreachable to the VoIP client. In this way, the called terminal 32 can still receive a call to the bound mobile phone number even if no SIM card is installed on the called terminal.

The VoIP server may be a server of an application that implements a VoIP call on the called terminal 32. The VoIP server locally stores information such as a called number, device information of the called terminal corresponding to the called number, and application account information corresponding to the called number. Generally, information such as the called number and the device information stored on the VoIP server is stored after encryption or in a hash value. Based on this, after receiving the called number sent by the VoIP gateway, the VoIP server can find the called terminal device corresponding to the called number, and initiate the VoIP call to the called terminal device.

It should be noted that the called user needs to enable the call forwarding unreachable service in advance. In this way, when the paging fails, the called-side network automatically forwards the call request from the calling terminal to the VoIP gateway.

Specifically, the VoIP gateway is connected to the called-side network in advance, and call forwarding on user not reachable to the specified number is subscribed to. When the paging fails, the called-side network can generate the forwarding message (for example, an invite message) of the specific number, where the forwarding message carries the called number. Then, the called-side network routes the forwarding message to the VoIP gateway, so as to forward the call request from the calling terminal to the VoIP gateway. In addition, the called number or the called terminal may be registered with the VoIP server in advance, so as to store the called number, the application account of a VoIP client, the information about the called terminal device, and the like in the VoIP server. In this way, the VoIP server can find the corresponding called terminal based on the called number.

Figures 1, 4A:
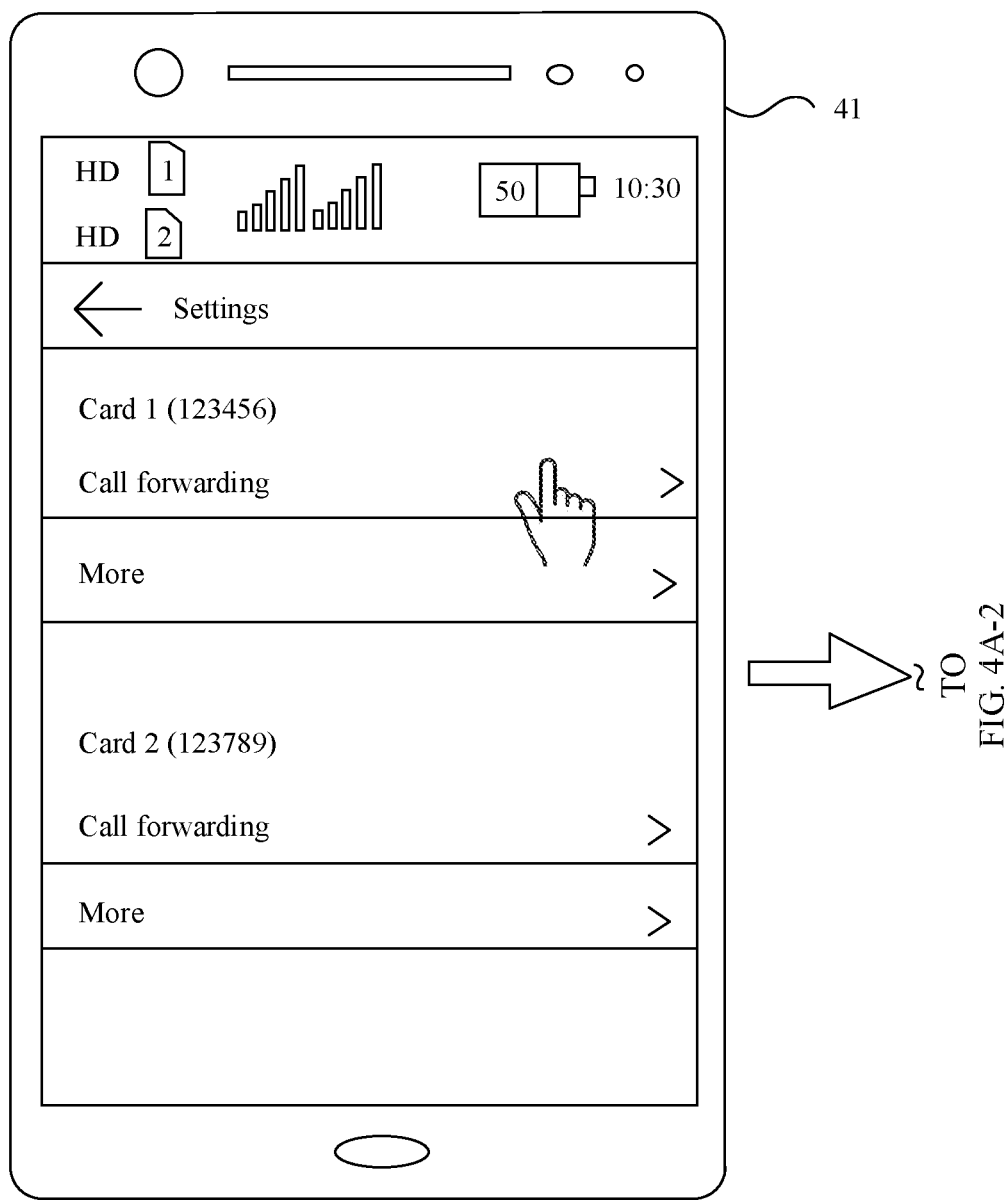
Figures 2, 4A:
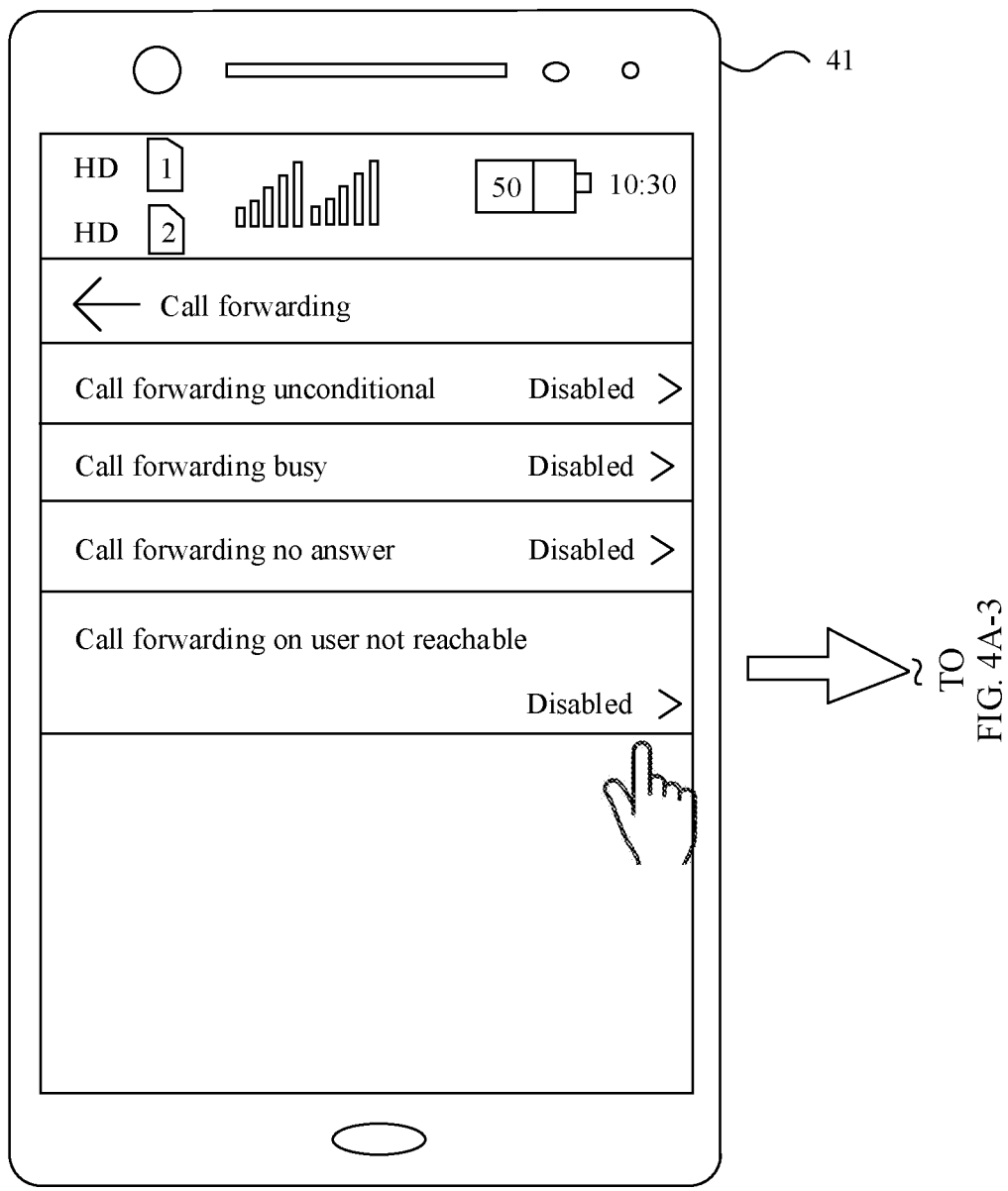
Figures 3, 4A:
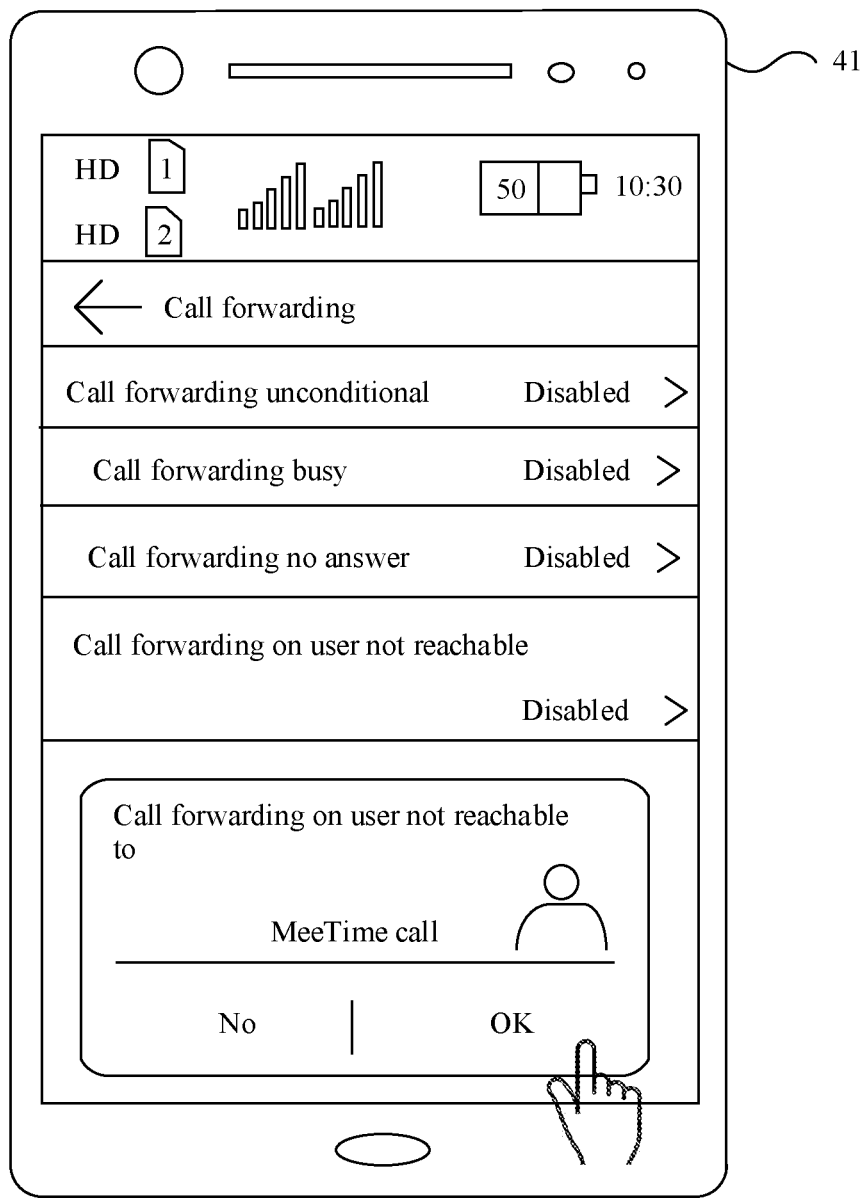

By way of example and not limitation, FIG. 4A-1 to FIG. 4A-3 are a schematic diagram of a call forwarding setting interface. For example, as shown in FIG. 4A-1 to FIG. 4A-3, a called terminal is a mobile phone 41. A user may tap "Call forwarding" corresponding to a card 1 in a setting interface of the mobile phone 41 to enter the call forwarding setting interface, and tap "Call forwarding on user not reachable" Then, the mobile phone 41 pops up an interaction window. The user may input MeeTime call in a corresponding position of the window, and then tap "OK", to enable call forwarding unreachable to MeeTime call. MeeTime call is an application on the mobile phone 41, and may be used as a VoIP client, and a server of the application is used as a VoIP server. It may be understood that, in addition to setting call forwarding unreachable to the VoIP client in call settings, the VoIP client may also provide a corresponding setting interface, that is, call forwarding unreachable to the VoIP client may be set on the VoIP client.

Certainly, the VoIP client may appear in any form. For example, the VoIP client appears as an application, or may appear as a web client (namely, a Web client).

It should be noted that, on a called terminal side, the user of the called terminal may not need to know a specific forwarded-to number to which a call is forwarded, and only needs to set call forwarding unreachable to the VoIP client on the called terminal. Certainly, the user may also be informed of a target number corresponding to call forwarding unreachable. In this way, when subscribing to a call forwarding on user not reachable service, the user can directly input the target number corresponding to call forwarding unreachable.

In a specific application, after the user sets, for the SIM card 1, call forwarding on user not reachable to the VoIP client, the called terminal may notify an operator of a specific forwarded-to number based on the preset forwarding number (or referred to as the target number corresponding to the call forwarding unreachable service). In this way, when the call fails, the called-side network automatically forwards the call request from the calling terminal to the VoIP gateway by using the pre-agreed forwarding number based on the call forwarding unreachable service (or referred to as a forwarding unreachable service) enabled by the called terminal.

In an actual application, the specific forwarded-to number may be set according to a requirement. By way of example and not limitation, a dedicated line is established in advance to connect the VoIP gateway and the called-side network. Call forwarding on user not reachable to 6061XXX is preset.

That is, when forwarding unreachable to the VoIP client is enabled for the SIM card of the called terminal, the default subscribed call forwarding unreachable service is the call forwarding unreachable to 6061XXX. In this way, when the callee is unreachable, the called-side network generates a forwarding message with a target number 6061XXX, where the forwarding message carries the called number. All forwarding messages with target numbers 6061XXX are transmitted from the called-side network to the VoIP gateway through the pre-established dedicated line, so that the messages are forwarded to the VoIP gateway when the callee is unreachable.

In a specific application, the called terminal may bind the mobile phone number of the called terminal to the VoIP client, so as to register the called terminal with the VoIP server.

By way of example and not limitation, a VoIP client on the called terminal 32 in FIG. 3A is MeeTime call. In this case, the user may set a mobile phone number bound to MeeTime call to 123456. In this way, the mobile phone number of the called terminal is stored on a server of MeeTime call. In addition to binding the mobile number, the device information of the called terminal may be bound to an application account of MeeTime call. The device information of the called terminal may include unique device identifier information. In this way, if the user logs in to MeeTime call on a plurality of devices at the same time, the VoIP server can initiate VoIP calls to the plurality of devices at the same time.

After the called terminal subscribes to the forwarding unreachable service and registers with the VoIP server, the calling terminal 31 may initiate the call to the called terminal 32. When the paging fails, the called-side network 34 transfers the call request to the corresponding forwarding number based on the pre-agreed forwarding number, so as to transmit the call request from the calling terminal to the interworking gateway 351 in the cloud. Then, the interworking gateway 351 sends the called number carried in the call request to the call forwarding service 352. The call forwarding service 352 can find the called terminal 32 corresponding to the called number, and initiate the VoIP call to the found called terminal 32.

That the user is unreachable or the paging fails includes but is not limited to the following several possibilities: The called terminal has no signal of the operator network, the signal of the called-side network is weak, and one of the dual cards of the called terminal is in a call.

Figures 1, 4B:
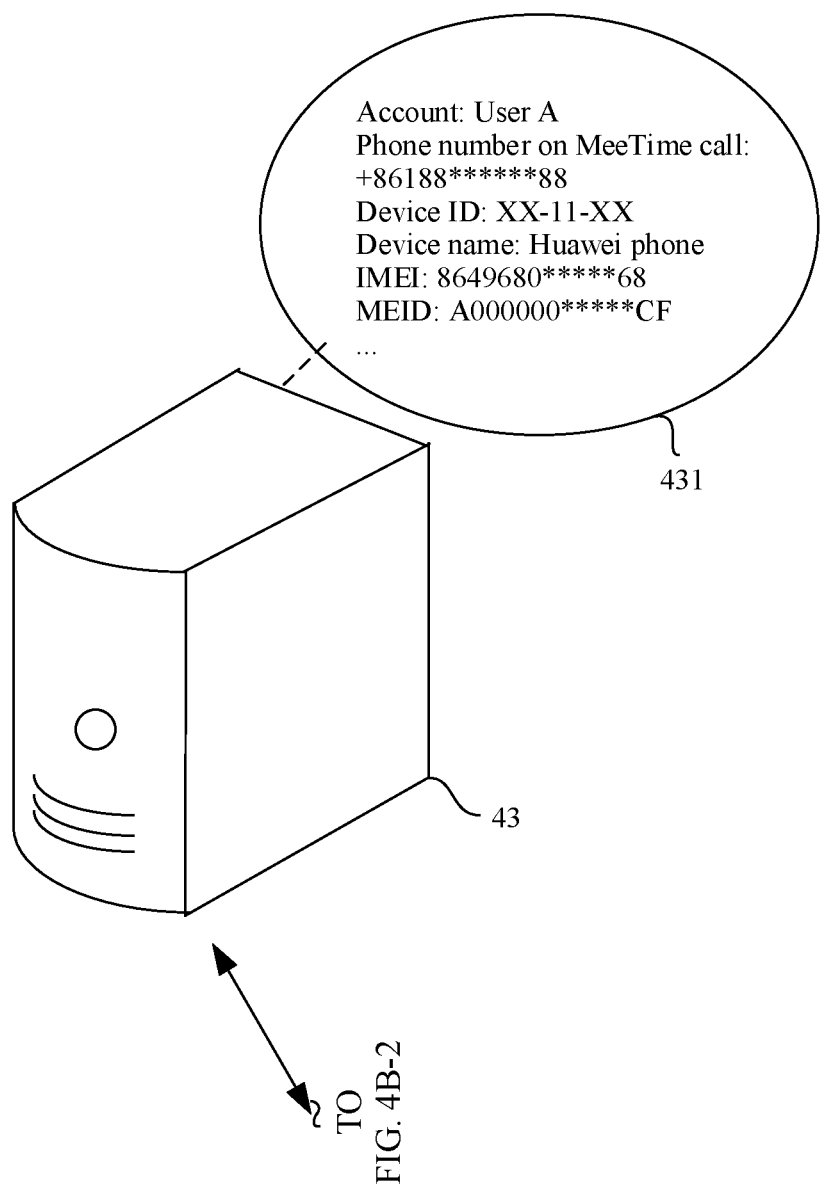
Figures 2, 4B:
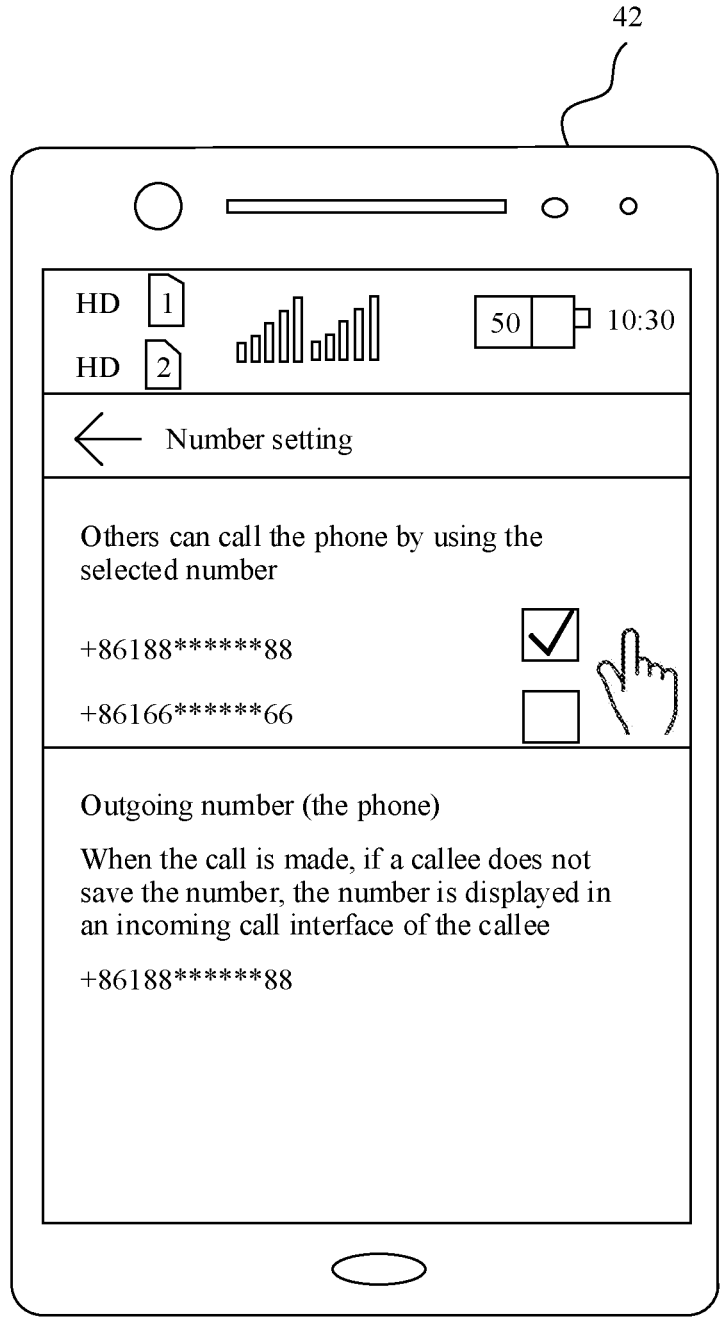
Figures 3, 4B:
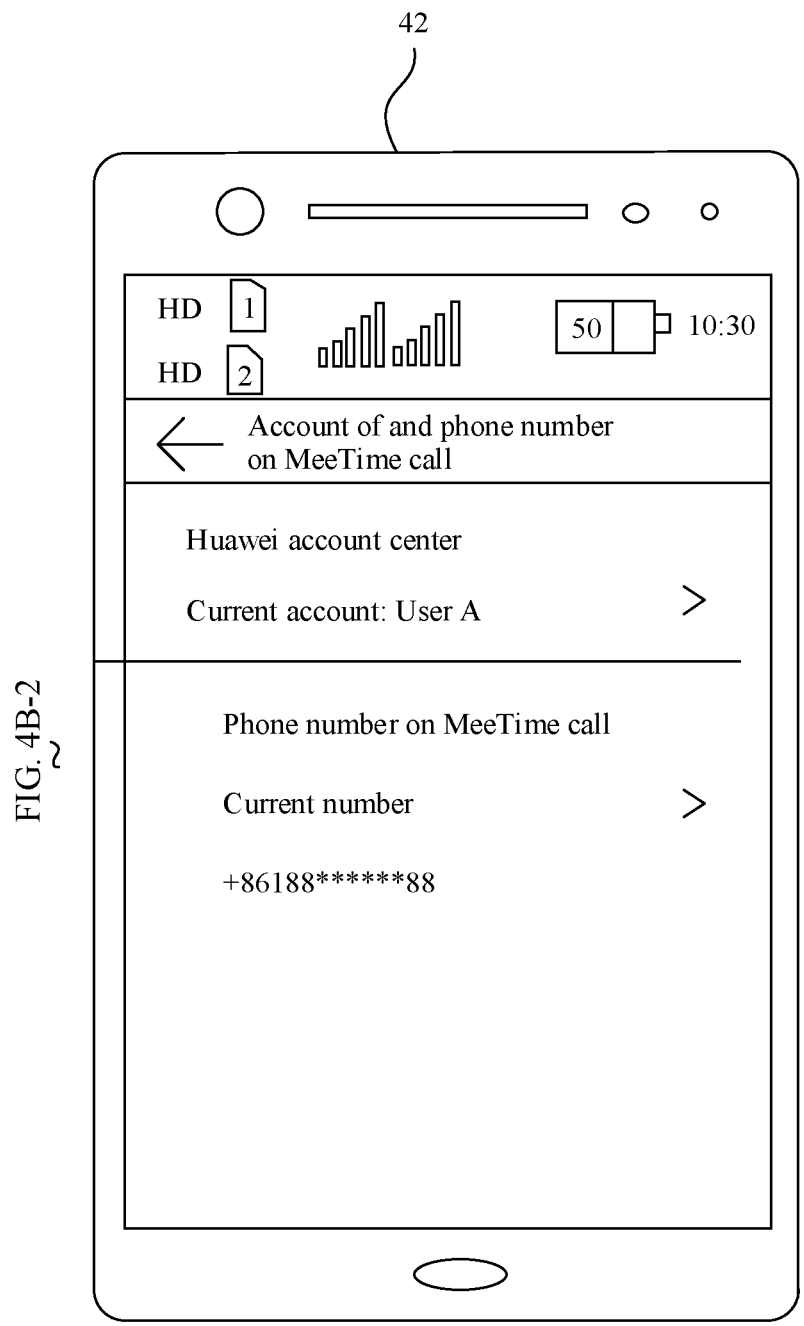

For example, refer to FIG. 4B-1 to FIG. 4B-3. An application MeeTime call is installed on a mobile phone 42, and is used as a VoIP client. In a number setting interface of the application MeeTime call, a user selects a mobile phone number+86188 **** 88 bound to MeeTime call. In this way, another person can initiate a call to MeeTime call on the mobile phone 42 by dialing +86188 ** 88. In addition, when the mobile phone 42 calls another person by using MeeTime call, +86188 ** 88 is also displayed in an incoming call interface. After the user selects +86188 ** 88, the phone number on MeeTime call+86188 ** 88 is displayed in an account of and phone number on MeeTime call interface of the mobile phone 42. After the user operates the mobile phone 42 and binds MeeTime call to the mobile phone number, the mobile phone 42 can upload information to a server 43 of MeeTime call, where the server 43 is used as a VoIP server. After receiving the information uploaded by the mobile phone 42, the server 43 may store the information, and associate information such as an account of the application MeeTime call and the phone number on MeeTime call for storage. Specifically, the server 43 stores information shown in 431. The information may include but is not limited to information such as the account, the phone number on MeeTime call, a device ID, a device name, an IMEI, and an MEID. The information is associated for storage, that is, other information may be found by using any piece of the information. The device ID, the device name, the IMEI, the MEID, and the like are all device information of the mobile phone 42, and the device information may be used as unique identifier information of the mobile phone 42**.

In a specific application, the unique device identifier information such as the device ID, the device name, the IMEI, and the MEID may be used as VoIP communication information, that is, the unique device identifier information is found by using the mobile phone number, and then the VoIP call is initiated to the device corresponding to the unique device identifier information. Certainly, a unique VoIP communication number or communication ID may be set for the mobile phone 42, and the VoIP communication number or communication ID is associated with the information in 431 for storage. In this way, information such as the VoIP communication number or communication ID may be subsequently found by using the information such as the mobile phone number.

The server 43 stores the information related to the mobile phone 42, so that the server 43 subsequently finds the mobile phone 42 and then initiates the VoIP call to the mobile phone 42.

It can be learned from the foregoing that, in this embodiment of this application, when paging fails in the called-side network, the called-side network can first determine whether the called number has been subscribed to the call forwarding unreachable service. If the called number has been subscribed to the call forwarding unreachable service, the called-side network can generate the forwarding message, where the forwarding message carries the called number; and route the forwarding message to the VoIP gateway. The VoIP gateway parses the received forwarding message to obtain the called number, and sends the called number to the VoIP server. Certainly, in some other embodiments, after receiving the call request sent by the calling-side network, the called-side network may first determine which services the called number subscribes to, for example, whether to subscribe to a forwarding unconditional service or a forwarding unreachable service. Then, the called-side network can perform paging based on the call request.

The VoIP server stores a mapping between the called number and a VoIP number. The VoIP number corresponding to the called number can be found by using the mapping. Then, the VoIP server initiates the VoIP call to the called terminal based on the found VoIP number through a communication link (for example, the Wi-Fi or the cellular data) between the VoIP server and the called terminal. In this way, even if the signal of the called-side network is poor or there is no signal of the operator network at all, the called terminal can still receive the call request from the calling terminal, and can establish the call connection to the calling terminal, thereby implementing interworking between the caller and the callee.

For example, in FIG. 4B-1 to FIG. 4B-3, the calling terminal initiates the cellular call to the mobile phone number+86188 **** 88, the cellular call is first transferred to the called-side network, and the called-side network pages+86188 ** 88. When the paging fails, the called-side network generates a message carrying+86188 ** 88, and sends the message to the VoIP gateway. Then the VoIP gateway parses the message to obtain the mobile number +86188 ** 88. The VoIP gateway sends the mobile phone number+86188 ** 88 to the server 43. After receiving the mobile phone number+86188 ** 88, the server 43 first searches for whether the mobile phone number+86188 ** 88 is stored locally. After finding the mobile phone number+86188 ** 88, the server 43 can find the information such as the account, the device ID, the IMEI, and the VoIP number associated with+86188 ** 88, and initiate the VoIP call to the mobile phone 42**.

It should be noted that architectures in FIG. 2 and FIG. 3A may not only be applied to a call forwarding on user not reachable scenario, that is, when the paging fails, the called-side network forwards the call request from the calling terminal to the VoIP gateway, and the VoIP gateway and the VoIP server bridge or relay the call request from the calling terminal to the called terminal; and may also be applied to a call forwarding unconditional scenario, a call forwarding busy scenario, and a call forwarding no answer scenario.

The following separately describes the foregoing several specific scenarios.

1. Call Forwarding Unconditional Scenario

In a specific application, after determining that the called number has been subscribed to the call forwarding unconditional service, the called-side network obtains the target number corresponding to call forwarding unconditional. Then the called-side network generates the forwarding message based on the target number, and routes the forwarding message to the VoIP gateway, where the forwarding message carries the called number. Finally, after parsing the forwarding message to obtain the called number, the VoIP gateway sends the called number to the VoIP server, and the VoIP server initiates the VoIP call based on the called number.

By way of example and not limitation, the user may enable call forwarding unconditional to MeeTime call, to reduce international roaming fees. In this way, all call requests initiated to the called terminal are forwarded by the called-side network to the VoIP gateway, and then the VoIP gateway sends the called number obtained through parsing to the server of MeeTime call. After finding the called terminal corresponding to the called number, the server of MeeTime call initiates the VoIP call to the called terminal. This implements the call forwarding unconditional service.

It should be noted that a process of subscribing to the call forwarding unconditional service is similar to the foregoing process of subscribing to the call forwarding unreachable service. For details, refer to the foregoing corresponding content. Details are not described herein again.

It should be further noted that, the user may set call forwarding unconditional to the VoIP client on the called terminal, or may set call forwarding unconditional to a VoIP client on another terminal device. For example, the VoIP client is MeeTime call, and the called terminal is a mobile phone. In this case, MeeTime call is installed on each of the mobile phone and a tablet computer of the user. The user may set incoming call forwarding unconditional of the mobile phone to MeeTime call on the tablet computer.

2. Call Forwarding Busy Scenario

A case of call forwarding busy may include but is not limited to a case in which the user manually hangs up when the callee is alerted, a case in which the called number is in a call, and a case in which the called terminal is in international roaming.

In this scenario, when the called-end network determines that the called terminal meets a forwarding busy condition (for example, the user of the called terminal manually hangs up the call request from the calling terminal), the called-end network can generate the forwarding message based on the target number corresponding to call forwarding busy, and then route the forwarding message carrying the called number to the VoIP gateway. After parsing the forwarding message to obtain the called number, the VoIP gateway sends the called number to the VoIP server. The VoIP server initiates the VoIP call to the VoIP client based on the called number to implement the call forwarding busy service.

It should be noted that a process of subscribing to the call forwarding busy service is similar to the foregoing process of subscribing to the call forwarding unreachable service. For details, refer to the foregoing corresponding content. Details are not described herein again. It should be further noted that, the user may set call forwarding busy to the VoIP client on the called terminal, or may set call forwarding busy to a VoIP client on another terminal device.

3. Call Forwarding No Answer Scenario

Call forwarding no answer may refer to transferring a call request to a specific number when a called terminal has no answer. In this embodiment of this application, call forwarding no answer to the VoIP client may be set.

After the user sets the call forwarding no answer to the VoIP client, when determining that the called terminal has no answer, the called-side network may generate the forwarding message based on the target number corresponding to call forwarding no answer, and then route the forwarding message carrying the called number to the VoIP gateway. After parsing the forwarding message to obtain the called number, the VoIP gateway sends the called number to the VoIP server. The VoIP server initiates the VoIP call to the VoIP client based on the called number to implement the call forwarding no answer.

It should be noted that a process of subscribing to the forwarding no answer service is similar to the foregoing process of subscribing to the call forwarding unreachable service. For details, refer to the foregoing corresponding content. Details are not described herein again.

It should be further noted that, the user may set call forwarding no answer to the VoIP client on the called terminal, or may set call forwarding no answer to a VoIP client on another terminal device.

In conclusion, when a forwarding condition is met, the called-side network in this embodiment of this application can forward the call request from the calling terminal to the VoIP gateway. The forwarding condition can be that the user is unreachable, that is, the paging fails, may be busy, unconditional, or no answer.

Once call forwarding unconditional is set, all calls to you are forwarded to the phone you specify in advance. Your mobile phone does not ring and you can only answer the calls from the phone you specify in advance.

Once call forwarding busy is set, when you are in a call on your mobile phone, if another person calls you, the incoming call will be automatically forwarded to a specified phone or mobile phone.

Once call forwarding no answer is set, when your mobile phone rings but there is no answer, all calls to you are forwarded to a phone or mobile phone that you specify in advance.

Once call forwarding unreachable is set, when your mobile phone is powered off or has no signal, all calls to you are forwarded to a phone or mobile phone that you specify in advance.

It should be further noted that the application scenario in this embodiment of this application is applicable to a voice call scenario and/or a video call scenario. The foregoing and the following mainly use the voice call scenario as an example for description. For the video call scenario, refer to corresponding descriptions of the voice call scenario. Details are not described herein again.

Figure 5:
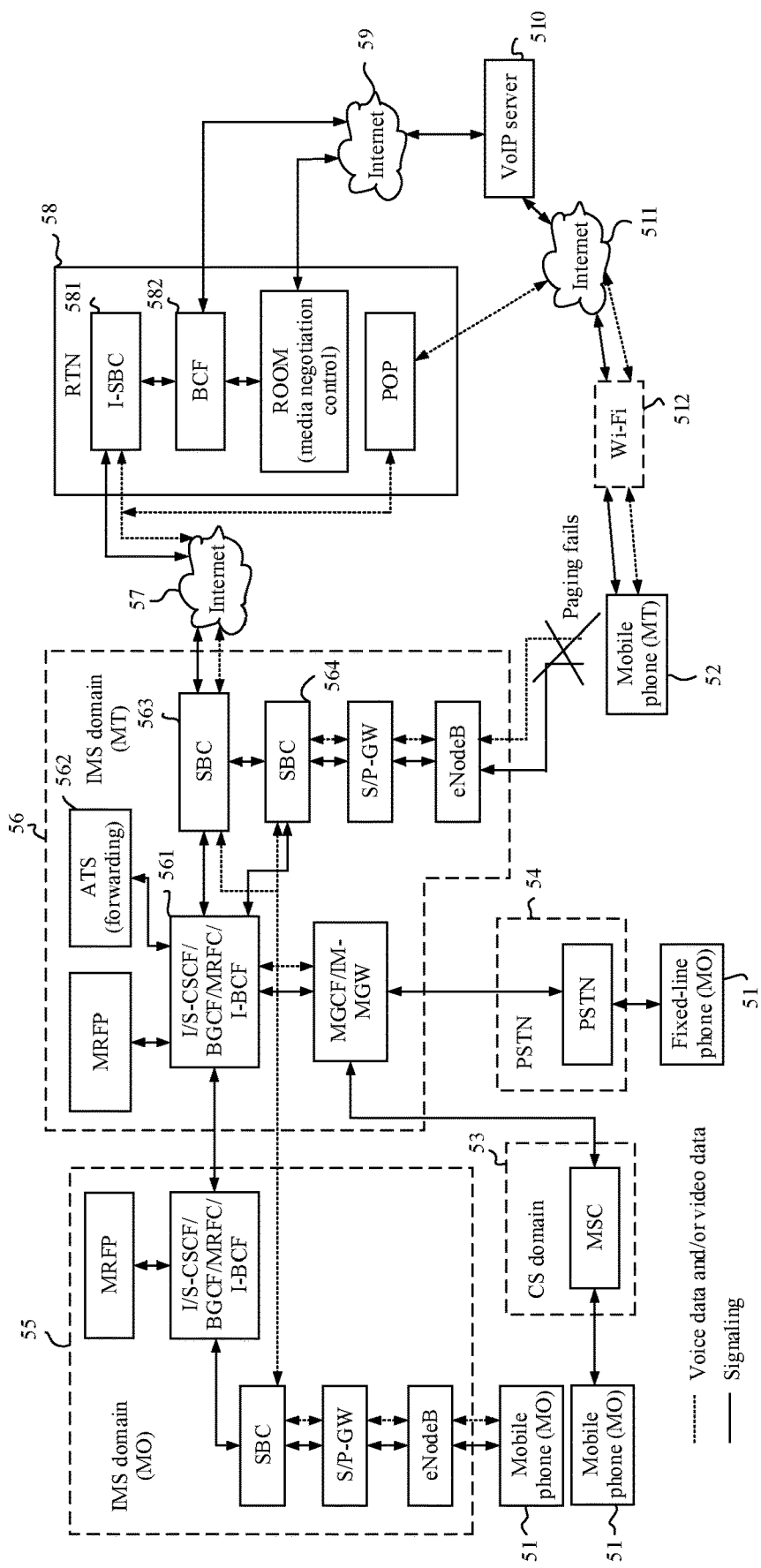
FIG. 5 is a schematic diagram of an architecture of another call network according to an embodiment of this application.

To better describe First call solution, the following describes in detail, with reference to FIG. 5, an architecture of a call network corresponding to First call solution.

Before FIG. 5 is described, terms or related nouns related in FIG. 5 are first described.

An eNodeB (Evolved NodeB) is a radio base station in a long term evolution (Long Term Evolution, LTE) network, and is also a network element in an LTE radio access network.

A serving/PDN gateway (Serving/PDN GateWay, S/P-GW) is a network element in an LTE network.

A session border controller (Session Border Controller, SBC) is a network element in an IMS network.

A border controller function (Border Controller Function, BCF) is a network element in an IMS network and is used to implement a border control function or SBC signaling processing.

A multimedia resource function is a (Multimedia Resource Function, MRF).

A multimedia resource function controller is a (Multimedia Resource Function Controller, MRFC).

A multimedia resource function processor is a (Multimedia Resource Function Processor, MRFP).

An interrogating-call session control function is an (interrogating-call session control function, I-CSCF).

A serving-call session control function is (serving-call session control function, S-CSCF).

A breakout gateway control function (breakout gateway control function, BGCF) is a network entity in an IMS domain, and the entity analyzes a called number to implement interworking between the IMS domain and a CS domain.

An interconnection border control function (interconnection border control function, I-BCF) is a control plane.

An advanced telephony server (advanced telephony server, ATS), namely, the ATS, is a SIP application server.

An IP multimedia media gateway (IP multimedia media gateway, IM-MGW) serves as an edge access used to implement interconnection of an IMS domain and a CS domain and perform codec functions if necessary.

A media gateway control function (media gateway control function, MGCF) serves as a gateway for communication between an IMS domain and a CS domain.

A POP can be used for NAT traversal to transmit media data.

As shown in FIG. 5, a mobile origination call (Mobile Origination Call, MO) 51 includes a mobile phone and a fixed-line phone, and callee (Mobile Termination Call, MT) 52 is a mobile phone. When the MO 51 is the fixed-line phone, the MO 51 is connected to an IMS network 56 of the MT through a PSTN. When the mobile phone supports only a CS network, the MO 51 is connected to the IMS network 56 of the MT through the CS network 53. A calling-side network includes the CS network 53, the PSTN 54, and an IMS network 55. The CS network 53 includes a mobile switching center (Mobile Switching Center, MSC). A called-side network includes the IMS network 56.

The IMS network 55 includes the following network elements: an eNodeB, an S/P-GW, an SBC, an I/S-CSCF/BGCF/MRFC/I-BCF, and an MRFP. The IMS network 56 of the MT includes the following network elements: an eNodeB, an S/P-GW, an SBC, an ATS, an MGCF/IM-MGW, an I/S-CSCF/BGCF/MRFC/I-BCF, and an MRFP.

When signals of operator networks of both the MO 51 and the MT 52 are good, a signaling interaction process between the MO 51 and the MT 52 may include the following steps: The MO 51 initiates a call to the MT 52, and a call request from the MO 51 is transferred to the multimedia resource control network element 561 in the IMS network 56 on an MT 52 side through the IMS network 55, the CS network 53, or the PSTN 54. Then, the multimedia resource control network element 561 transfers the call request from the MO 51 to the MT 52, so as to establish a call connection between the MO 51 and the MT 52. After the call connection is established, voice data and/or video data may be transmitted between the MO 51 and the MT 52 based on the architecture of the call network.

However, when a signal of an operator network of the MT 52 is poor, that is, the signal of the called-side network is poor, or the MT 52 has no signal of an operator network, the multimedia resource control network element 561 corresponding to the MT 52 cannot transfer the call request from the MO 51 to the MT52 through the SBC 564, the S/P-GW, and the eNodeB in the IMS network 56. As a result, the MT 52 cannot receive the call from the MO 51.

To solve this problem, a real-time network (Real-time Network, RTN) 58 on the MT 52 side is set up. The RTN 58 is in communication connection to the SBC 563 in the IMS network 56 through an internet 57. The RTN 58 can be equivalent to a VoIP gateway. The RTN 58 may be in communication connection to a VoIP server 510 through an internet 59, and the VoIP server is connected to the MT 52 by using an internet 511 and Wi-Fi 512. Certainly, in some other embodiments, the MT 52 may be in communication connection to the VoIP server 510 by using a cellular network and the internet 511.

When finding that paging fails, the multimedia resource control network element 561 in the IMS network 56 of the MT 52 queries, in the ATS 562, whether a called number has been subscribed to a forwarding service. If the called number has been subscribed to a call forwarding on user not reachable service and set call forwarding on user not reachable to 6061XXX, the multimedia resource control network element 561 forwards the call request to an I-SBC 581 in the RTN 58 through the SBC 563. Specifically, an invite message for 6061XXX is generated, and the invite message is routed to the I-SBC 581, where the invite message carries the called number. After receiving the invite message for 6061XXX, the I-SBC 581 forwards the invite message for 6061XXX to a BCF 582 based on call forwarding signaling. The BCF 582 parses the invite message to obtain the called number, and sends the called number obtained through parsing to the VoIP server 510 through the internet 59. After receiving the called number, the VoIP server 510 searches for information about the called device corresponding to the called number, where the information about the called device includes a VoIP number (or referred to as a VoIP communication number), a unique device identifier, and the like. Then, the VoIP server 510 initiates a VoIP call to the MT 52 through the internet 511 and the Wi-Fi 512.

It should be noted that the RTN 58 and the VoIP server 510 may be connected not only through the internet, that is, a communication connection manner between the RTN 58 and the VoIP server 510 is not limited to the Internet. The RTN 58 may be equivalent to the VoIP gateway mentioned above, and is configured to: receive the forwarding message sent by the IMS network 56, parse the forwarding message to obtain the called number, and transmit the called number to the VoIP server 510.

In some other embodiments, the RTN 58 and the VoIP server 510 may also be integrated into one server. In addition, functions implemented by the SBC 563 and the SBC 564 in the IMS network 56 may also be integrated into one SBC.

It can be learned that, the VoIP gateway and the VoIP server are set up on the called terminal side, so that when the callee is unreachable, the called-side network forwards the call request from the calling terminal to the RTN 58, the RTN 58 relays the call request from the calling terminal to the VoIP server, and finally, the VoIP server initiates the VoIP call to the callee. For the called side, even if coverage of the operator network is insufficient, the called side can still receive the call request from the calling terminal, and establish the call connection. Generally, for a calling-side user, it is insensible, that is, the calling-side user is unaware of a status of the operator network on the called side. For example, the calling-side user does not receive prompt information such as "The number you dialed is out of the service area".

Figure 6A:
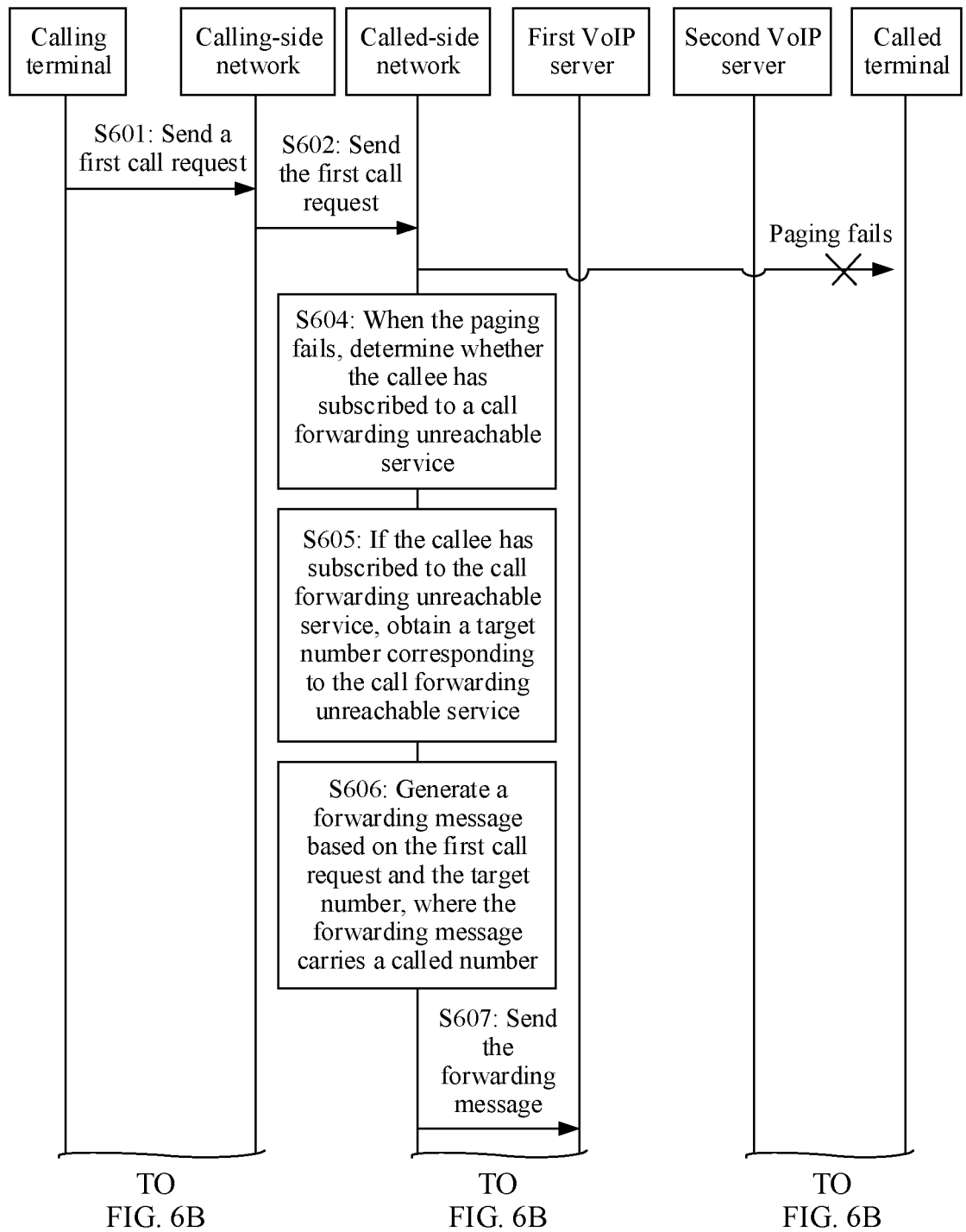
FIG. 6A and FIG. 6B are a schematic interaction diagram of a call method according to an embodiment of this application.
Figure 6B:
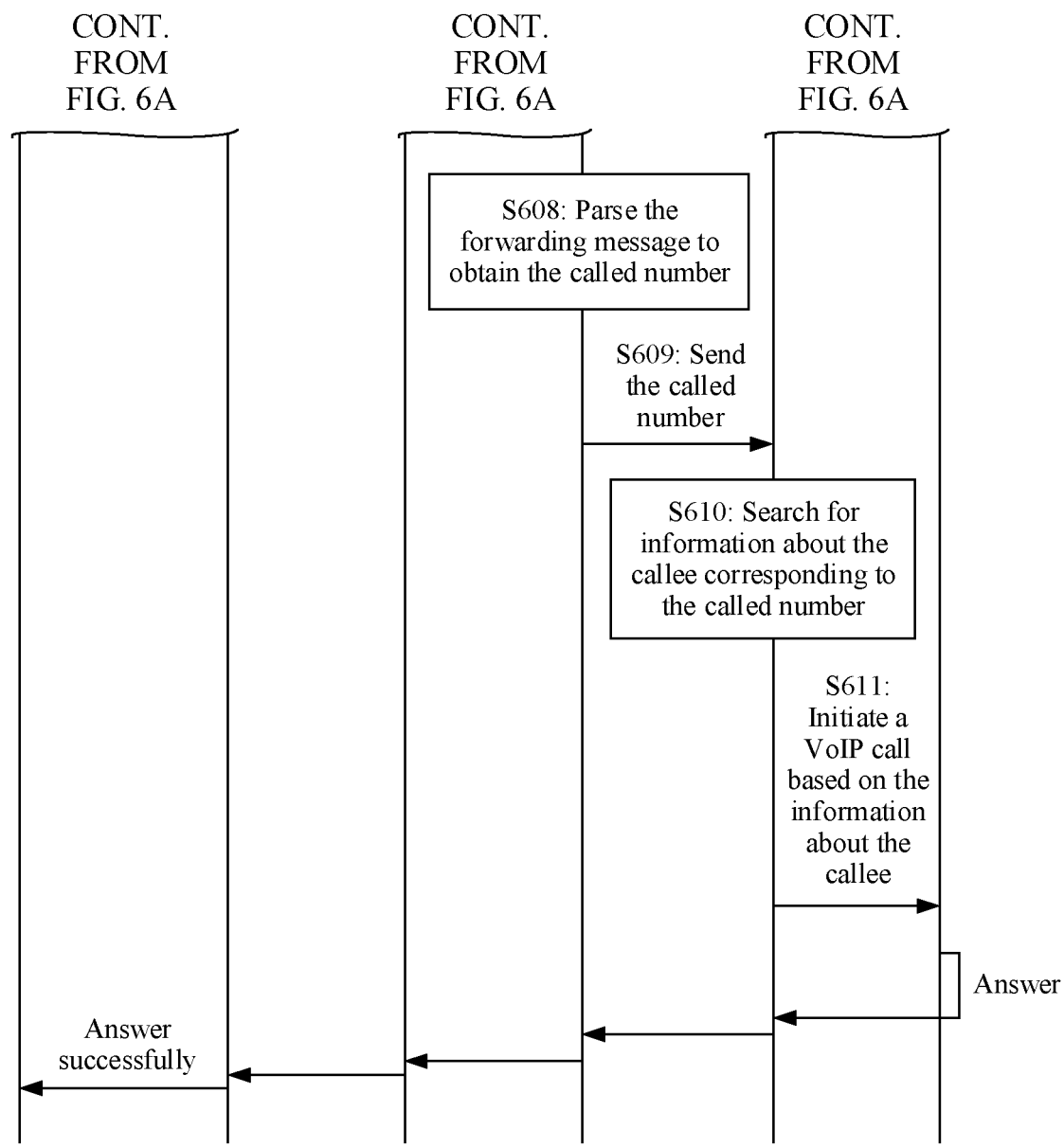

Based on the foregoing architecture of the call network and call scenario, the following describes in detail a call procedure in this application. FIG. 6A and FIG. 6B are a schematic interaction diagram of a call method according to an embodiment of this application. The method may include the following steps.

Step S601: A calling terminal sends a first call request to a calling-side network, to initiate a call to a called terminal.

It should be noted that the calling terminal may be a mobile terminal or a fixed-line phone. The mobile terminal may communicate with the called terminal through an IMS network or a CS network. The fixed-line phone may initiate the call to the called terminal through a PSTN.

The first call request is an invite message generated by the calling terminal based on a called number, where the invite message includes the called number.

Step S602: The calling-side network sends the first call request to a called-side network.

Step S603: The called-side network pages the called terminal based on the first call request.

Step S604: When the paging fails, the called-side network determines whether the callee has been subscribed to a call forwarding unreachable service.

Step S605: If the callee has been subscribed to the call forwarding unreachable service, the called-side network obtains a target number corresponding to the call forwarding unreachable service.

Step S606: The called-side network generates a forwarding message based on the first call request and the target number, where the forwarding message carries the called number.

It should be noted that the forwarding message is an invite message generated by the called-side network based on the target number, and the invite message carries the called number.

In a specific application, a manner of carrying the called number in the forwarding message may include but is not limited to the following two manners:

Manner 1:

The called number carried in the forwarding message is set as: forwarding dedicated line number+called number. For example, if the target number is 6061XXX and the called number is 123456, the called number carried in the invite message is 6061XXX123456.

In this manner, when receiving the forwarding message, a first VoIP server can directly obtain the called number through parsing. For example, the last six digits of 6061XXX123456 are used as the called number.

Manner 2:

The called number carried in the forwarding message is set as a forwarding dedicated line number. In this case, the forwarding message carries only the target number but not the called number. Instead, History-Info is carried in the forwarding message in conventional session initiation protocol (Session Initiation Protocol, SIP) signaling, where History-Info carries the called number. In this way, the called number can be extracted from History-Info subsequently.

By way of example and not limitation, History-Info is specifically as follows:

<sip:
+861340000XXXX@ge.chinamobile.com?Reason=SIP
% %3Bcause %%3D486>;
index=1,<tel: 1340010XXXX>; index=1.1

The called number can be extracted through parsing History-Info.

Step S607: The called-side network sends the forwarding message to a first VoIP server.

Step S608: The first VoIP server parses the forwarding message to obtain the called number.

It should be noted that the first VoIP server may be equivalent to the foregoing VoIP gateway or RTN.

Step S609: The first VoIP server sends the called number to a second VoIP server.

Step S610: The second VoIP server searches for information about the caller corresponding to the called number.

Step S611: The second VoIP server initiates a VoIP call to the called terminal based on the information about the callee, so as to establish a call connection between the calling terminal and the called terminal.

It should be noted that the information about the callee may include but is not limited to a VoIP communication number, a unique device identifier, and the like. One called number may correspond to one or more unique device identifiers. Specifically, if a called user logs in to a VoIP client on a plurality of devices at the same time, the VoIP server can initiate VoIP calls to the plurality of devices at the same time. For example, the VoIP client is MeeTime call, the called user has three electronic devices: a mobile phone 1, a mobile phone 2, and a tablet computer, the three electronic devices each are installed with MeeTime call, and bound mobile phone numbers are all 123456. A unique device identifier of the mobile phone 1 is 111XX, a unique device identifier of the mobile phone 2 is 222XXX, and a unique device identifier of the tablet computer is 333XXX. The information about the callee stored on the second VoIP server includes three communication numbers corresponding to 123456, where the three communication numbers are in a one-to-one correspondence with the unique device identifier of the mobile phone 1, the unique device identifier of the mobile phone 2, and the unique device identifier of the tablet computer. In this case, after finding the three communication numbers based on the called number 123456, the second VoIP server simultaneously initiates VoIP calls corresponding to the three communication numbers. In this way, the mobile phone 1, the mobile phone 2, and the tablet computer all receive the calls.

In some other embodiments, the VoIP server may initiate a VoIP call only to a primary device, and then the primary device initiates a call to another device, so as to initiate VoIP calls to a plurality of devices. In a specific application, the primary device may be in communication connection to the another device, and the communication may be near field communication, for example, Bluetooth, Wi-Fi point-topoint, or Wi-Fi STA. In Wi-Fi point-to-point communication, the primary device and the another device may be or not be in a same local area network. In this case, a Wi-Fi point-to-point connection can still be established between the primary device and the another device, that is, the point-to-point connection can be implemented between the primary device and the another device by passing through a network firewall. Alternatively, the primary device can be connected to the another device by using a server, that is, the primary device can exchange data with the another device by using the server. For example, the primary device is a mobile phone, the other devices are a tablet computer and a smart screen, and the mobile phone, the tablet computer, and the smart screen each are connected to a Wi-Fi router. When the mobile phone receives the VoIP call from the VoIP server, the mobile phone can initiate calls to the tablet computer and the smart screen through the Wi-Fi router. In this way, the mobile phone, all the tablet computer, and the smart screen can receive the calls. It should be noted that the VoIP server may initiate the VoIP call to a corresponding terminal device based on the mobile phone number bound to a VoIP client account. However, in some other embodiments, if a number of a SIM card currently inserted into the called terminal is not an originally bound number, the VoIP server may also initiate a VoIP call based on the number of the currently inserted SIM card. For example, the mobile number originally bound by the called terminal is 123456, but the number of the SIM card currently inserted into the called terminal is 234567. When logging in to the VoIP client, the called terminal may read the number of the currently inserted SIM card, and upload the read number to the VoIP server. In this way, the VoIP server can also learn the number of the SIM card currently inserted into the called terminal. Based on this, the VoIP server can also initiate the VoIP call based on the number of the SIM card currently inserted into the called terminal.

In addition, a keep-alive communication link is maintained between the called terminal and the second VoIP server, and the communication link may be but is not limited to a Wi-Fi communication link or a cellular network.

To better describe the call procedure, the following provides descriptions with reference to a specific example.

One night, Mark came to work in a study room in his basement and put his phone on a desk in the study room. A signal of an operator network in the basement is poor, but a Wi-Fi network signal is good. Mark's mobile number is 123456, and Mark's mobile phone is installed with MeeTime call. Mark has set call forwarding on user not reachable to MeeTime call, and has bound the mobile number 123456 to MeeTime call. In other words, a correspondence between the mobile phone number 123456 and a communication number 8082XXX is stored on a server of MeeTime call, and 8082XXX is a VoIP communication number of MeeTime call on Mark's phone. In addition, Mark's phone has enabled Wi-Fi and connected to the Wi-Fi network at home.

Figure 7:
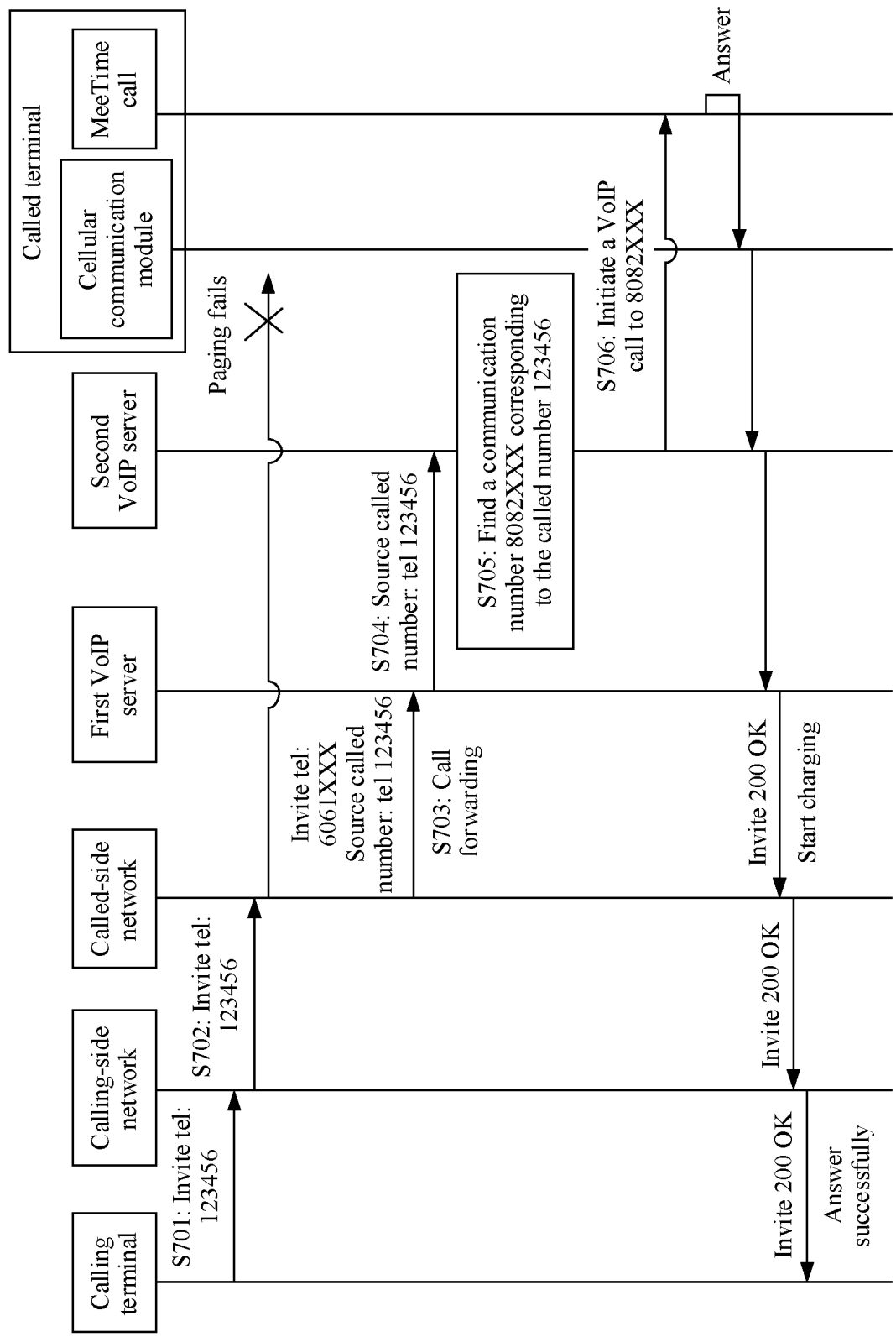
FIG. 7 is another schematic interaction diagram of a call method according to an embodiment of this application.

Tom calls Mark, and Mark's phone is a called terminal, and Tom's phone is a calling terminal in this case. For a process of interaction between the calling terminal and the called terminal, refer to another schematic interaction diagram of a call method shown in FIG. 7. As shown in FIG. 7, the process may include the following steps.

Step S701: The calling terminal sends an invite message carrying the called number 123456 to a calling-side network.

Step S702: The calling-side network sends the invite message to a called-side network.

Step S703: When paging fails, the called-side network forwards a call request from the calling terminal to a first VoIP server.

In a specific application, the called-side network may generate a forwarding message based on a forwarding number, and route the forwarding message to the first VoIP server. The forwarding message is an invite message including the forwarding target number 6061XXX and carrying the called number 123456.

Step S704: The first VoIP server parses the forwarding message to obtain the called number 123456, and sends the called number 123456 to a second VoIP server.

Step S705: The second VoIP server finds the communication number 8082XXX corresponding to the called number 123456.

Step S706: The second VoIP server initiates a VoIP call to 8082XXX, so as to establish a call connection.

According to the procedure in FIG. 7, even if the called terminal is located in an area such as the basement with the poor signal of the operator network, the called terminal can still receive the call initiated by the calling terminal.

After receiving the VoIP call, Mark's phone rings. After Mark's phone goes off-hook, the called terminal returns, to the second VoIP server, a message used to indicate that the callee has answered the call, and the second VoIP server transfers the message to the first VoIP server. The first VoIP server starts charging based on the message, and returns invite 200 OK to the called-side network, and then the called-side network sends invite 200 OK to the calling terminal. The call connection is successfully established between the calling terminal and the called terminal.

It can be learned that in this embodiment of this application, a VoIP gateway and the VoIP server are established on a called side, and the VoIP gateway is connected to a called-side operator network. In this way, when the paging fails in the called-side network, the called-side network can generate the forwarding message based on the target number corresponding to call forwarding, and route the forwarding message to the VoIP gateway, then the VoIP gateway sends the called number obtained through parsing from the forwarding message to the VoIP server, the VoIP server queries the called terminal corresponding to the called number, and initiates the VoIP call to the called terminal, so as to establish the call connection. Therefore, when the signal of the operator network of the called terminal is poor, the call request from the calling terminal can still be received, and the call connection can be established.

Compared with Secretary service, the call solution provided in this embodiment of this application can implement interworking between the calling terminal and the called terminal when the call is unreachable due to the poor network signal on the called side or another reason.

Compared with VoWi-Fi, the call solution provided in this embodiment of this application can implement interworking between the calling terminal and the called terminal through a conventional operator network when the call is unreachable.

Compared with the OTT call, the call solution provided in this embodiment of this application can implement a case in which the caller and the callee do not need to add friends to each other, and the calling user does not need to manually initiate the VoIP call when the cellular call fails.

It should be noted that the call solution is insensible to the calling side, that is, the calling terminal does not perceive that the signal of the operator network of the called terminal is poor. In addition, a call manner of the calling terminal is not limited, that is, the calling terminal may perform a CS call, a PSTN call, a VOLTE call, and the like.

The called terminal only needs to enable call forwarding unreachable to the VoIP client, and register the called number and the device information of the called terminal with the VoIP server. In addition, the called terminal and the VoIP server need to communicate with each other. When finding that the signal of the operator network is poor, the called user does not need to manually operate the called terminal to notify the VoIP server that the signal of the operator network of the called terminal is poor. The called terminal does not need to report a status and position of the called terminal to the VoIP server at any time. In comparison, the call solution provided in this embodiment has better user experience, and an easier user operation.

Second Call Solution

It should be noted that, in First call solution described above, the VoIP gateway and the VoIP server on the called side need to be set up in advance, so that when the paging fails, the called-side network forwards the call request from the calling terminal to the VoIP gateway, and the VoIP gateway and the VoIP server transfer the call to the callee.

However, in some other embodiments of this application, when paging fails, a calling terminal may also actively initiate a VoIP call to a called terminal, so that when a signal of an operator network of the called terminal is poor or there is no signal of the operator network, the called terminal can still receive a call request from the calling terminal, so as to establish a call connection to the calling terminal.

In other words, different from the foregoing First call solution, an embodiment of this application may further provide another call solution (hereinafter referred to as "Second call solution"). In Second call solution, based on an architecture of a conventional call network, when the paging fails in a called-side network, the calling terminal automatically determines whether the VoIP call can be initiated, and when a specific condition is met, automatically hangs up the current cellular call to trigger the VoIP call, so as to implement interworking between the calling terminal and the called terminal. In other words, in Second call solution, when the paging fails, the called-side network does not need to forward the call request from the calling terminal to a VoIP gateway, but the calling terminal automatically initiates the VoIP call.

Second call solution may be based on the architecture of the conventional network without changing the architecture of the conventional network. Specifically, an architecture of a call network in Second call solution may include the calling terminal, the called terminal, a calling-side network, the called-side network, and the VoIP server. The calling terminal may be in communication connection to the VoIP server through an internet, and the called terminal may also be in communication connection to the VoIP server through an internet. A connection relationship between the calling terminal, the called terminal, the calling-side network, and the called-side network may be shown in the architecture of the call network in FIG. 1. Based on this architecture of the call network, when the paging fails, the calling terminal can automatically determine whether the VoIP call can be initiated, and if the VoIP call can be initiated, initiate the VoIP call to the called terminal by using the VoIP server.

Figure 8A:
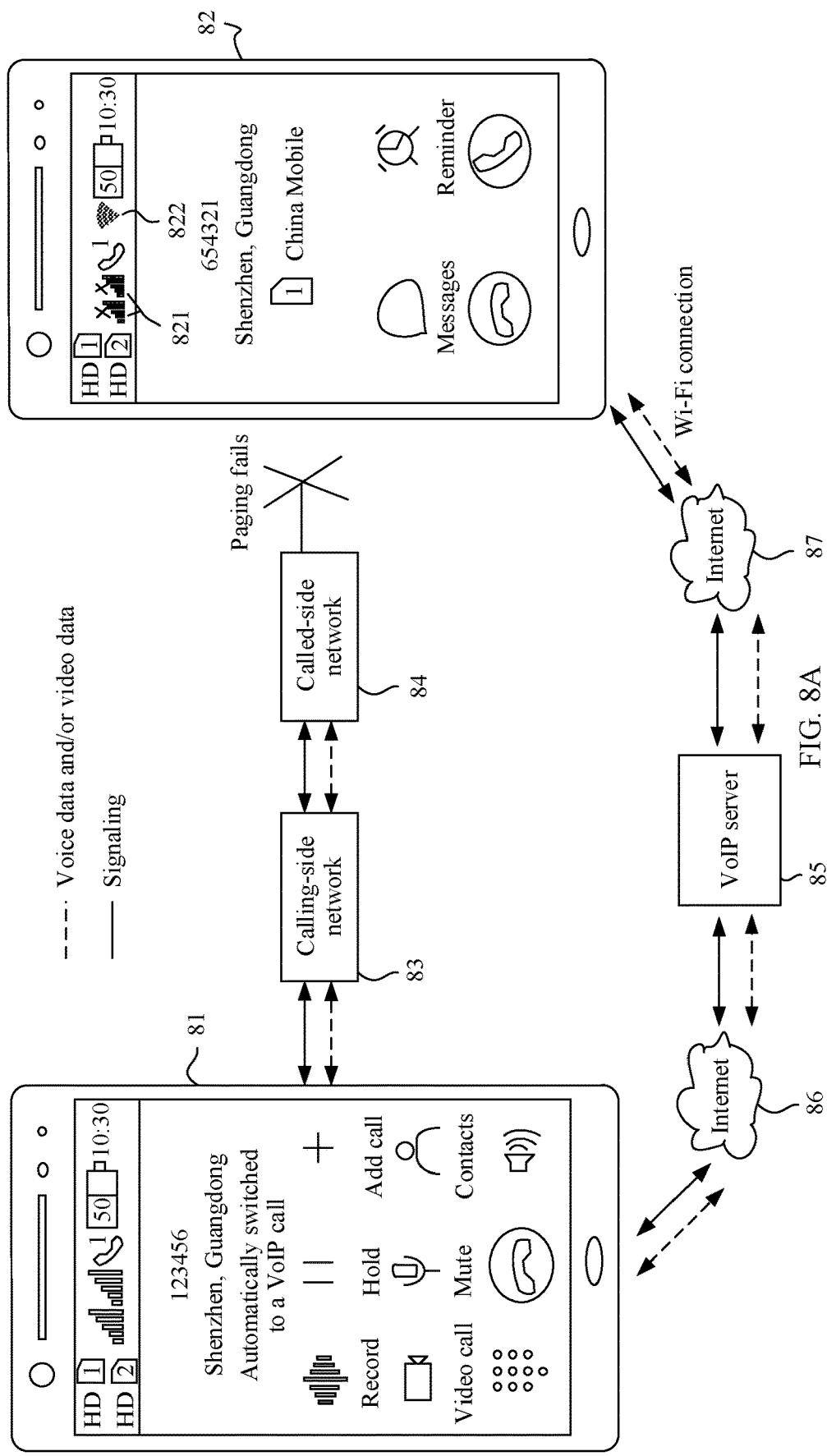
FIG. 8A is a schematic diagram of another call scenario according to an embodiment of this application.

Based on Second call solution, the following describes a call scenario in Second call solution by using an example with reference to FIG. 8A. As shown in FIG. 8A, a calling terminal 81, a called terminal 82, a calling-side network 83, a called-side network 84, a VoIP server 85, an internet 86, and an internet 87 are included. A connection relationship between the calling terminal 81, the called terminal 82, the calling-side network 83, and the called-side network 84 is the same as that in the architecture of the call network in FIG. 1.

It should be noted that FIG. 8A is similar to FIG. 3A. For content similar to FIG. 3A, refer to the foregoing content in FIG. 3A. Details are not described again. A signal of an operator network of the called terminal 82 is poor, but a Wi-Fi network signal is good. Generally, the called terminal 82 may determine quality of a network signal based on signal strength. Specifically, if signal strength of the signal of the operator network in an area in which the called terminal is located is lower than a specific threshold, the called terminal may determine that the signal of the operator network is poor. Likewise, if strength of the Wi-Fi signal in the area in which the called terminal is located is higher than a specific threshold, the called terminal may determine that the Wi-Fi network signal is good.

It should be noted that a server may exchange data with the called terminal to monitor the quality of the signal of the operator network. In a specific application, the called terminal may exchange data with the server by using a cellular network. The server may monitor information such as a delay, a packet loss, and a jitter in a data exchange process, and determine, based on the information such as the delay, the packet loss, and the jitter, the quality of the signal of the operator network on called terminal side.

When the paging fails, the called-side network 84 does not forward the call request from the calling terminal to the VoIP gateway as shown in FIG. 3A, but the calling terminal 81 automatically determines whether to initiate the VoIP call.

The calling terminal 81 is in communication connection to the VoIP server 85 through the internet 86, and the VoIP server 85 is in communication connection to the called terminal 82 through the internet 87. When the calling terminal 81 determines that the VoIP call can be initiated to the called terminal, the calling terminal automatically hangs up the cellular call, and automatically triggers the VoIP call. The VoIP call initiated by the calling terminal 81 arrives at the called terminal 82 through the VoIP server.

Similar to the call solution corresponding to FIG. 3A, a VoIP client is installed on the called terminal 82, and the called terminal 82 still needs to register with the VoIP server in advance. For a specific registration process, refer to the content of the embodiment corresponding to FIG. 3A above. Details are not described herein again.

Different from that in the call solution corresponding to FIG. 3A, the called terminal does not need to enable call forwarding unreachable to the VoIP client in advance. In addition, the calling terminal needs to register with the VoIP server in advance. A registration process is similar to a registration process of the called terminal. Details are not described herein again. A corresponding VoIP client is installed on the calling terminal, and the VoIP client may be an application.

The calling terminal 81 may be connected to the internet 86 through a cellular network, a Wi-Fi network, or the like, and the called terminal may be connected to the internet 87 through a Wi-Fi network, a cellular network, or the like.

When a preset trigger condition is met, the calling terminal 81 further determines whether a Silent Redial trigger condition is met, and if it is allowed to trigger Silent Redial, hangs up the cellular call, and automatically triggers the VoIP call. Silent Redial refers to background or autonomous redialing.

The preset trigger condition may include timeout trigger and/or network disconnection trigger.

The preset trigger condition includes only the timeout trigger.

Timeout trigger means that when duration from time when the calling terminal initiates the call to time when the called terminal rings exceeds a preset time threshold, the step of determining whether a Silent Redial trigger condition is met is entered. Alternatively, if duration from time when the calling terminal initiates the call to time when the called terminal rings does not exceed a preset time threshold, the step of determining whether a Silent Redial trigger condition is met is not entered.

In a specific application, when initiating the call, the calling terminal 81 may synchronously start a T-Alerting (Timer of Alerting) timer. The T-Alerting timer starts timing when the call is initiated, and the T-Alerting time stops timing when a message indicating that the called terminal rings or the call ends is received. If the duration recorded by the timer is greater than or equal to the preset time threshold, it is considered that timeout trigger occurs, and whether the Silent Redial trigger condition is met may be determined. By way of example and not limitation, the preset time threshold is 15s, that is, if the duration from the call initiation to ringing exceeds 15s, the Silent Redial trigger condition is determined.

The preset trigger condition includes only the network disconnection trigger.

The network disconnection trigger may include a network error code scenario and a network exception scenario. The calling terminal 81 may enter a process of determining a Silent Redial trigger condition when receiving a network error code or when a network exception occurs. Alternatively, if the calling terminal does not receive a network error code or no network exception occurs, a process of determining a Silent Redial trigger condition is not performed.

The network exception scenario may include, for example, a case in which a call is disconnected upon dialing, for example, a case in which the caller initiates the cellular call but there is no ringback tone.

In the network error code scenario, when a specific situation occurs in the operator network, the calling terminal 81 obtains the network error code returned by the operator network. By way of example and not limitation, Table 1 shows several possible network error codes.

TABLE 1

| Whether to trigger Silent Redial | User scenario | Network error code corresponding to a VoLTE call | Network error code corresponding to a CS call |
| --- | --- | --- | --- |
| Yes | The peer end is unreachable (Timeout) | IMS_REQ_TIME_OUT_408 | |
| | The peer end is unreachable (An exception occurs in addressing) | IMS_NOT_FOUND_404 | UNOBTATINABLE_NUMBER |
| | The peer end is unreachable (An exception occurs in establishing a link resource) | IMS_PRECOND_FAIL_580 | NO_CIRCUIT_AVAIL |
| | The peer end is unreachable (An exception occurs in an intermediate network element) | IMS_SERVICE_UNAVAIL_503 | |
| | The peer end is unreachable (Temporary cause) | IMS_SERVER_INTERNAL_ERROR_500 | NORMAL_UNSPECIFIED |
| | The peer end is unreachable (Temporarily unreachable) | IMS_TEMP_UNAVAIL_480 | TEMPORARY_FAILURE |
| | The peer end is unreachable (The call is prohibited) | | CALL_BARRED |
| No | Others | IMS_NORMAL Other | Normal Other |

It may be understood that the network error codes in Table 1 are merely examples. In a specific application, types and a quantity of network error codes are not limited thereto.

The preset trigger condition includes the timeout trigger and the network disconnection trigger.

In this case, if timer duration is less than the preset time threshold, and no network error code is received or no exception occurs in the network, a process of determining a Silent Redial trigger condition is not performed. Alternatively, if timer duration is greater than the preset time threshold, and/or a network error code is received or an exception occurs in the network, a process of determining a Silent Redial trigger condition is performed.

Certainly, if the timer duration is greater than the preset time threshold, whether the network disconnection trigger condition is met may not be determined, and the process of determining a Silent Redial trigger condition may be directly performed.

By way of example and not limitation, the preset time threshold is 15s. Before 15s, if the network disconnection trigger condition is met, the calling terminal performs the process of determining a Silent Redial trigger condition; or if the network disconnection trigger condition is not met, the calling terminal does not perform the process of determining a Silent Redial trigger condition, and the timer keeps timing. When the timer duration reaches 15s, the calling terminal performs the process of determining a Silent Redial trigger condition.

After triggering the process of determining a Silent Redial trigger condition, the calling terminal may first query a capability of the peer end to obtain information about the called terminal, and then determine whether to perform Silent Redial based on the information about the called terminal. Through querying the capability of the peer end, the calling terminal can determine whether the called terminal is registered with the VoIP server.

In a specific application, the calling terminal may obtain the information related to the called terminal from the VoIP server. The related information of the called terminal may include but is not limited to whether the called terminal has been registered with the VoIP server, the signal status of the operator network of the called terminal, whether the called terminal has enabled the call forwarding service, whether a communication link exists between the called terminal and the VoIP server, and the like.

In some other embodiments, the obtained information related to the called terminal may further include ringing record information of the called terminal.

For example, if the following condition is met, it is determined that the Silent Redial trigger condition is met: The called terminal has no signal of the operator network or the signal of the operator network is poor, the called terminal does not enable the call forwarding service, the called number is successfully matched, and the VoIP client on the called terminal is in a service state. That is, a condition for allowing triggering of Silent Redial is as follows: (Phone==No Service && The called number is successfully matched && Call forwarding is disabled) && (VoIP==On Service). No Service may include a scenario in which there is no signal of the operation network, a scenario in which the signal is weak, or a scenario in which the call service cannot be stably provided. The signal is weak may mean that the signal of the operator network is lower than a specific threshold.

That the called number is successfully matched means that the called number carried in the VoIP call is consistent with the called number locally stored in the VoIP server. That call forwarding is disabled means that the called terminal does not enable any call forwarding service. VoIP On Service may mean that the communication link exists between the called terminal and the VoIP server, or that the VoIP client on the called terminal is in an online state.

For another example, a condition for allowing triggering of Silent Redial may also be as follows:
(Phone==No Service && The called number is successfully matched && Call forwarding is disabled && The called terminal does not ring) && (VoIP==On Service).

In this trigger condition, whether the called terminal rings is added to the condition for triggering Silent Redial. Whether the called terminal rings means whether the called terminal receives the cellular call initiated by the calling terminal through the operator network. If the called terminal has received the initiated cellular call through the operator network, but actually the user does not answer the call, it indicates that the user may not want to answer the call. To ensure user experience, Silent Redial is not triggered.

In some other embodiments, the calling terminal may also directly communicate with the called terminal to obtain the information related to the called terminal rather than obtaining the information related to the called terminal by using the server. After the calling terminal communicates with the called terminal and obtains the information related to the called terminal, the calling terminal determines the Silent Redial trigger condition based on the information related to the called terminal. The process is similar to that described above, and is not described herein again.

It should be noted that, after determining that the VoIP call needs to be initiated to the called terminal, the calling terminal may directly initiate the VoIP call to the called terminal, or may initiate the VoIP call to the called terminal after confirmation of the user. For example, after determining that the VoIP call needs to be initiated to the called terminal, the calling terminal may pop up a prompt window, where the prompt window may be used to prompt the user whether to initiate the VoIP call. If the calling terminal obtains a confirmation instruction entered by the user, the calling terminal initiates the VoIP call to the called terminal.

In Second call solution mentioned above, after the calling terminal initiates the cellular call to the called terminal, when the specific trigger condition (for example, the timeout trigger and/or the network disconnection trigger) is met, the calling terminal may query the information related to the called terminal first, and then after determining that the VoIP call can be initiated, automatically hangs up the current cellular call and initiates the VoIP call to the called terminal.

However, in some other embodiments, before initiating the cellular call to the called terminal, the calling terminal may first perform a call initiation determining process, that is, the calling terminal may first determine whether to initiate the cellular call, initiate the cellular call to the called terminal when a specific condition is met, and then determines whether the preset trigger condition is met.

In a specific application, the calling terminal may determine, based on a signal status of a calling-side cellular network and/or a signal status of a called-side cellular network, whether to initiate the cellular call to the called terminal.

In an implementation, the calling terminal obtains signal strength and signal quality of a signal of the calling-side cellular network. If the signal strength of the signal of the calling-side cellular network is less than a signal strength threshold, or the signal quality is less than a signal quality threshold, or the signal strength and the signal quality each are less than a threshold, the calling terminal may determine not to initiate the cellular call, and then enter a process of obtaining the information related to the called terminal and determining, based on the information related to the called terminal, whether to initiate the VoIP call, or may directly initiate the VoIP call.

If the signal strength of the signal of the calling-side cellular network is higher than a signal strength threshold and the signal quality is higher than a signal quality threshold, the calling terminal determines to initiate the cellular call, and initiates the cellular call to the called terminal.

In another implementation, the calling terminal and the called terminal each are in communication connection to the VoIP server, and the called terminal may report the signal status of the called-side cellular network to the VoIP server. In this case, before initiating the VoIP call to the called terminal, the calling terminal may obtain status information of the called terminal from the VoIP server, where the status information may include the signal status of the called-side cellular network and VoIP status information. Alternatively, after the calling terminal and the called terminal are connected by using the VoIP server, the calling terminal may query the called terminal by using the VoIP server, to obtain status information of the called terminal. In this way, the VoIP server may not need to cache the status information of the called terminal. If signal strength of the cellular network of the called terminal is lower than a signal strength threshold, and/or signal quality is lower than a signal quality threshold, the calling terminal may determine not to initiate the cellular call, and then determine, based on the information (for example, the VoIP status information) related to the called terminal, whether to initiate the VoIP call, or may directly initiate the VoIP call.

The VoIP status information may include but is not limited to whether the called terminal has been registered with the VoIP server, whether the called terminal is in communication connection to the VoIP server, and the like.

If signal strength of a signal of the called-side cellular network is higher than a signal strength threshold and the signal quality is higher than a signal quality threshold, the calling terminal determines to initiate the cellular call, and initiates the cellular call to the called terminal.

In still another implementation, the calling terminal determines, based on a signal of a calling-side cellular network and a signal of a called-side cellular network, whether to initiate the cellular call. Specifically, if signal strength and signal quality of a signal of the calling-side cellular network each are greater than a corresponding threshold, and signal strength and signal quality of a signal of the called-side cellular network each are greater than a corresponding threshold, the calling terminal determines to initiate the cellular call, and initiates the cellular call to the called terminal. Alternatively, if at least one of the following exists: If signal quality of a signal of the calling-side cellular network is lower than a signal quality threshold, signal strength of a signal of a calling-side cellular network is lower than a signal strength threshold, signal quality of a signal of a called-side cellular network is lower than a signal quality threshold, or signal strength of a signal of a called-side cellular network is lower than a signal strength threshold, the calling terminal determines not to initiate the cellular call, and determines, based on the VoIP status information of the called terminal and the like, whether to initiate the VoIP call, or may directly initiate the VoIP call.

In some other embodiments, when the cellular call drops, the calling terminal may automatically determine whether the VoIP call can be initiated, and if the VoIP call can be initiated, automatically initiate the VoIP call to the called terminal. Specifically, a cellular call connection has been established between the calling terminal and the called terminal. Due to a specific reason, the cellular call connection between the calling terminal and the called terminal is disconnected, that is, the cellular call drops. In this case, the calling terminal may first query the information related to the called terminal, where the information related to the called terminal may include, for example, whether the called terminal has registered with the VoIP server, and whether a communication connection exists between the called terminal and the VoIP server. Then, the calling terminal may determine, based on the information related to the called terminal, whether the VoIP call can be initiated, and if the VoIP call can be initiated, automatically initiate the VoIP call to the called terminal. If the called terminal has registered with the VoIP server (for example, the calling terminal may find, from the VoIP server, a number consistent with the called number), and a communication link exists between the called terminal and the VoIP server (for example, the called terminal communicates with the VoIP server by using a cellular network or a Wi-Fi network), the calling terminal determines that the VoIP call can be initiated.

The cellular network signal strength threshold and the cellular network signal quality threshold mentioned above may be used to represent quality of a signal of a cellular network. The quality of the signal of the cellular network may affect whether the cellular call connection can be established between the calling terminal and the called terminal, whether the cellular call connection and call quality are stable, and the like.

In this solution, the calling terminal 81 may have a plurality of dialing manners, which are described below with reference to FIG. 8B-1 to FIG. 8D-5.

As shown in FIG. 8A, when the cellular call is unreachable, the calling terminal 81 may automatically switch to the VoIP call.

Figures 1, 8B:
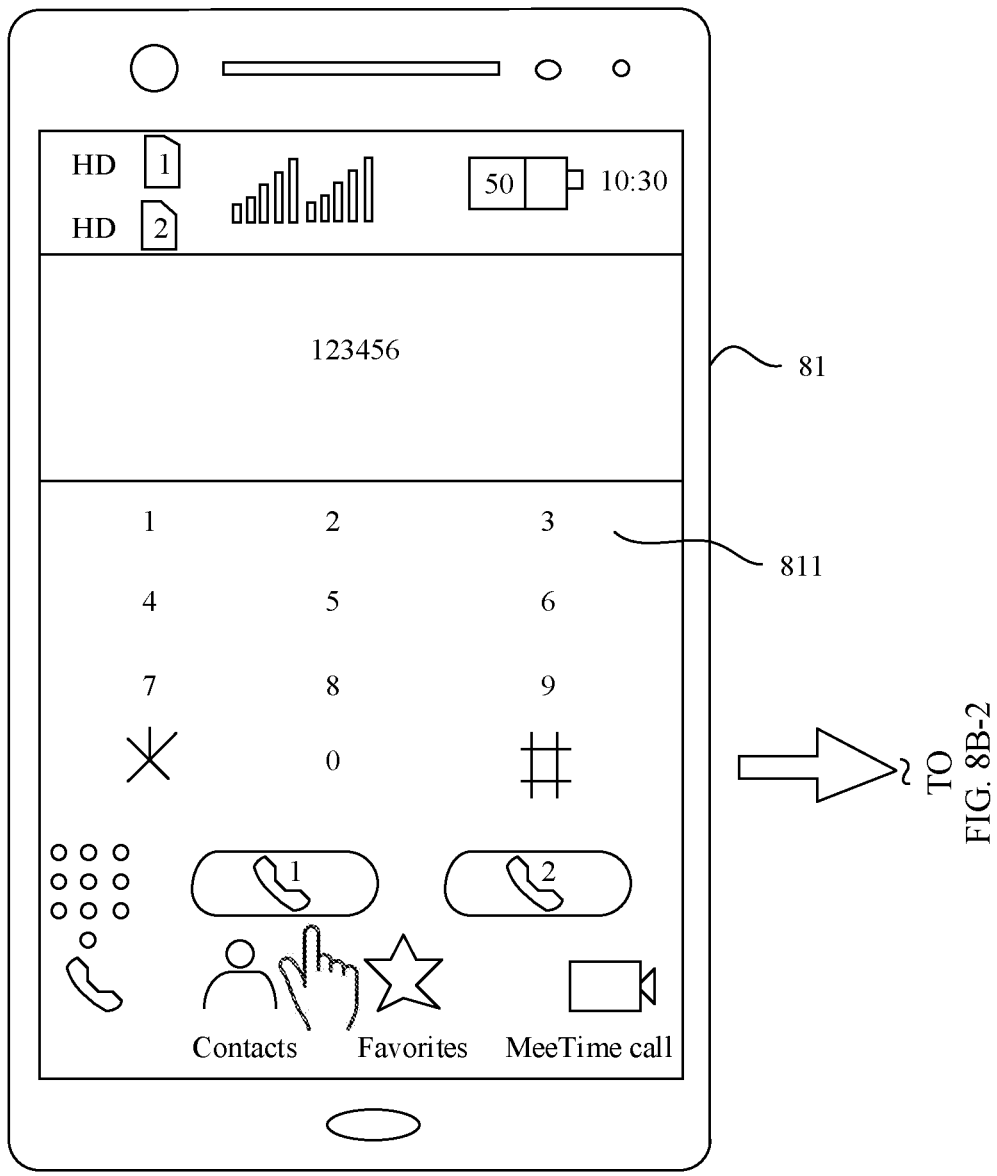
Figures 2, 8B:
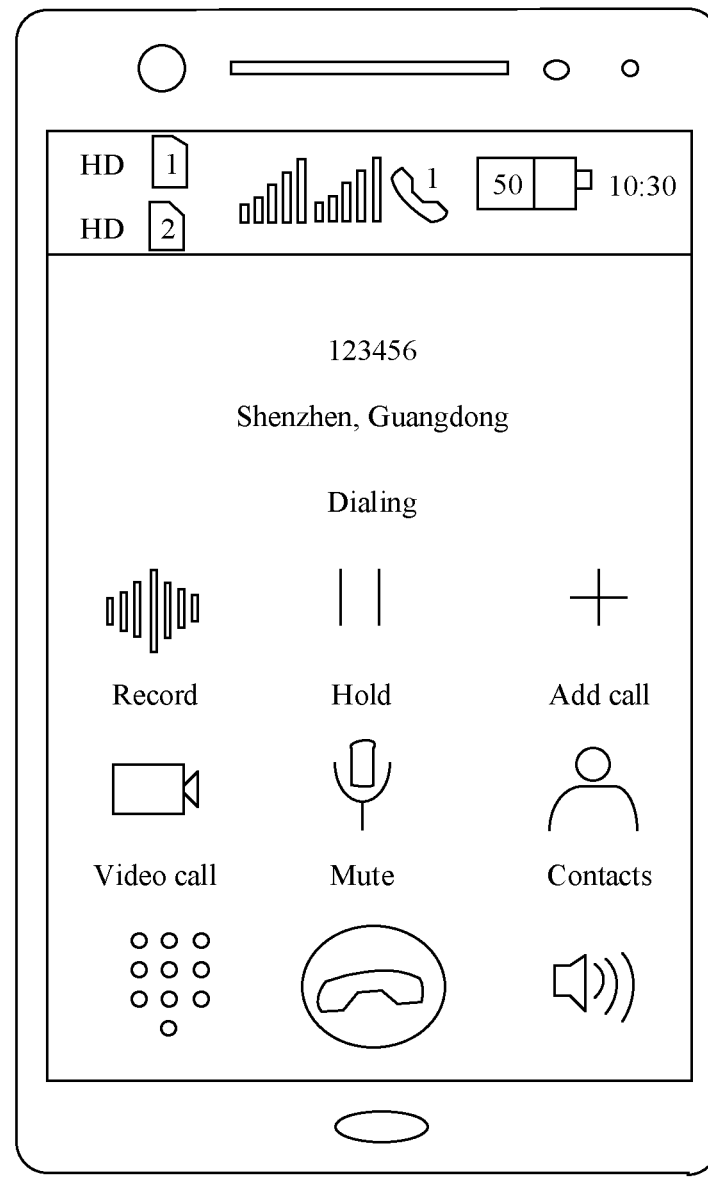
Figures 3, 8B:
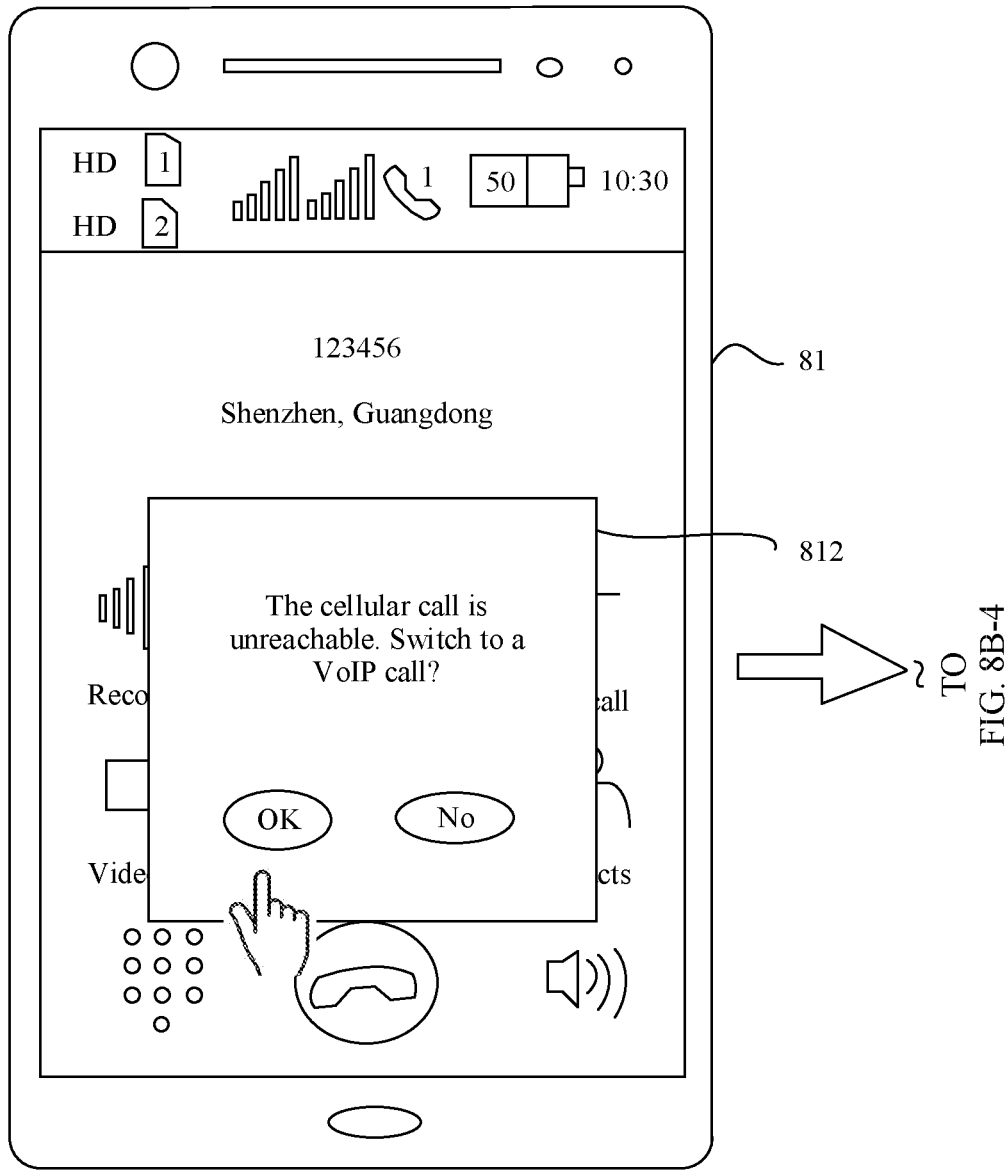
Figures 4, 8B:
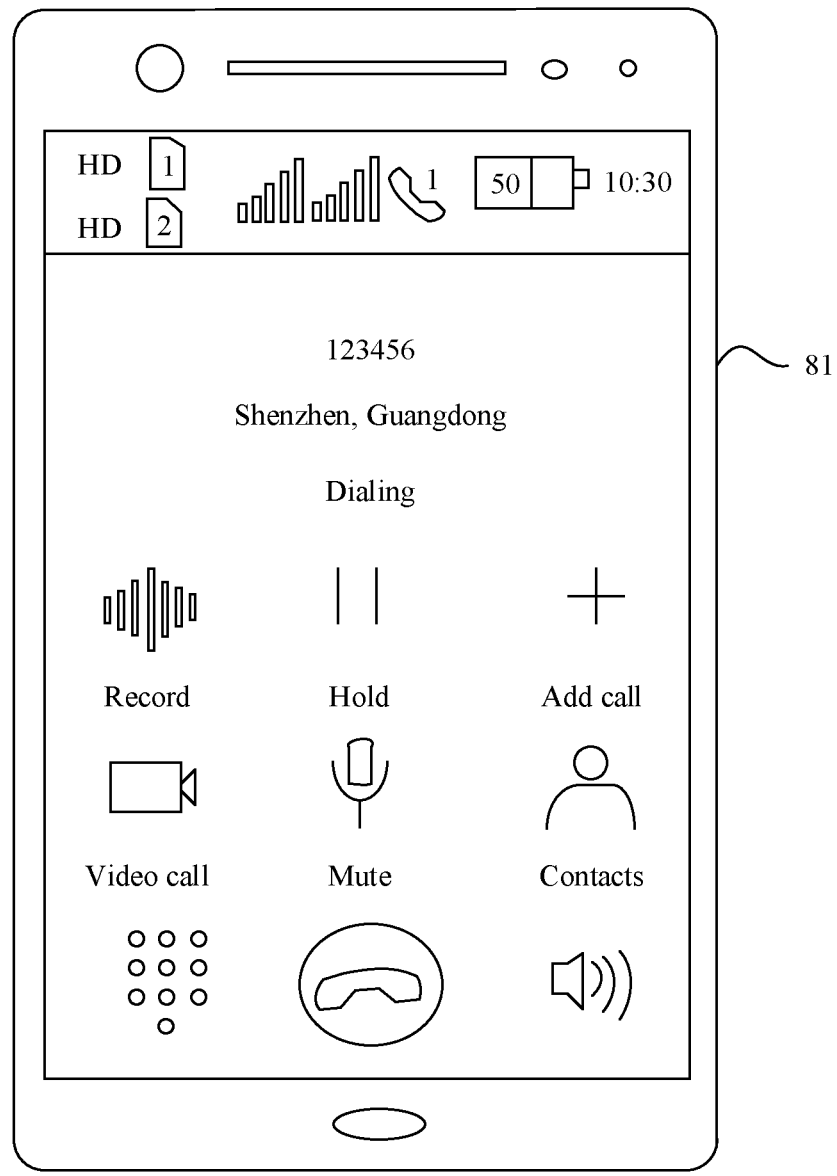

As shown in FIG. 8B-1 to FIG. 8B-4, the calling terminal 81 receives, in a dialing interface 811, a dialing operation triggered by the user, and the calling terminal 81 initiates a cellular call request to the number 123456, and displays the dialing interface to prompt the user that dialing is in progress. In this case, the calling terminal 81 transfers, to the called-side network, the cellular call request to the number 123456, and the called-side network may page the number 123456. When the paging fails, the called-side network may return a message to the calling terminal 81, to notify the calling terminal 81 that the paging fails. The message may include, for example, information such as the foregoing network error code. After receiving the message, the calling terminal 81 may display prompt information 812, so as to prompt the user whether to switch to the VoIP call when the current cellular call is unreachable. If the user selects "OK", the calling terminal 81 initiates the VoIP call to 123456.

Certainly, in some other embodiments, when initiating the cellular call to 123456, the calling terminal 81 performs timing by using the timer, and may also display prompt information 812 when the foregoing timeout trigger is met.

Further, when receiving the network error code returned by the network side, or detecting that timeout trigger is met, the calling terminal 81 may first query the information such as the VoIP capability of the called terminal, the device status of the called terminal, and the VoIP status, and determine, based on the information, whether the VoIP call can be initiated to the called terminal associated with the number 123456. If the VoIP call can be initiated to the called terminal, the calling terminal 81 displays the prompt information 812. If the VoIP call cannot be initiated to the called terminal, the calling terminal 81 may also display the prompt information 812, but the "OK" option becomes unavailable in this case. Alternatively, when determining that the called terminal does not meet a condition of the VoIP call, the calling terminal 81 may also display prompt information to inform that the peer device does not support the VoIP call or does not meet the condition of the VoIP call. For a process of querying the information such as the VoIP capability of the called terminal, the device status of the called terminal, and the VoIP status, and a process of determining whether the VoIP can be initiated based on the information, refer to the foregoing corresponding content. Details are not described herein again.

Figures 1, 8C:
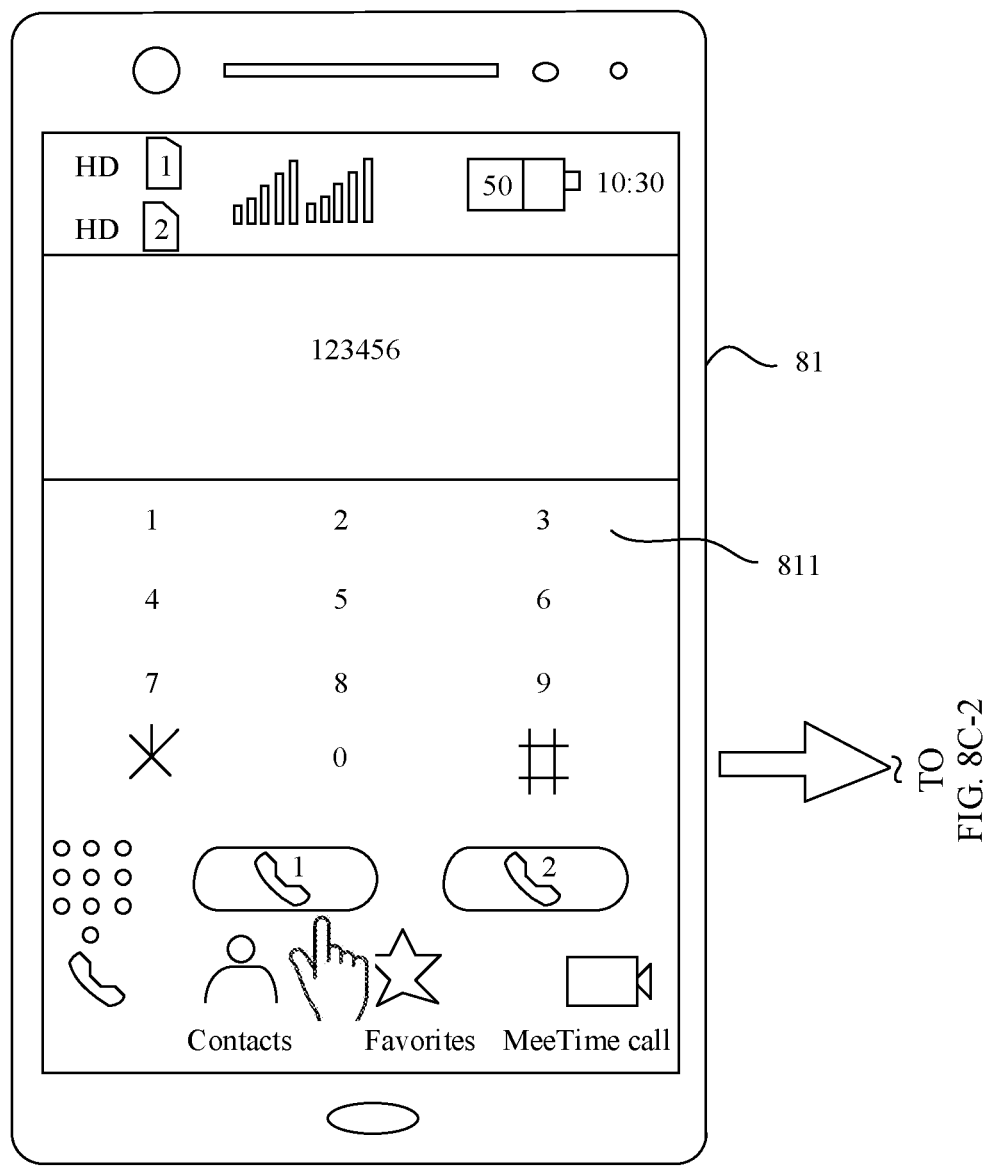
Figures 2, 8C:
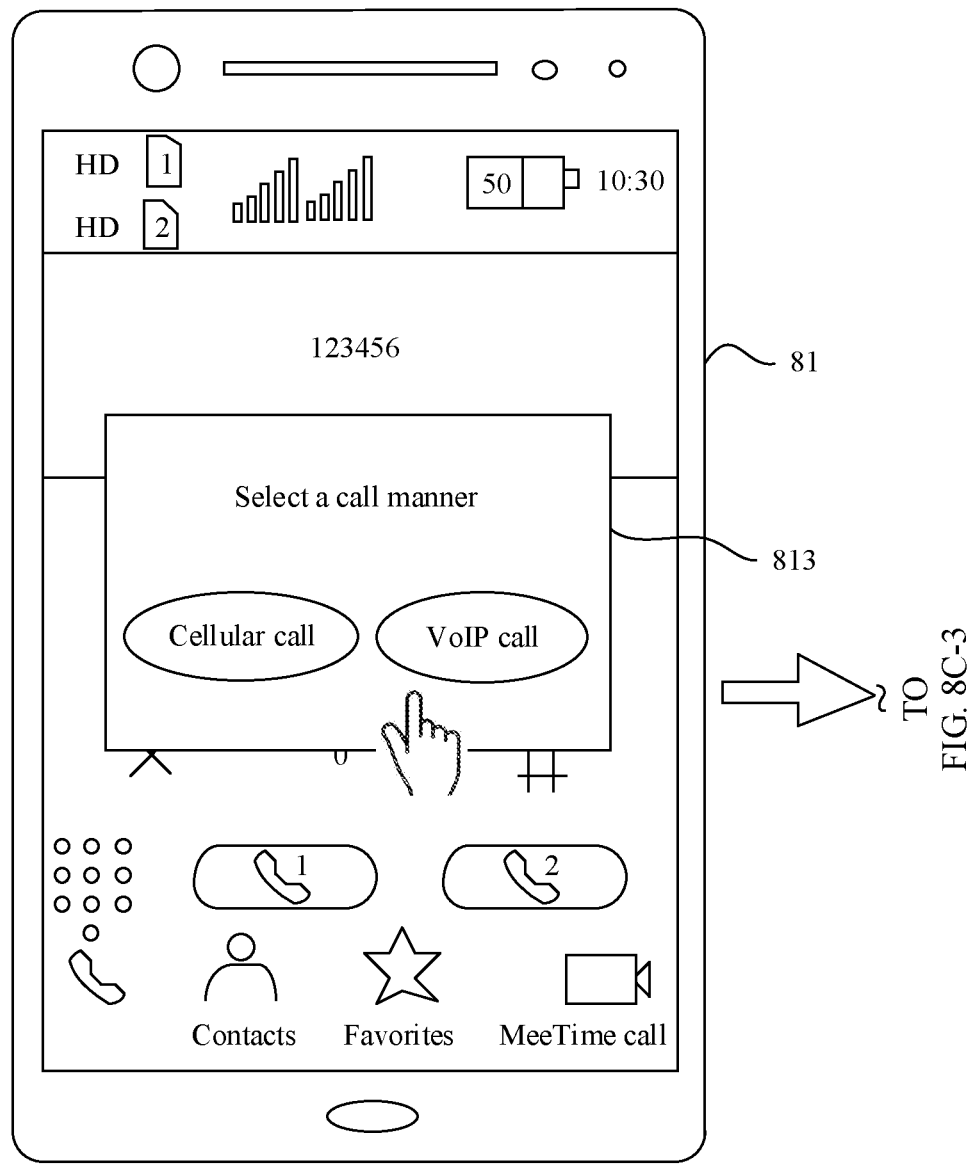
Figures 3, 8C:
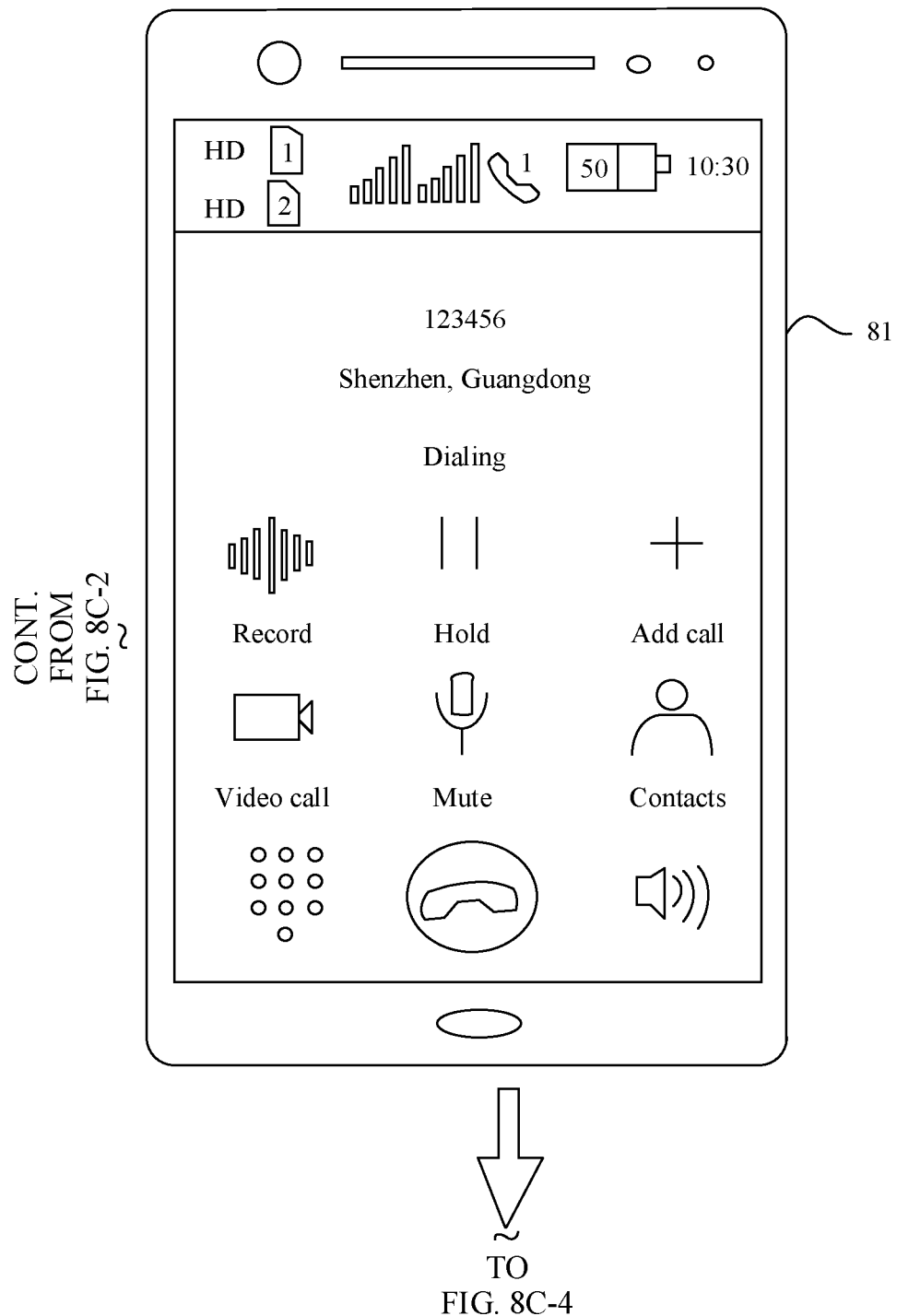
Figures 4, 8C:
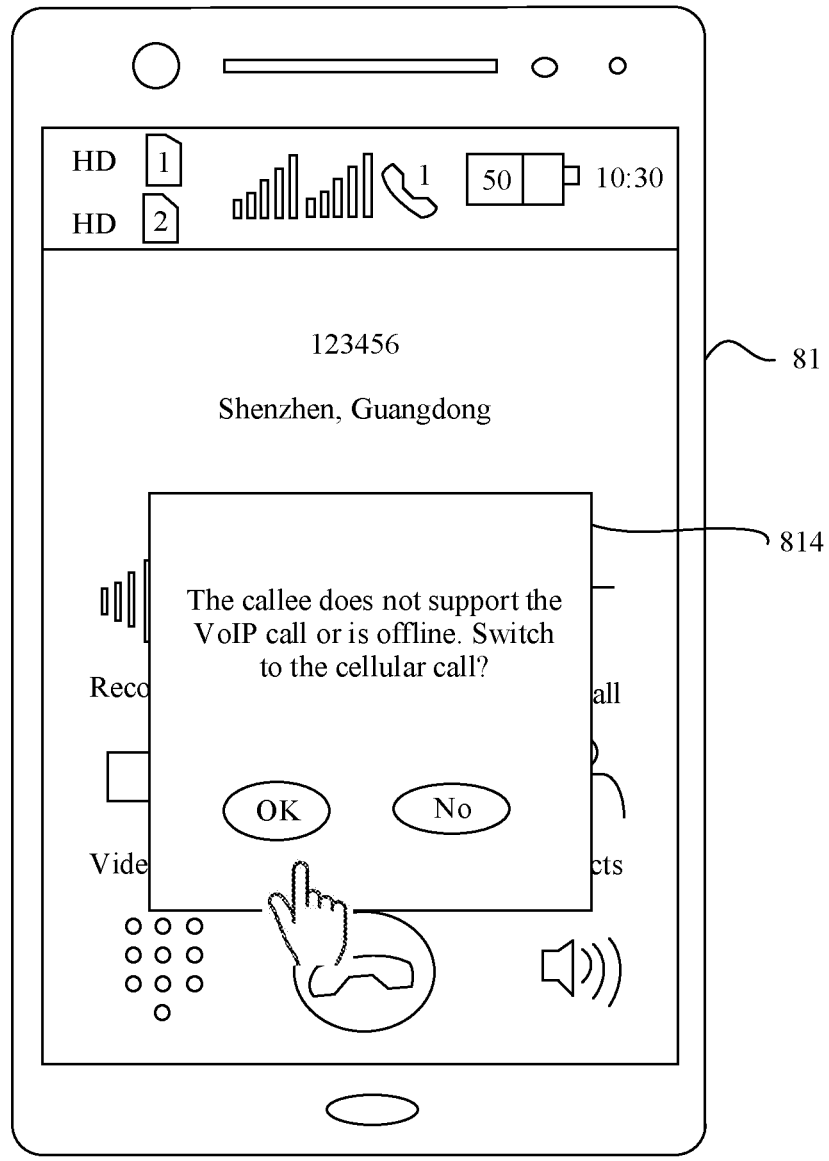
Figures 5, 8C:
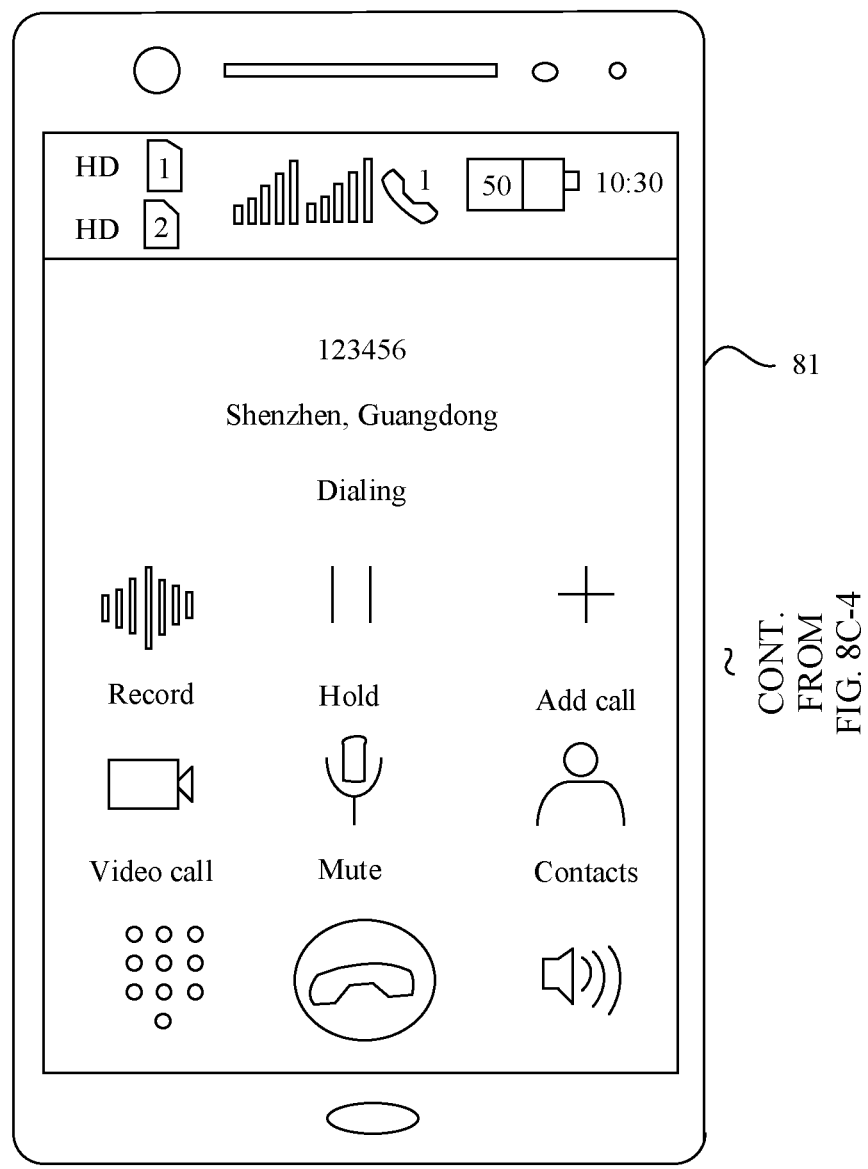

As shown in FIG. 8C-1 to FIG. 8C-5, the calling terminal 81 receives, in the dialing interface 811, a dialing operation triggered by the user; then, the calling terminal 81 displays prompt information 813 to prompt the user to select a call manner; and when the user selects the VoIP call, the calling terminal 81 initiates the VoIP call to the number 123456. The VoIP request to the number 123456 is first transferred to the VoIP server. When the device corresponding to the number 123456 does not support the VoIP call or the VoIP client corresponding to the number 123456 is offline, the VoIP server returns a message to the calling terminal 81. After receiving the message, the calling terminal 81 displays prompt information 814, so as to inform the user whether to switch to the cellular call when the VoIP call fails. If the user selects "OK", the calling terminal 81 initiates the cellular call to the number 123456.

Certainly, in some other embodiments, before displaying the prompt information 813, the calling terminal 81 may further first determine whether the peer device associated with the number 123456 supports the VoIP call or whether the peer device is online. Specifically, the calling terminal 81 may send a query request to the VoIP server to query the VoIP capability information corresponding to the number 123456. If it is found that the number 123456 is not registered with the VoIP server or the VoIP client on the device associated with the number is offline, a VoIP call option in the prompt information 813 becomes unavailable.

Figures 1, 8D:
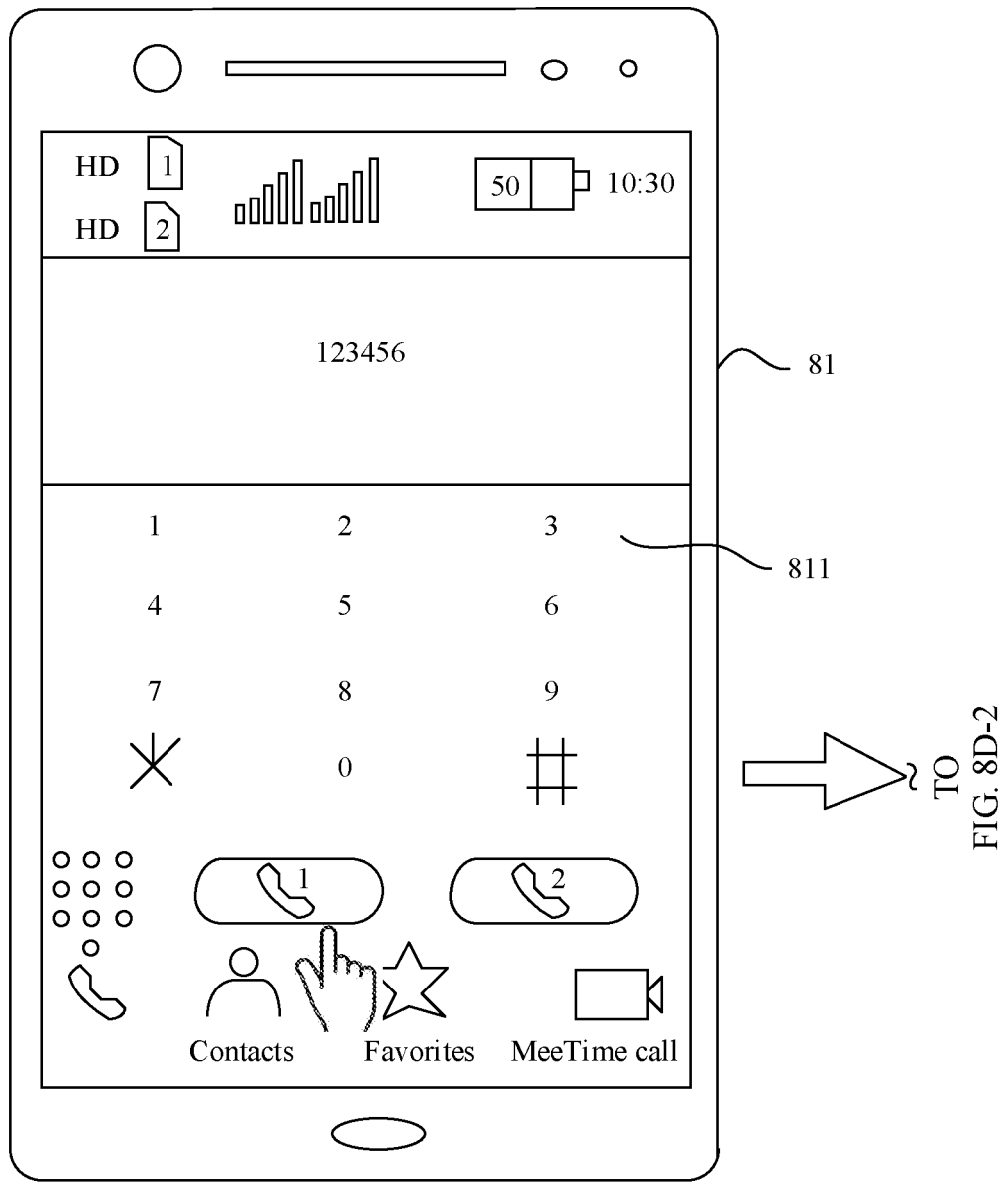
Figures 2, 8D:
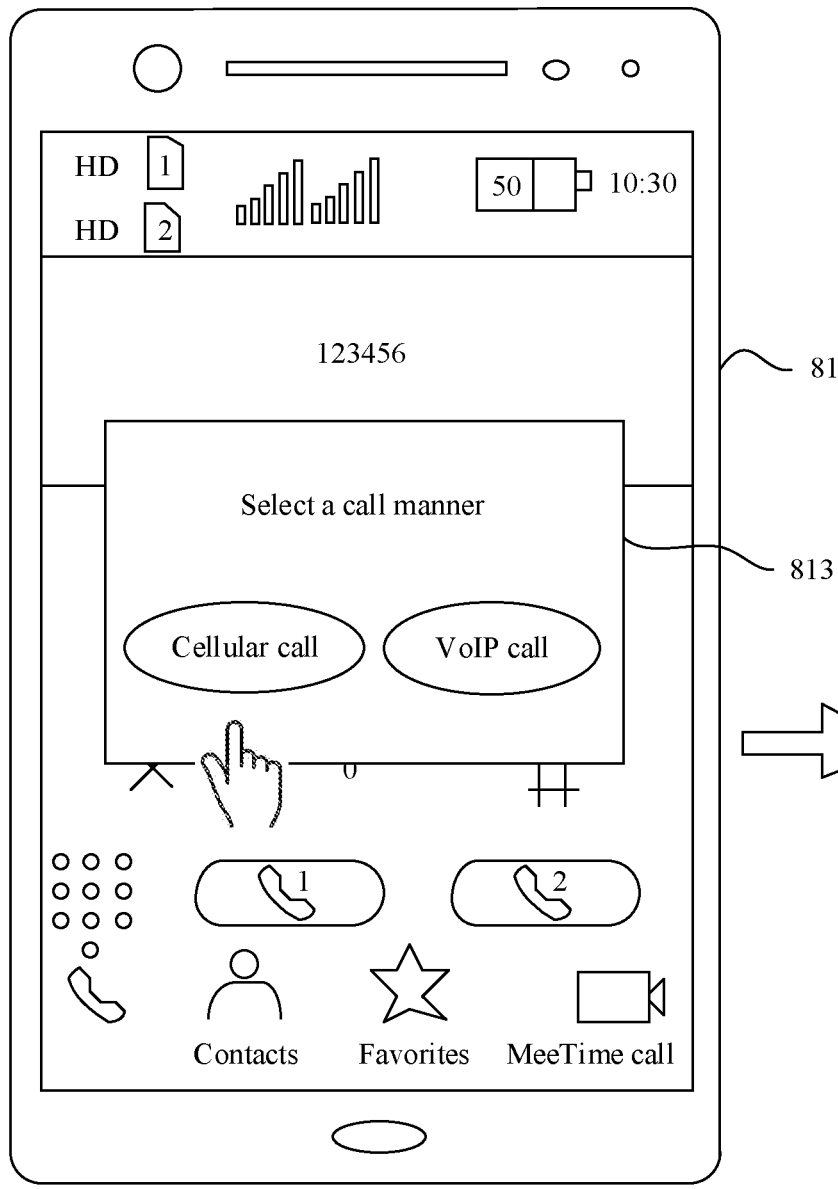
Figures 3, 8D:
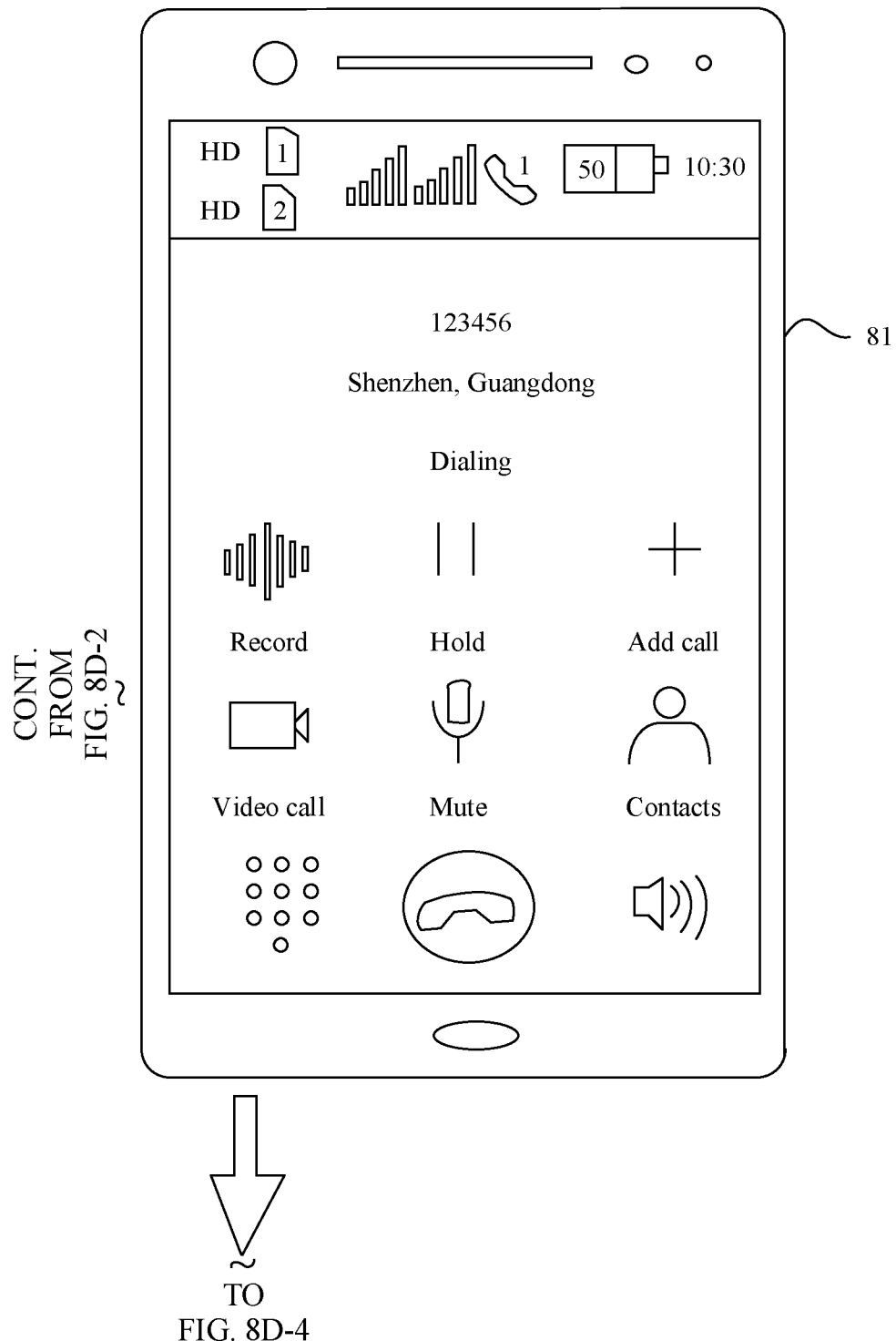
Figures 4, 8D:
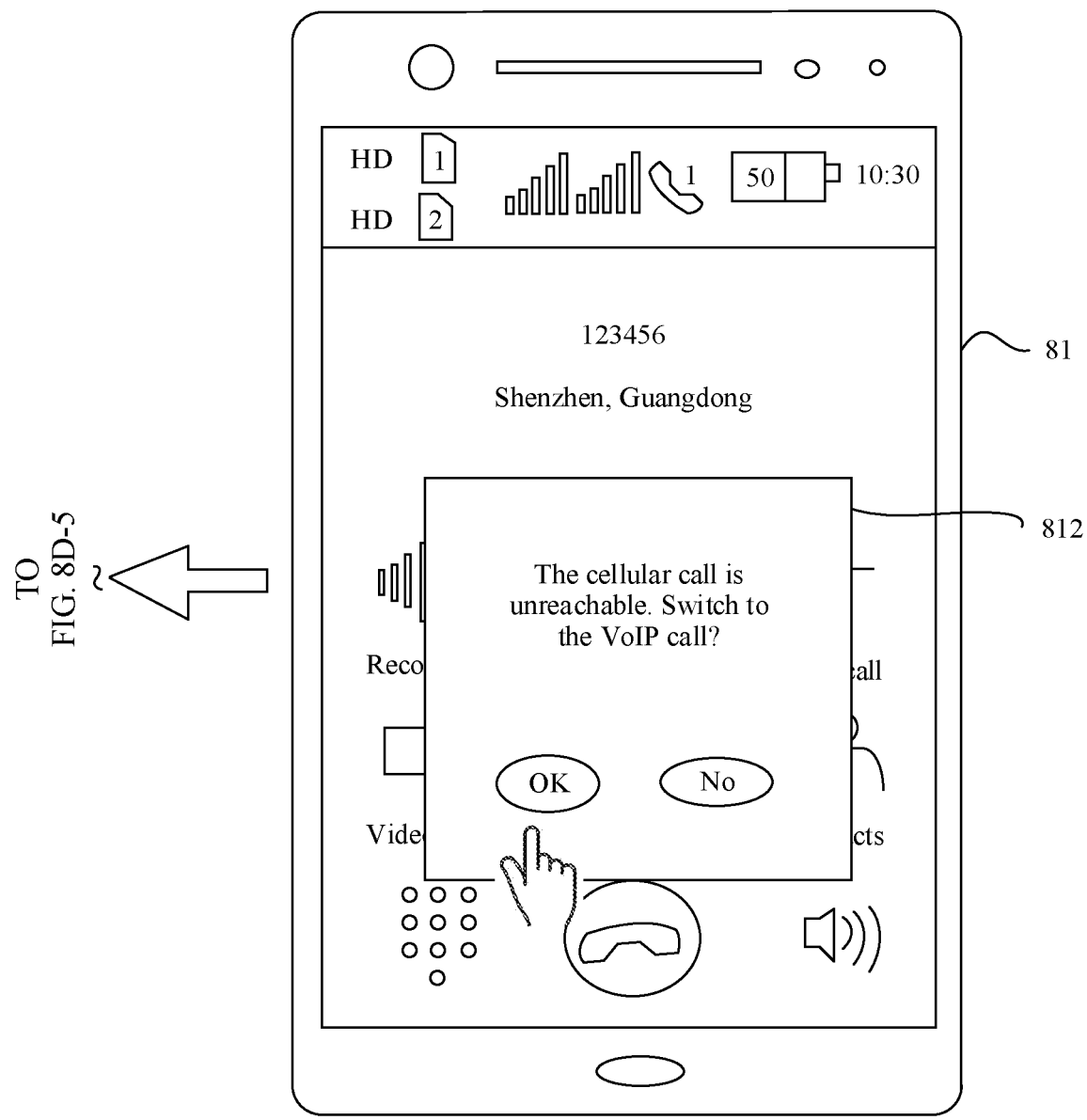
Figures 5, 8D:
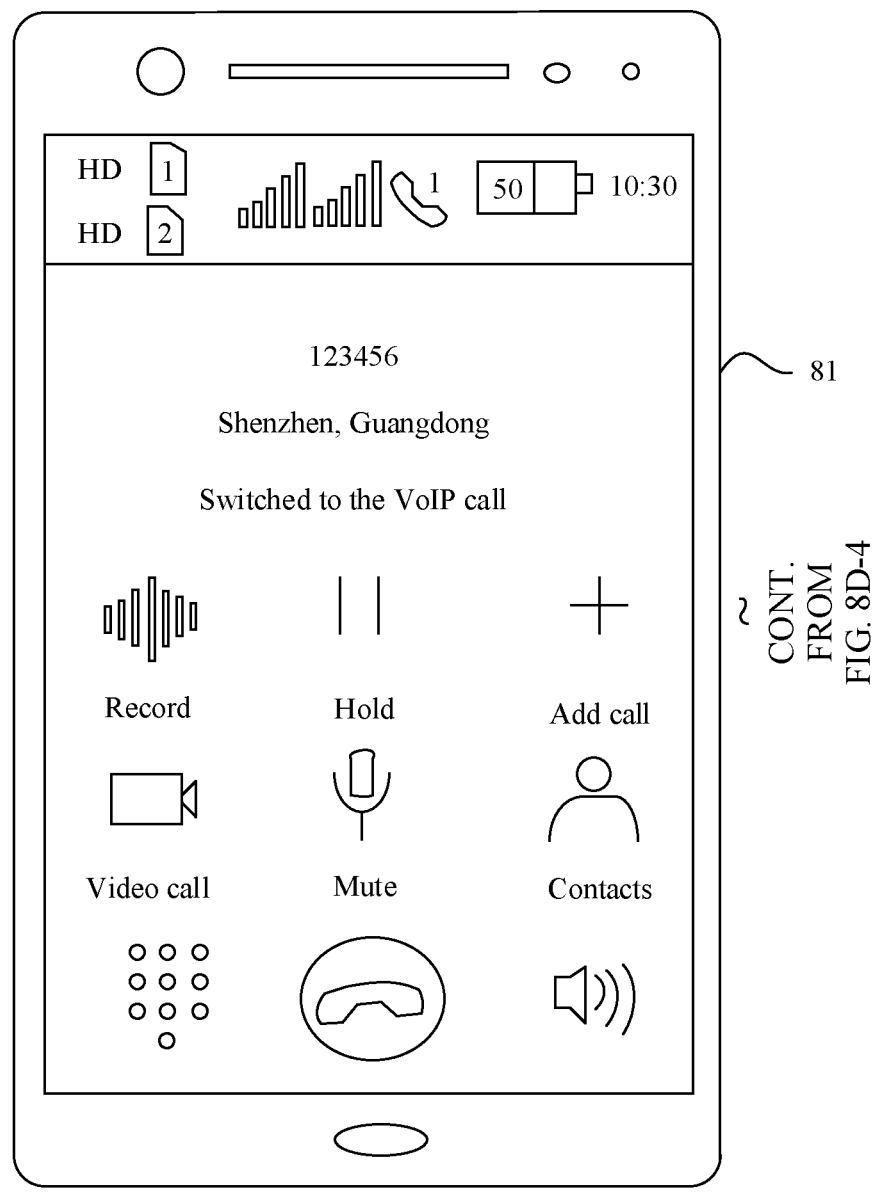

As shown in FIG. 8D-1 to FIG. 8D-5, the calling terminal 81 receives, in the dialing interface 811, a dialing operation triggered by the user; then, the calling terminal 81 displays prompt information 813 to prompt the user to select a call manner; and when the user selects the cellular call, the calling terminal 81 initiates the cellular call to the number 123456. The cellular call request is first transferred to the called-side network. The called-side network may page the number 123456. When the paging fails, the called-side network may return a message to the calling terminal 81, to notify the calling terminal 81 that the paging fails. The message may include, for example, information such as the foregoing network error code. After receiving the message, the calling terminal 81 may display prompt information 812, so as to prompt the user whether to switch to the VoIP call when the current cellular call is unreachable. If the user selects "OK", the calling terminal 81 initiates the VoIP call to 123456.

Certainly, in some other embodiments, when initiating the cellular call to 123456, the calling terminal 81 performs timing by using the timer, and may also display prompt information 812 when the foregoing timeout trigger is met. Further, when receiving the network error code returned by the network side, or detecting that timeout trigger is met, the calling terminal 81 may first query the information such as the VoIP capability of the called terminal, the device status of the called terminal, and the VoIP status, and determine, based on the information, whether the VoIP call can be initiated to the called terminal associated with the number 123456. If the VoIP call can be initiated to the called terminal, the calling terminal 81 displays the prompt information 812. If the VoIP call cannot be initiated to the called terminal, the calling terminal 81 may also display the prompt information 812, but the "OK" option becomes unavailable in this case. Alternatively, when determining that the called terminal does not meet a condition of the VoIP call, the calling terminal 81 may also display prompt information to inform that the peer device does not support the VoIP call or does not meet the condition of the VoIP call. For a process of first querying the information such as the VoIP capability of the called terminal, the device status of the called terminal, and the VoIP status, and a process of determining whether the VoIP can be initiated based on the information, refer to the foregoing corresponding content. Details are not described herein again.

It can be learned from the above that, before initiating the cellular call, the calling terminal may first perform the call initiation decision procedure, that is, first determine whether the cellular call can be initiated; initiate the cellular call to the called terminal if the cellular call can be initiated; or query a capability of the peer end if the cellular call cannot be initiated, so as to obtain the VoIP capability information, VoIP status information, and the like about the called terminal; and then determine, based on the information related to the called terminal, whether to initiate the VoIP call. Further, when the user performs the dialing operation, the calling terminal may further pop up a call manner selection interface, so that the user selects whether to use the VoIP call or the cellular call. In addition, the calling terminal may further display the call manner selection interface based on a call initiation decision result.

For example, FIG. 8C-1 to FIG. 8D-5 each are a schematic diagram of a call manner selection interface popped up by the calling terminal after the user inputs the to-be-dialed mobile phone number to the calling terminal. The call manner selection interface displays two options: "Cellular call" and "VoIP call", so that the user can select one of the call manners as required.

Further, after the calling terminal obtains the mobile phone number entered by the user, the calling terminal may first perform the call initiation decision procedure, and determine, based on the calling-side network status and/or the called-side network status, whether the cellular call can be initiated. If the cellular call cannot be initiated, "Cellular call" becomes unavailable in the displayed call manner selection interface. Specifically, "Cellular call" turns gray or black. That is, the user cannot select the cellular call manner.

Certainly, the calling terminal may further send the query request to the VoIP server based on the called number input by the user, so as to query the capability of the peer end; and after obtaining the VoIP status information of the called terminal and the status information of the mobile phone, determine, based on the information, whether the VoIP call can be initiated. If the VoIP call cannot be initiated, the "VoIP call" option in the call manner selection interface is deselected. Specifically, the "VoIP call" option turns gray or black.

In some other embodiments, when the calling terminal 81 receives the number entered by the user and receives the cellular call trigger operation of the user, the calling terminal 81 may initiate the VoIP call to the called number in response to the dialing operation of the user. For example, the user wants to initiate the cellular call to the number 123456, but the calling terminal 81 initiates the VoIP call to the number 123456 after receiving the cellular call trigger operation. In this case, the user may not perceive whether the calling terminal 81 initiates the cellular call or the VoIP call. In this case, the calling terminal 81 may first determine whether the cellular call can be initiated. For a specific determining process, refer to the foregoing related content. If it is determined that the cellular call cannot be initiated, the VoIP call may be initiated to the called number when the user wants to initiate the cellular call, but the user does not need to perceive the call manner.

Certainly, whether to use the VoIP call may also be determined based on call history records corresponding to the called number. For example, the user wants to initiate the cellular call to the number 123456, but the calling terminal finds that all the call history records corresponding to the number 123456 are VoIP calls. In this case, the calling terminal initiates the VoIP call to the number 123456 in response to the cellular call trigger operation.

It can be seen that, compared with that in FIG. 3A, in FIG. 8A, the VoIP gateway does not need to be set up, and when the paging fails, the called-side network does not need to forward the call request from the calling terminal, but the calling terminal actively determines whether to perform Silent Redial, so as to automatically hang up the current cellular call, and trigger the VoIP call.

It should be noted that, when the calling terminal 81 hangs up the cellular call and triggers the VoIP call, the dialing interface may be kept all the time, and corresponding prompt information may be provided to inform the user that the call has been switched from the cellular call to the VoIP call. In this way, the calling user does not need to manually hang up the cellular call and then manually initiate the VoIP call, so that a call operation is more intelligent and simpler.

Figure 9:
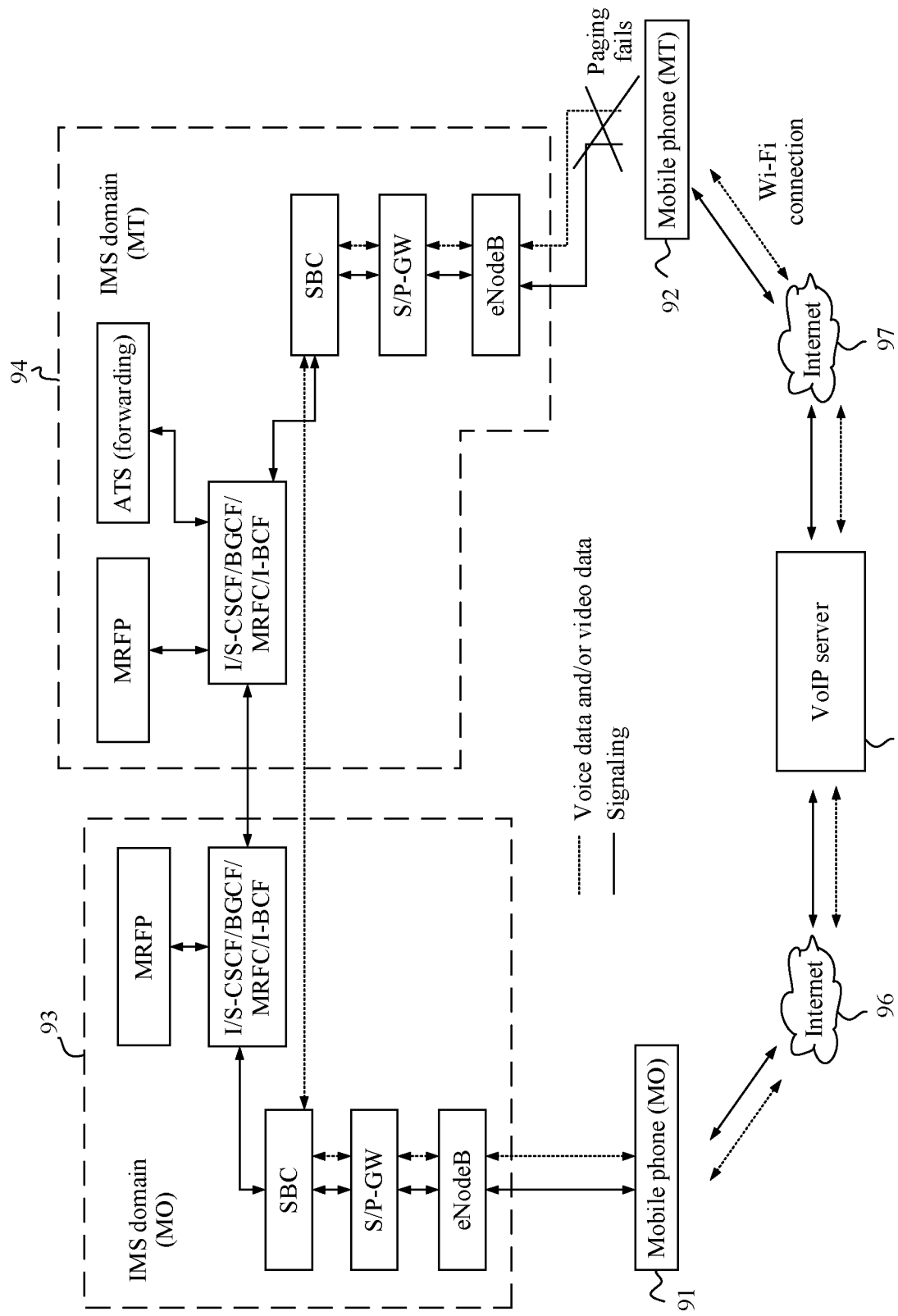
FIG. 9 is a schematic diagram of an architecture of still another call network according to an embodiment of this application.

To better understand Second call solution, the following describes in detail, with reference to FIG. 9, an architecture of a call network corresponding to Second call solution.

As shown in FIG. 9, the architecture of the call network includes an MO 91, an MT 92, an IMS network 93 of the MO, an IMS network 94 of the MT, a VoIP server 95, an internet 96, and an internet 97. For related descriptions of the IMS network 93 and the IMS network 94, refer to the content corresponding to FIG. 5. Details are not described herein again.

When a call request initiated by the MO 91 to the MT 92 cannot be transferred to the MT 92 through the IMS network 93 and the IMS network 94, the MO 91 may automatically determine whether to initiate a VoIP call, so as to automatically hang up a cellular call and trigger the VoIP call. In this way, when the cellular call is abnormal, the MO 91 can automatically switch to the VoIP call.

Compared with that in FIG. 5, the MO 91 in FIG. 9 does not include a fixed-line phone and a mobile phone that supports a CS call. In addition, the network architecture in FIG. 9 does not include a VoIP gateway of a called-side network, and the called-side network does not need to forward the call request to the VoIP gateway when paging fails.

Figure 10:
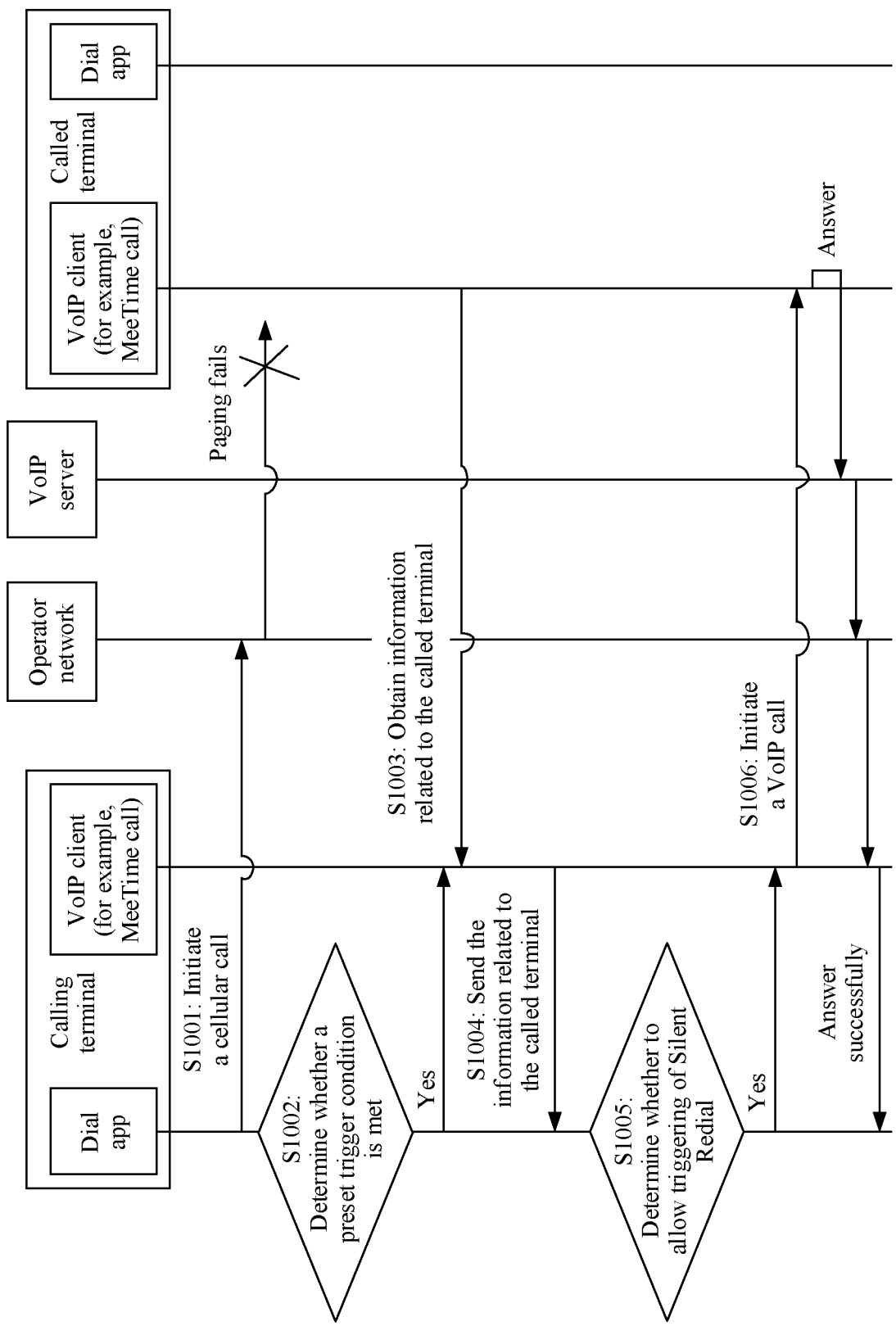
FIG. 10 is still another schematic interaction diagram of a call method according to an embodiment of this application.

Based on the architecture of the call network and the call scenario of Second call solution, the following describes in detail a call procedure of Second call solution. FIG. 10 is still another schematic interaction diagram of a call method according to an embodiment of this application. The call process may include the following steps.

Step S1001: A dial application (Dial Application, Dial app) on a calling terminal initiates a cellular call to a called terminal.

It should be noted that, in some other embodiments, before step S1001, the calling terminal may further first determine whether a condition for initiating the cellular call is met, and if the condition is met, initiate the cellular call, that is, enter step S1001. In a specific application, the calling terminal may determine, based on a signal status of a calling-side cellular network and/or a called-side cellular signal status, whether to initiate the cellular call. Generally, if signal strength of the calling-side cellular network is lower than a signal strength threshold, and/or signal quality is lower than a signal threshold, the calling terminal may determine not to initiate the cellular call, but enter a procedure in which the calling terminal may obtain information related to the called terminal and determine, based on the information related to the called terminal, whether to initiate a VoIP call, and if the VoIP call can be initiated, initiate the VoIP call to the called terminal. If both signal strength and signal quality of the calling-side cellular network are higher than a threshold, the calling terminal determines to initiate the VoIP call, and enters step S1001.

Certainly, the calling terminal may also determine, based on the signal status of the cellular network of the called terminal, whether to initiate the cellular call. In a specific application, the calling terminal may obtain, from a VoIP server, the signal status of the cellular network reported by the called terminal. A process of determining, based on the signal status of the called-side cellular network, whether to initiate the cellular call is similar to the process of determining, based on the signal of the calling-side cellular network, whether to initiate the cellular call. Details are not described herein again.

In addition, the calling terminal may also determine, based on the signal status of the calling-side cellular network and the signal status of the called-side cellular network, whether to initiate the cellular call. Step S1002: The Dial app on the calling terminal determines whether a preset trigger condition is met. The preset trigger condition includes timeout trigger and/or network disconnection trigger.

Step S1003: If the preset trigger condition is met, a VoIP client on the calling terminal obtains the information related to the called terminal.

The information related to the called terminal may include status information of the called terminal and status information of a VoIP client on the called terminal. The status information of the called terminal includes the signal of the operator network on a called terminal side, whether the called terminal subscribes to a call forwarding service, a called number, whether the callee rings, and the like. Whether the callee rings means whether the called terminal receives the cellular call initiated by the caller through the operator network.

In a specific application, the calling terminal may directly communicate with the called terminal to obtain the information related to the called terminal; or may communicate with the called terminal through the VoIP server to obtain the information related to the called terminal.

Step S1004: The VoIP client on the calling terminal transmits, to the Dial app, the obtained information related to the called terminal.

Step S1005: The Dial app of the calling terminal determines, based on the information related to the called terminal, whether to allow triggering of Silent Redial.

Step S1006: If it is allowed to trigger Silent Redial, the VoIP client on the calling terminal initiates the VoIP call to the called terminal.

It may be understood that the calling terminal and the called terminal each include a VoIP client, and the VoIP client may be specifically represented in any form. For example, the VoIP client is a MeeTime call app. Operator networks in FIG. 10 include the calling-side network and the called-side network.

The calling terminal may initiate a VoIP call request based on a communication number of the called terminal. The VoIP call request is transferred to the VoIP server through an internet. Then, the VoIP server transfers the VoIP call request to the called terminal through an internet.

It can be learned from the foregoing that, in Second call solution, the user of the calling terminal is still insensible, and steps are actively performed by the calling terminal without a user operation.

When the signal of the operator network is poor or there is no signal of the operation network, the called terminal can still receive the call request from the calling terminal, and establish a call connection to the calling terminal to implement interworking. The call procedure is the same as a normal call procedure except that call waiting time may be longer than that in the normal call procedure. In addition, the calling terminal and the called terminal do not need to add friends to each other. In addition, in the call solution, the calling terminal may actively determine, based on the information about the peer end, whether to trigger the VoIP call, and the user of the calling terminal does not need to perform an additional operation.

Compared with Secretary service, the call solution provided in this embodiment of this application can implement interworking between the calling terminal and the called terminal when the call is unreachable due to the poor network signal on the called side or another reason.

Compared with VoWi-Fi, the call solution provided in this embodiment of this application can implement interworking between the calling terminal and the called terminal through a conventional operator network when the call is unreachable.

Compared with the OTT call, the call solution provided in this embodiment of this application can implement a case in which the caller and the callee do not need to add friends to each other, and the calling user does not need to manually initiate the VoIP call when the cellular call fails.

It should be noted that for similarities between Second call solution and First call solution, refer to the foregoing corresponding content.

It can be learned from the foregoing that, for a problem that the called terminal cannot receive the call due to reasons such as the poor signal of the operator network or no signal of the operator network on the called side, the foregoing separately proposes two ideas. In the first idea, the VoIP gateway is set up on the called side, and the VoIP gateway is connected to the called-side network, so that when the paging fails, the called-side network generates the forwarding message based on the forwarding number, and routes the forwarding message to the VoIP gateway, so as to forward the call request from the calling terminal to the VoIP gateway. Then, the VoIP gateway transmits the called number obtained through parsing the forwarding message to the VoIP server, and the VoIP server queries the corresponding called terminal based on the called number, and initiates the VoIP call. In the second idea, when the paging fails, the calling terminal determines whether the specific condition is met, and if the specific condition is met, automatically hangs up the current cellular call, and triggers the VoIP call. In the two ideas, when the signal of the operator network of the called terminal is poor or there is no signal of the operator network, the called terminal can still receive the call initiated by the calling terminal and establish the call connection.

It should be noted that, in addition to the two call solutions, the foregoing two call solutions may be correspondingly combined to obtain a different call solution.

Third Call Solution

For example, in still another call solution (hereinafter referred to as "Third call solution") provided in an embodiment of this application, a VoIP gateway and a VoIP server on a called terminal side are set up, and a called-side network is connected to the VoIP gateway. In this case, if paging fails in the called-side network and a called number has been subscribed to a call forwarding unreachable service, the called-side network can forward a call request to the VoIP gateway. The VoIP gateway and VoIP server relay the call request to a called terminal, to implement interworking between the called terminal and a calling terminal. If the called number has not been subscribed to a forwarding unreachable service, a calling terminal automatically determines whether to initiate a VoIP call. If a specific condition is met, the calling terminal automatically hangs up a current cellular call and triggers the VoIP call, so as to implement interworking between the calling terminal and a called terminal.

In this call solution, the VoIP gateway needs to be deployed and the VoIP gateway needs to be connected to the called-side network. In addition, the calling terminal is connected to the VoIP server through an internet, and the called terminal is also connected to the VoIP server through an internet.

It should be noted that an architecture of a call network in Third call solution is similar to the architecture of the call network in First call solution. Based on the architecture of the call network in First call solution, the VoIP server may be separately in communication connection to the calling terminal and the called terminal through an internet.

Figure 11:
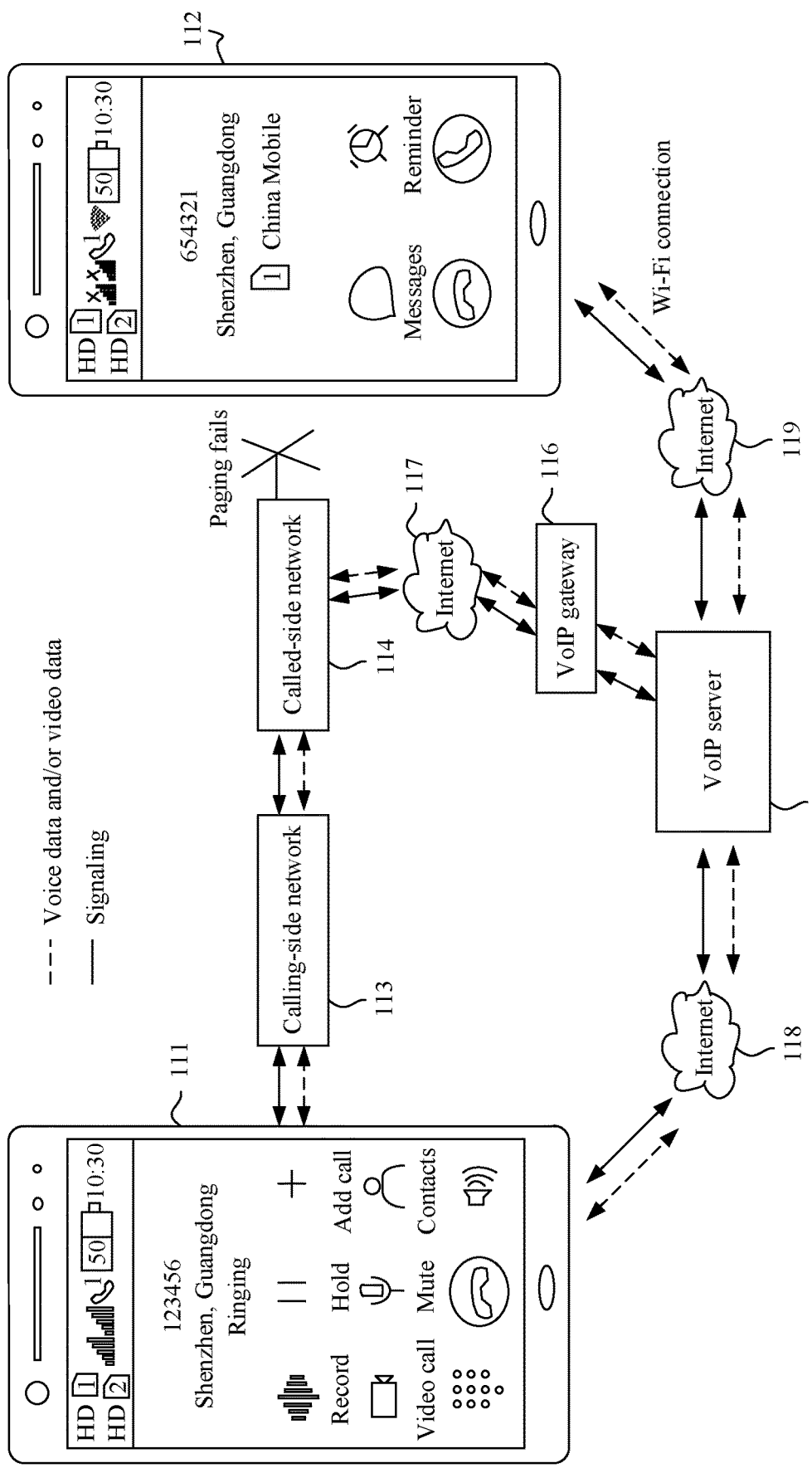
FIG. 11 is a schematic diagram of still another call scenario according to an embodiment of this application.

Based on Third call solution, the following describes a call scenario in the call solution by using an example with reference to FIG. 11.

FIG. 11 is a schematic diagram of yet another call scenario according to an embodiment of this application. As shown in FIG. 11, the scenario may include a calling terminal 111, a called terminal 112, a calling-side network 113, a called-side network 114, a VoIP server 115, a VoIP gateway 116, and an internet 117 to an internet 119.

Based on this, when the paging fails, if the called terminal has registered with the VoIP server and enabled forwarding unreachable to the VoIP client, the called-side network may generate a forwarding message based on a forwarding number, and route the forwarding message carrying a called number to the VoIP gateway, so as to forward a call request to the VoIP gateway. The VoIP gateway parses the forwarding message to obtain the called number, and then sends the called number to the VoIP server. The VoIP server addresses the called terminal device based on the called number, and then initiates a VoIP call to the called terminal device.

If the called terminal does not enable forwarding unreachable to the VoIP client but has registered with the VoIP server, in this case, the called-side network does not forward the call request to the VoIP gateway, but the calling terminal actively determines whether to initiate the VoIP call. If determining that the VoIP call can be initiated, the calling terminal initiates the VoIP call to the called terminal by using the VoIP server.

By way of example and not limitation, a process of Third call solution may include the following steps.

The calling terminal initiates a cellular call to the called terminal, and a cellular call request is transferred to the called-side network through the calling-side network. The called-side network pages the called terminal based on the cellular call request. When the paging fails, the called-side network may first query a call forwarding server to check whether the called number has been subscribed to a call forwarding service. If the called number has been subscribed to the call forwarding unreachable service, a target number corresponding to call forwarding unreachable is obtained, and a call request (or referred to as the forwarding message) to the target number is generated, where the call request to the target number carries the source called number. If the target number is a preset number (for example, 6061XXX), the called-side network routes all call requests to the target number to the VoIP gateway. The VoIP gateway parses the call request to obtain the called number, and then sends the called number to the VoIP server. The VoIP server searches for the called terminal based on the called number, and initiates the VoIP call to the found called terminal.

If the called-side network determines that the called number has not been subscribed to the call forwarding service, the operator network may return indication information to the calling terminal, where the indication information is used to notify the calling terminal that the called number has not been subscribed to the call forwarding service. The calling terminal may query a capability of a peer end, so as to determine whether the called number has been registered with the VoIP server and whether the VoIP client on the called terminal is in a service state. If the called number has been registered with the VoIP server and a specific condition is met, the calling terminal can automatically hang up the current cellular call and trigger the VoIP call.

Further, the calling terminal may further determine related information such as the signal quality status of the operation network on the called terminal side, whether the cellular call initiated by the calling terminal is received, and whether the called terminal rings; and determine whether to initiate the VoIP call based on the information.

Figure 12A:
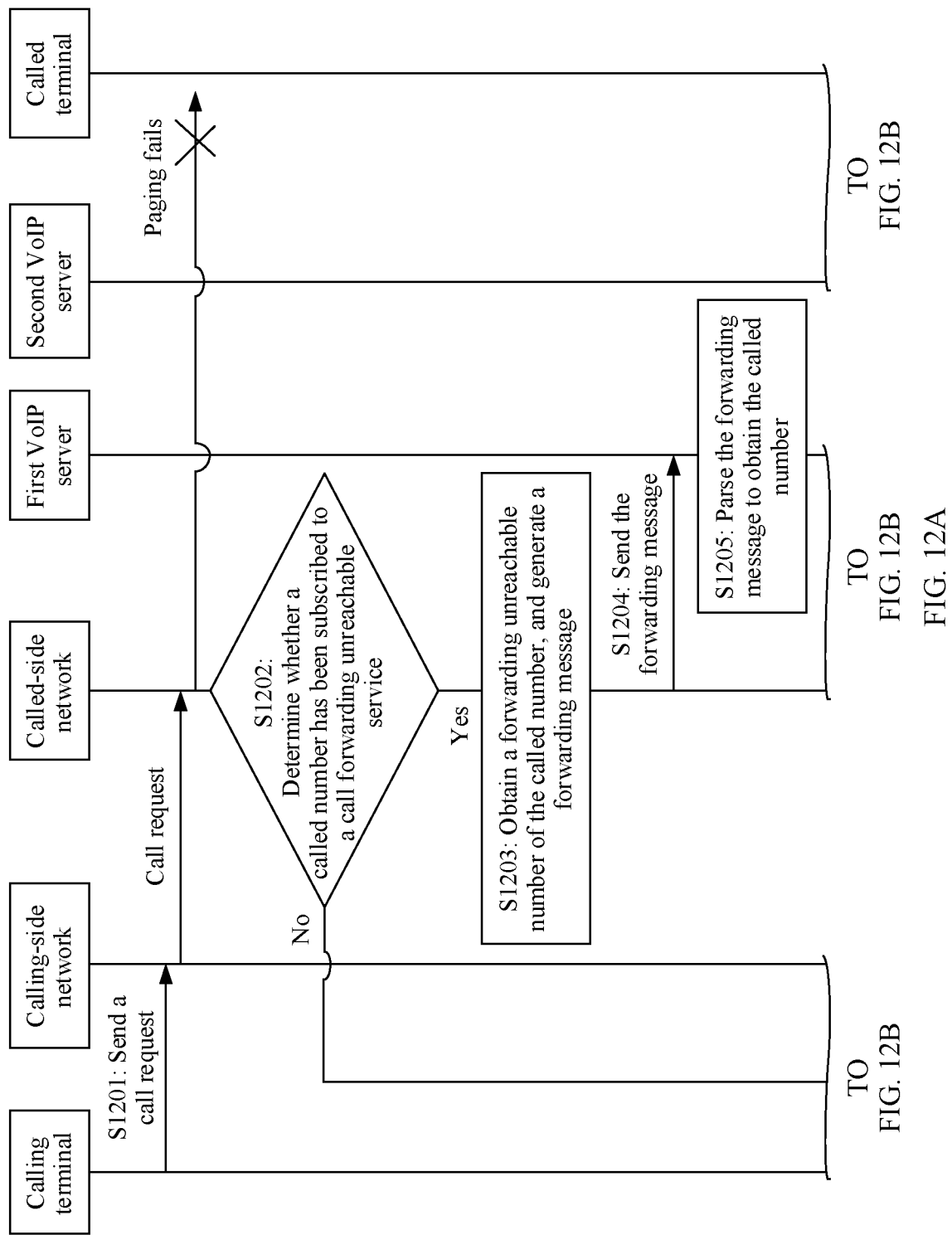
FIG. 12A and FIG. 12B are yet another schematic interaction diagram of a call method according to an embodiment of this application.
Figure 12B:
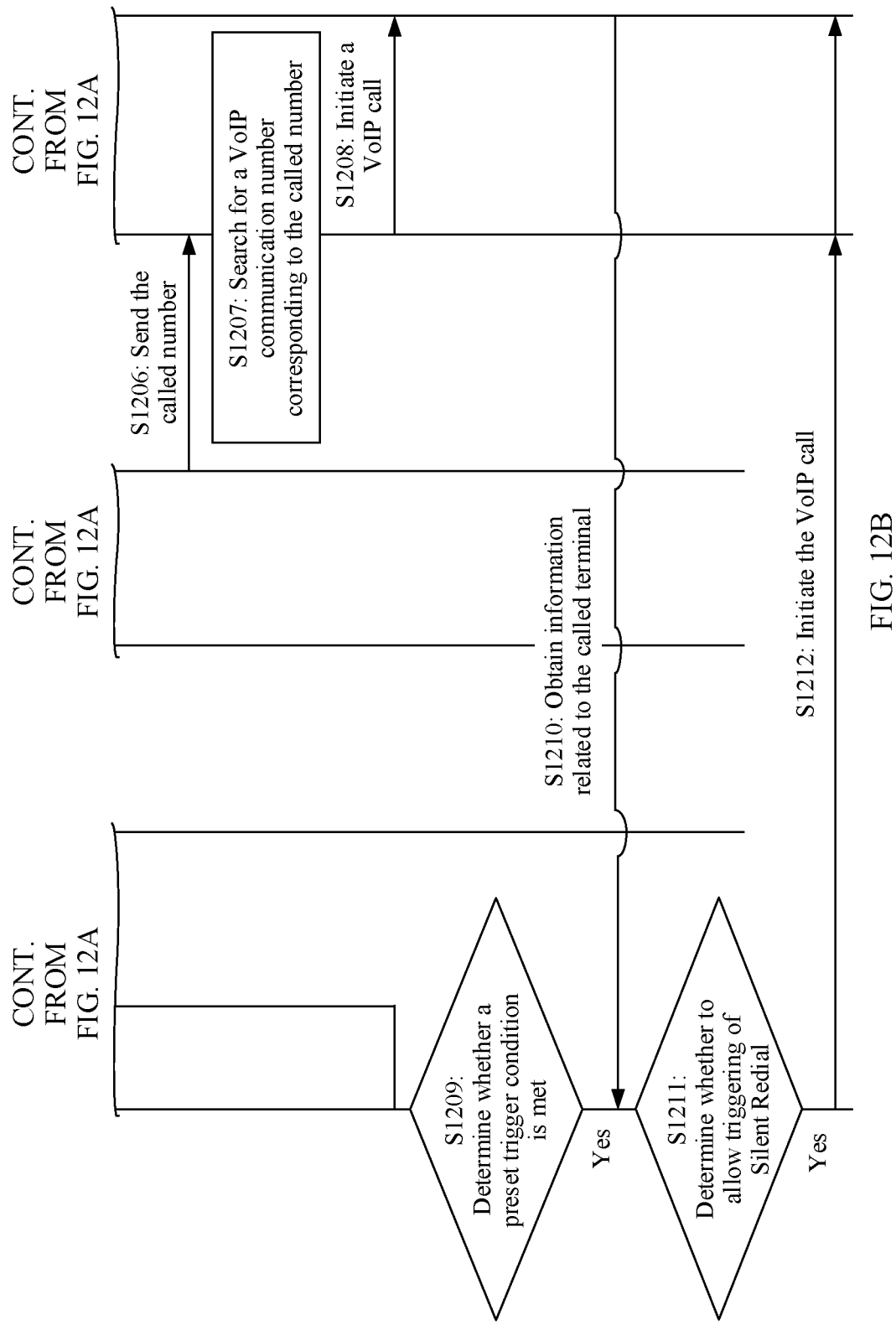

Based on the architecture of the call network and the call scenario of Third call solution, the following describes in detail a call procedure in embodiments of this application. FIG. 12A and FIG. 12B are yet another schematic interaction diagram of a call method according to an embodiment of this application. The call method may include the following steps.

Step S1201: A calling terminal sends a call request to a calling-side network.

It should be noted that, in some other embodiments, before step S1201, that is, before the calling terminal initiates a cellular call to a called terminal, the calling terminal may first determine whether to initiate the cellular call; and if determining to initiate the cellular call, enter step S1201; or if determining not to initiate the cellular call, the calling terminal may first obtain information related to the called terminal, for example, whether the called terminal has registered with a VoIP server, and whether there is a communication link between the called terminal and the VoIP server, and then the calling terminal determines, based on the information related to the called terminal, whether to initiate a VoIP call. If a specific condition is met, the calling terminal initiates the VoIP call to the called terminal.

The calling terminal may determine, based on a signal status of a calling-side cellular network and/or a signal status of a called-side cellular network, whether to initiate the cellular call to the called terminal. For a specific process, refer to corresponding content of Second call solution. Details are not described herein again.

Step S1202: When paging fails, a called-side network determines whether a called number has been subscribed to a call forwarding unreachable service. If the called number has been subscribed to the call forwarding unreachable service, step S1203 is entered, or if the called number has not been subscribed to the call forwarding unreachable service, step S1209 is entered.

It should be noted that the call forwarding service may further include but is not limited to a call forwarding no answer service, a call forwarding busy service, and a call forwarding unconditional service.

Step S1203: The called-side network obtains a forwarding unreachable number of the called number, and generates a forwarding message.

The forwarding message may be an invite message generated based on the forwarding number, and the message carries the called number.

Step S1204: The called-side network routes the forwarding message to a first VoIP server.

Step S1205: The first VoIP server parses the forwarding message to obtain the called number.

Step S1206: The first VoIP server sends the called number to a second VoIP server.

Step S1207: The second VoIP server searches for a VoIP communication number corresponding to the called number.

Step S1208: The second VoIP server initiates the VoIP call to the called terminal based on the VoIP communication number.

Step S1209: The calling terminal determines whether a preset trigger condition is met. If the preset trigger condition is met, step S1210 is entered.

In this case, the preset trigger condition may be timeout trigger and/or network disconnection trigger, or may be receiving an indication message returned by the operator network, that is, when the paging fails in the called-side network and the called number has not been subscribed to the call forwarding unreachable service, the called-side network may return the indication message to the calling terminal, where the indication message is used to indicate to perform a subsequent step, namely, step S1210.

Step S1210: The calling terminal obtains the information related to the called terminal.

Step S1211: The calling terminal determines, based on the information related to the called terminal, whether to allow triggering of Silent Redial. If triggering of Silent Redial is allowed, step S1212 is entered.

Step S1212: The calling terminal initiates the VoIP call to the called terminal.

It should be noted that for similarities between the call solution and the call solutions of the two ideas mentioned above, refer to each other.

It should be noted that Third call solution may be considered as a combination of First call solution and Second call solution.

In this case, for some called numbers that have not been subscribed to the call forwarding unreachable service but have registered with the VoIP server, when the call is unreachable in the called-side network, the called-side terminal can still receive the call request from the calling terminal, and implement interworking between the caller and callee. For a same or similar part between Third call solution and the foregoing First call solution or the foregoing Second call solution, refer to the foregoing corresponding content. Details are not described herein again.

It should be further noted that only three call solutions are listed above, and it does not mean that there are only the three call solutions in embodiments of this application. Based on the three solutions, some new call solutions can be obtained by combining the three solutions accordingly. In other words, the foregoing separately shows three possible call solutions. However, in an actual application, a solution obtained by combining the three call solutions or adding, deleting, or replacing steps also falls within the protection scope of embodiments of this application.

It should be further noted that, in the several call solutions mentioned above, the calling terminal generally accesses an operator network by using a wireless base station. However, in some other embodiments, the calling terminal may also access the operator network through VoWi-Fi. To be specific, the several call solutions provided in embodiments of this application are also applicable to a VoWi-Fi scenario. In the VoWi-Fi scenario, a processing procedure of a called-side network, a VoIP gateway, and a VoIP server is similar to that described above. Details are not described herein again.

An embodiment of this application further provides a terminal device. The terminal device may be specifically a calling terminal, a called terminal, a VoIP gateway, or a VoIP server. The calling terminal may be specifically a mobile call terminal such as a mobile phone or a tablet computer, or may be a fixed-line phone. The called terminal may be specifically a mobile call terminal such as a mobile phone or a tablet computer.

The terminal device may include a memory, a processor, and a computer program that is stored in the memory and that can run on the processor. When executing the computer program, the processor implements a corresponding method procedure.

When the terminal device is a first terminal device, the terminal device may perform a related method procedure on a first terminal device side. When the terminal device is a second terminal device, the terminal device may perform a related method procedure on a second terminal device side. When the terminal device is the VoIP server, the terminal device may execute a related method procedure on a VoIP server side.

Figure 13:
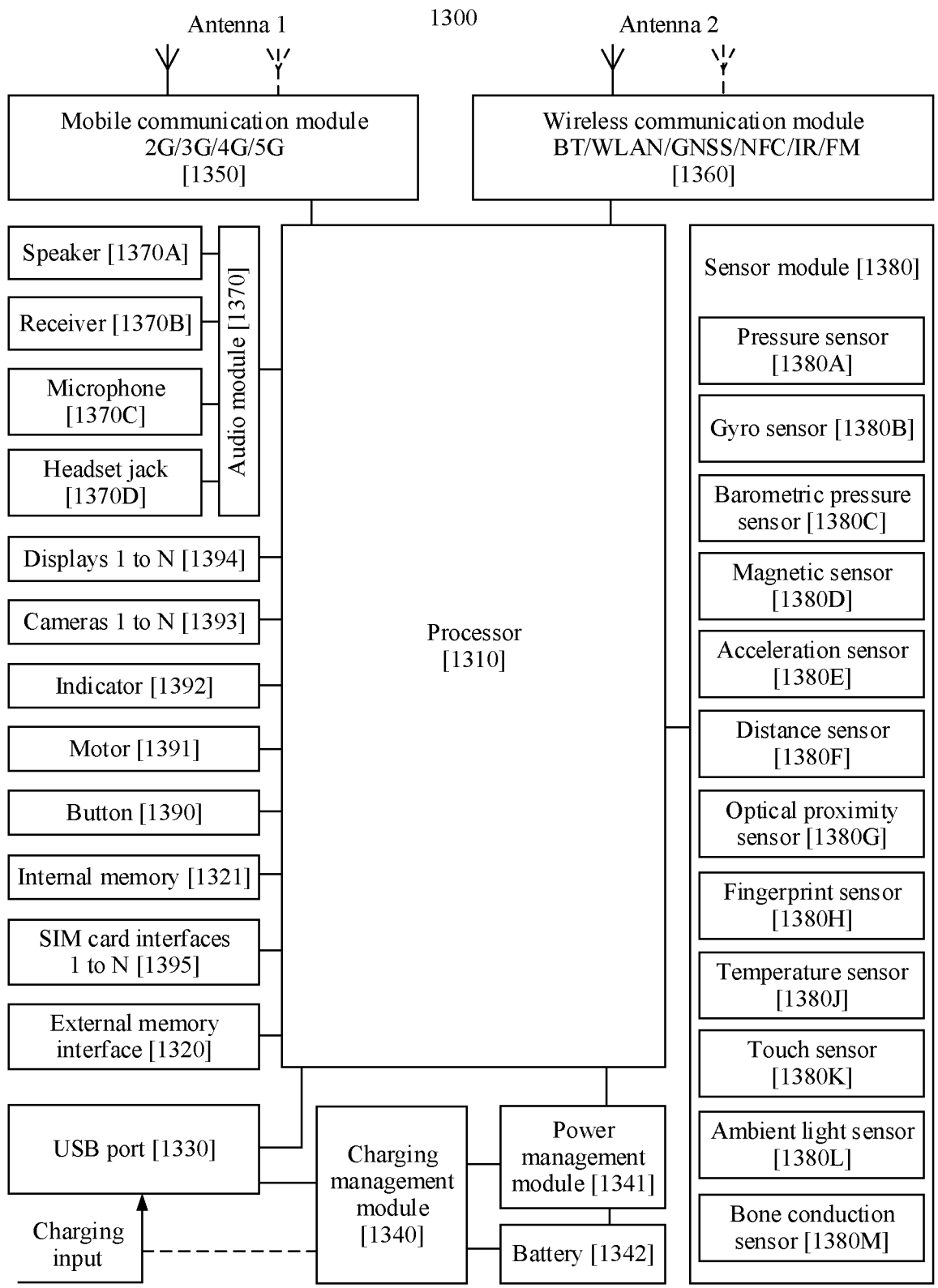
FIG. 13 is a schematic diagram of a structure of an electronic device 1300 according to an embodiment of this application.

By way of example and not limitation, as shown in FIG. 13, an electronic device 1300 may include a processor 1310, an external memory interface 1320, an internal memory 1321, a universal serial bus (universal serial bus, USB) port 1330, a charging management module 1340, a power management module 1341, a battery 1342, an antenna 1, an antenna 2, a mobile communication module 1350, a wireless communication module 1360, an audio module 1370, a speaker 1370A, a receiver 1370B, a microphone 1370C, a headset jack 1370D, a sensor module 1380, a button 1390, a motor 1391, an indicator 1392, a camera 1393, a display 1394, a subscriber identity module (subscriber identification module, SIM) card interface 1395, and the like. The sensor module 1380 may include a pressure sensor 1380A, a gyro sensor 1380B, a barometric pressure sensor 1380C, a magnetic sensor 1380D, an acceleration sensor 1380E, a distance sensor 1380F, an optical proximity sensor 1380G, a fingerprint sensor 1380H, a temperature sensor 1380J, a touch sensor 1380K, an ambient light sensor 1380L, a bone conduction sensor 1380M, and the like.

It may be understood that a structure shown in this embodiment of this application constitutes no specific limitation on the electronic device 1300. In some other embodiments of this application, the electronic device 1300 may include more or fewer components than those shown in the figure, some components may be combined, or some components may be split, or there may be a different component layout. The components shown in the figure may be implemented by hardware, software, or a combination of software and hardware.

The processor 1310 may include one or more processing units. For example, the processor 1310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 1300. The controller may generate an operation control signal based on an instruction operation code and a time sequence signal, to complete control of instruction fetching and instruction execution.

A memory may be disposed in the processor 1310, and is configured to store instructions and data. In some embodiments, the memory in the processor 1310 is a cache. The memory may store instructions or data just used or cyclically used by the processor 1310. If the processor 1310 needs to use the instructions or the data again, the processor may directly invoke the instructions or the data from the memory. This avoids repeated access and reduces waiting time of the processor 113, thereby improving system efficiency.

In some embodiments, the processor 1310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronous serial bus, including a serial data line (serial data line, SDA) and a serial clock line (serial clock line, SCL). In some embodiments, the processor 1310 may include a plurality of groups of I2C buses. The processor 1310 may be separately coupled to the touch sensor 1380K, a charger, a flash, the camera 1393, and the like through different I2C bus interfaces. For example, the processor 1310 may be coupled to the touch sensor 1380K through the I2C interface, so that the processor 1310 communicates with the touch sensor 1380K through the I2C bus interface, to implement a touch function of the electronic device 1300.

The I2S interface may be configured to perform audio communication. In some embodiments, the processor 1310 may include a plurality of groups of I2S buses. The processor 1310 may be coupled to the audio module 1370 through the I2S bus, to implement communication between the processor 1310 and the audio module 1370.

The PCM interface may also be configured to perform audio communication, and sample, quantize, and code an analog signal. In some embodiments, the audio module 1370 may be coupled to the wireless communication module 1360 through a PCM bus interface. Both the I2S interface and the PCM interface may be used for audio communication.

The UART interface is a universal serial data line, and is configured to perform asynchronous communication. The bus may be a two-way communication bus. The bus converts to-be-transmitted data between serial communication and parallel communication. In some embodiments, the UART interface is usually configured to connect the processor 1310 to the wireless communication module 1360. For example, the processor 1310 communicates with a Bluetooth module in the wireless communication module 1360 through the UART interface, to implement a Bluetooth function.

The MIPI interface may be configured to connect the processor 1310 to peripheral devices such as the display 1394 and the camera 1393. The MIPI interface includes a camera serial interface (camera serial interface, CSI), a display serial interface (display serial interface, DSI), and the like. In some embodiments, the processor 1310 communicates with the camera 1393 through the CSI interface, to implement a photographing function of the electronic device 1300. The processor 1310 communicates with the display 1394 through the DSI interface, to implement a display function of the electronic device 1300.

The GPIO interface may be configured by software. The GPIO interface may be configured as a control signal or a data signal. In some embodiments, the GPIO interface may be configured to connect the processor 1310 to the camera 1393, the display 1394, the wireless communication module 1360, the audio module 1370, the sensor module 1380, and the like. The GPIO interface may alternatively be configured as an I2C interface, an I2S interface, a UART interface, a MIPI interface, or the like.

The USB port 1330 is a port that conforms to a USB standard specification, and may be specifically a mini USB port, a micro USB port, a USB Type-C port, or the like. The USB port 1330 may be configured to connect to a charger to charge the electronic device 1300, or may be configured to transmit data between the electronic device 1300 and a peripheral device, or may be configured to connect to a headset for playing audio through the headset. The port may be configured to connect to another electronic device such as an AR device.

It may be understood that an interface connection relationship between the modules illustrated in this embodiment of this application is merely an example for description, and constitutes no limitation on the structure of the electronic device 1300. In some other embodiments of this application, the electronic device 1300 may alternatively use an interface connection manner different from that in the foregoing embodiment, or use a combination of a plurality of interface connection manners.

The charging management module 1340 is configured to receive charging input from a charger. The charger may be a wireless charger or a wired charger. In some embodiments of wired charging, the charging management module 1340 may receive charging input from the wired charger through the USB port 1330. In some embodiments of wireless charging, the charging management module 140 may receive wireless charging input through a wireless charging coil of the electronic device 1300. When charging the battery 1342, the charging management module 1340 may further supply power to the electronic device by using the power management module 1341.

The power management module 1341 is configured to connect to the battery 1342, the charging management module 1340, and the processor 1310. The power management module 1341 receives input from the battery 1342 and/or the charging management module 1340, and supplies power to the processor 1310, the internal memory 1321, an external memory, the display 1394, the camera 1393, the wireless communication module 1360, and the like. The power management module 1341 may be configured to monitor parameters such as a battery capacity, a battery cycle count, and a battery health status (electric leakage or impedance). In some other embodiments, the power management module 1341 may alternatively be disposed in the processor 1310. In some other embodiments, the power management module 1341 and the charging management module 1340 may alternatively be disposed in a same device.

A wireless communication function of the electronic device 1300 may be implemented by using the antenna 1, the antenna 2, the mobile communication module 1350, the wireless communication module 1360, the modem processor, the baseband processor, and the like.

The antenna 1 and the antenna 2 are configured to receive and transmit electromagnetic wave signals. Each antenna in the electronic device 1300 may be configured to cover one or more communication frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The mobile communication module 1350 may provide a solution that is applied to the electronic device 1300 and that includes wireless communication such as 2G, 3G, 4G, and 5G. The mobile communication module 1350 may include at least one filter, a switch, a power amplifier, a low noise amplifier (low noise amplifier, LNA), and the like. The mobile communication module 1350 may receive an electromagnetic wave through the antenna 1, perform processing such as filtering or amplification on the received electromagnetic wave, and transmit a processed electromagnetic wave to the modem processor for demodulation. The mobile communication module 1350 may further amplify a signal modulated by the modem processor, and convert the signal into an electromagnetic wave for radiation through the antenna 1. In some embodiments, at least some function modules of the mobile communication module 1350 may be disposed in the processor 1310. In some embodiments, at least some function modules of the mobile communication module 1350 and at least some modules of the processor 1310 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 1370A, the receiver 1370B, or the like), or displays an image or a video on the display 1394. In some embodiments, the modem processor may be an independent component. In some other embodiments, the modem processor may be independent of the processor 1310, and is disposed in a same device as the mobile communication module 1350 or another function module.

The wireless communication module 1360 may provide a solution that is applied to the electronic device 1300 and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communication module 1360 may be one or more components integrated into at least one communication processing module. The wireless communication module 1360 receives an electromagnetic wave through the antenna 2, performs frequency modulation and filtering processing on an electromagnetic wave signal, and sends a processed signal to the processor 113. The wireless communication module 1360 may further receive a to-be-sent signal from the processor 1310, perform frequency modulation and amplification on the signal, and convert the signal into an electromagnetic wave for radiation through the antenna 2.

In some embodiments, in the electronic device 1300, the antenna 1 and the mobile communication module 1350 are coupled, and the antenna 2 and the wireless communication module 1360 are coupled, so that the electronic device 1300 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 1300 implements a display function by using the GPU, the display 1394, the application processor, and the like. The GPU is a microprocessor for image processing, and connects the display 1394 to the application processor. The GPU is configured to perform mathematical and geometric calculation, and render an image. The processor 1310 may include one or more GPUs that execute program instructions to generate or change display information.

The display 1394 is configured to display an image, a video, and the like. The display 1394 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 1300 may include one or N displays 1394, where N is a positive integer greater than 1.

The electronic device 1300 may implement a photographing function by using the ISP, the camera 1393, the video codec, the GPU, the display 1394, the application processor, and the like.

The ISP is configured to process data fed back by the camera 1393. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 1393.

The camera 1393 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 1300 may include one or N cameras 1393, where N is a positive integer greater than 1.

The digital signal processor is configured to process a digital signal, and may process another digital signal in addition to the digital image signal. For example, when the electronic device 1300 selects a frequency, the digital signal processor is configured to perform Fourier transform and the like on frequency energy.

The video codec is configured to compress or decompress a digital video. The electronic device 1300 may support one or more video codecs. In this way, the electronic device 1300 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 1300, for example, image recognition, facial recognition, speech recognition, and text understanding, can be implemented by using the NPU.

The external memory interface 1320 may be configured to connect to an external memory card, for example, a micro SD card, to extend a storage capability of the electronic device 1300. The external memory card communicates with the processor 1310 through the external memory interface 1320, to implement a data storage function. For example, files such as music and videos are stored in the external storage card.

The internal memory 1321 may be configured to store computer-executable program code. The executable program code includes instructions. The processor 1310 performs various function applications of the electronic device 1300 and data processing by running the instructions stored in the internal memory 1321. The internal memory 1321 may include a program storage area and a data storage area. The program storage area may store an operating system, an application required by at least one function (for example, a sound playing function or an image playing function), and the like. The data storage area may store data (for example, audio data or a phone book) created in a process of using the electronic device 1300, and the like. In addition, the internal memory 1321 may include a high speed random access memory, or may include a non-volatile memory, for example, at least one magnetic disk storage device, a flash memory, or a universal flash storage (universal flash storage, UFS).

The electronic device 1300 may implement an audio function, for example, playing music and recording, by using the audio module 1370, the speaker 1370A, the receiver 1370B, the microphone 1370C, the headset jack 1370D, the application processor, or the like.

The audio module 1370 is configured to convert digital audio information into an analog audio signal for output, and is also configured to convert analog audio input into a digital audio signal. The audio module 1370 may be configured to: code and decode audio signals. In some embodiments, the audio module 1370 may be disposed in the processor 1310, or some function modules in the audio module 1370 are disposed in the processor 1310.

The speaker 1370A, also referred to as a "loudspeaker", is configured to convert an audio electrical signal into a sound signal. The electronic device 130 may be used to listen to music or answer a call in a hands-free mode by using the speaker 1370A.

The receiver 1370B, also referred to as an "earpiece", is configured to convert an audio electrical signal into a sound signal. When a call is answered or audio information is listened to by using the electronic device 130, the receiver 1370B may be put close to a human ear to listen to a voice.

The microphone 1370C, also referred to as a "mike" or a "mic", is configured to convert a sound signal into an electrical signal. When making a call or sending voice information, a user may make a sound by moving a human mouth close to the microphone 1370C to input a sound signal to the microphone 1370C. At least one microphone 1370C may be disposed in the electronic device 1300. In some other embodiments, two microphones 1370C may be disposed in the electronic device 1300, to collect a sound signal and implement a noise reduction function. In some other embodiments, three, four, or more microphones 1370C may alternatively be disposed in the electronic device 1300, to collect a sound signal, implement noise reduction, recognize a sound source, implement a directional recording function, and the like.

The headset jack 1370D is configured to be connected to a wired headset. The headset jack 1370D may be a USB port 1330, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 1380A is configured to sense a pressure signal, and may convert the pressure signal into an electrical signal. In some embodiments, the pressure sensor 1380A may be disposed on the display 1394. There are many types of pressure sensors 1380A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 1300 determines pressure strength based on the change in the capacitance. When a touch operation is performed on the display 1394, the electronic device 1300 detects strength of the touch operation by using the pressure sensor 1380A. The electronic device 1300 may also calculate a touch position based on a detection signal of the pressure sensor 1380A. In some embodiments, touch operations that are performed in a same touch position but have different touch operation strength may correspond to different operation instructions. For example, when a touch operation whose touch operation strength is less than a first pressure threshold is performed on an SMS message application icon, an instruction for viewing an SMS message is executed. When a touch operation whose touch operation strength is greater than or equal to a first pressure threshold is performed on an SMS message application icon, an instruction for creating an SMS message is executed.

The gyro sensor 1380B may be configured to determine a motion posture of the electronic device 1300. In some embodiments, angular velocities of the electronic device 1300 around three axes (namely, axes x, y, and z) may be determined by using the gyro sensor 1380B. The gyro sensor 1380B may be configured to perform image stabilization during photographing. For example, when the shutter is pressed, the gyro sensor 180B detects an angle at which the electronic device 1300 jitters, calculates, based on the angle, a distance for which a lens module needs to compensate, and allows the lens to cancel the jitter of the electronic device 1300 through reverse motion, to implement image stabilization. The gyro sensor 1380B may be used in navigation and motion sensing game scenarios.

The barometric pressure sensor 1380C is configured to measure barometric pressure. In some embodiments, the electronic device 1300 calculates an altitude based on a value of the barometric pressure measured by the barometric pressure sensor 180C, to assist in positioning and navigation.

The magnetic sensor 1380D includes a Hall sensor. The electronic device 1300 may detect opening or closing of a flip cover by using the magnetic sensor 1380D. In some embodiments, when the electronic device 1300 is a flip phone, the electronic device 1300 may detect opening or closing of a flip cover by using the magnetic sensor 1380D. Further, a feature such as automatic unlocking of the flip cover is set based on a detected opening or closing state of the leather case or a detected opening or closing state of the flip cover.

The acceleration sensor 1380E may detect magnitude of accelerations in various directions (generally on three axes) of the electronic device 1300, and may detect magnitude and a direction of gravity when the electronic device 1300 is still. The acceleration sensor 1380E may be configured to identify a posture of the electronic device, and is used in an application such as switching between a landscape mode and a portrait mode or a pedometer.

The distance sensor 1380F is configured to measure a distance. The electronic device 1300 may measure a distance in an infrared manner or a laser manner. In some embodiments, in a photographing scenario, the electronic device 130 may measure a distance by using the distance sensor 1380F, to implement quick focusing.

The optical proximity sensor 1380G may include, for example, a light-emitting diode (LED) and an optical detector, for example, a photodiode. The light emitting diode may be an infrared light emitting diode. The electronic device 1300 emits infrared light by using the light-emitting diode. The electronic device 1300 detects infrared reflected light from a nearby object by using the photodiode. When sufficient reflected light is detected, it may be determined that there is an object near the electronic device 1300. When insufficient reflected light is detected, the electronic device 1300 may determine that there is no object near the electronic device 1300. The electronic device 1300 may detect, by using the optical proximity sensor 1380G, that a user holds the electronic device 1300 close to an ear for a call, to automatically turn off a screen for power saving. The optical proximity sensor 1380G may also be used in a flip cover mode or a pocket mode to automatically unlock or lock the screen.

The ambient light sensor 1380L is configured to sense ambient light brightness. The electronic device 1300 may adaptively adjust brightness of the display 1394 based on the sensed ambient light brightness. The ambient light sensor 1380L may also be configured to automatically adjust white balance during photographing. The ambient light sensor 1380L may also cooperate with the optical proximity sensor 1380G to detect whether the electronic device 1300 is in a pocket, to avoid an accidental touch.

The fingerprint sensor 1380H is configured to collect a fingerprint. The electronic device 1300 may use a feature of the collected fingerprint to implement fingerprint-based unlocking, application lock access, fingerprint-based image shooting, fingerprint-based call answering, and the like.

The temperature sensor 1380J is configured to detect a temperature. In some embodiments, the electronic device 1300 executes a temperature processing policy based on the temperature detected by the temperature sensor 1380J. For example, when the temperature reported by the temperature sensor 1380J exceeds a threshold, the electronic device 1300 lowers performance of a processor nearby the temperature sensor 1380J, to reduce power consumption for thermal protection. In some other embodiments, when the temperature is less than another threshold, the electronic device 1300 heats the battery 1342 to prevent the electronic device 1300 from being shut down abnormally due to a low temperature. In some other embodiments, when the temperature is less than still another threshold, the electronic device 1300 boosts an output voltage of the battery 1342, to avoid abnormal shutdown due to a low temperature.

The touch sensor 1380K is also referred to as a "touch panel". The touch sensor 1380K may be disposed on the display 1394, and the touch sensor 1380K and the display 1394 form a touchscreen, which is also referred to as a "touch screen". The touch sensor 1380K is configured to detect a touch operation performed on or near the touch sensor 1380K. The touch sensor may transfer the detected touch operation to the application processor, to determine a type of a touch event. Visual output related to the touch operation may be provided by using the display 1394. In some other embodiments, the touch sensor 1380K may alternatively be disposed on a surface of the electronic device 1300 at a position different from that of the display 1394.

The bone conduction sensor 1380M may obtain a vibration signal. In some embodiments, the bone conduction sensor 1380M may obtain a vibration signal of a vibration bone of a human vocal part. The bone conduction sensor 1380M may also be in contact with a human pulse, and receive a blood pressure beating signal. In some embodiments, the bone conduction sensor 1380M may alternatively be disposed in a headset to form a bone conduction headset. The audio module 1370 may obtain a voice signal through parsing based on the vibration signal that is of the vibration bone of the vocal-cord part and that is obtained by the bone conduction sensor 1380M, to implement a voice function. The application processor may parse heart rate information based on the blood pressure beating signal obtained by the bone conduction sensor 1380M, to implement a heart rate detection function.

The button 1390 includes a power button, a volume button, and the like. The button 1390 may be a mechanical button, or may be a touch button. The electronic device 1300 may receive button input, and generate button signal input related to user setting and function control of the electronic device 1300.

The motor 1391 may generate a vibration prompt. The motor 1391 may be used for an incoming call vibration prompt, or may be used for a touch vibration feedback. For example, touch operations performed on different applications (for example, photographing and audio playing) may correspond to different vibration feedback effects. The motor 1391 may also correspond to different vibration feedback effects for touch operations performed on different areas of the display 1394. Different application scenarios (for example, a time reminder, information receiving, an alarm clock, and a game) may also correspond to different vibration feedback effects. A touch vibration feedback effect may be customized.

The indicator 1392 may be an indicator light, and may be configured to indicate a charging status and a power change, or may be configured to indicate a message, a missed call, a notification, and the like.

The SIM card interface 1395 is configured to connect to a SIM card. The SIM card may be inserted into the SIM card interface 1395 or removed from the SIM card interface 1395, to implement contact with or separation from the electronic device 1300. The electronic device 1300 may support one or N SIM card interfaces, where N is a positive integer greater than 1. The SIM card interface 1395 may support a nano-SIM card, a micro-SIM card, a SIM card, and the like. A plurality of cards may be inserted into a same SIM card interface 1395 at the same time. The plurality of cards may be of a same type or different types. The SIM card interface 1395 may also be compatible with different types of SIM cards. The SIM card interface 1395 may also be compatible with the external memory card. The electronic device 1300 interacts with a network through the SIM card, to implement functions such as conversation and data communication. In some embodiments, the electronic device 1300 uses an eSIM, namely, an embedded SIM card. The eSIM card may be embedded into the electronic device 1300, and cannot be separated from the electronic device 1300.

A software system of the electronic device 1300 may use a layered architecture, an event-driven architecture, a microkernel architecture, a micro service architecture, or a cloud architecture. In embodiments of the present invention, an Android system with a layered architecture is used as an example to describe a software structure of the electronic device 1300.

Figure 14:
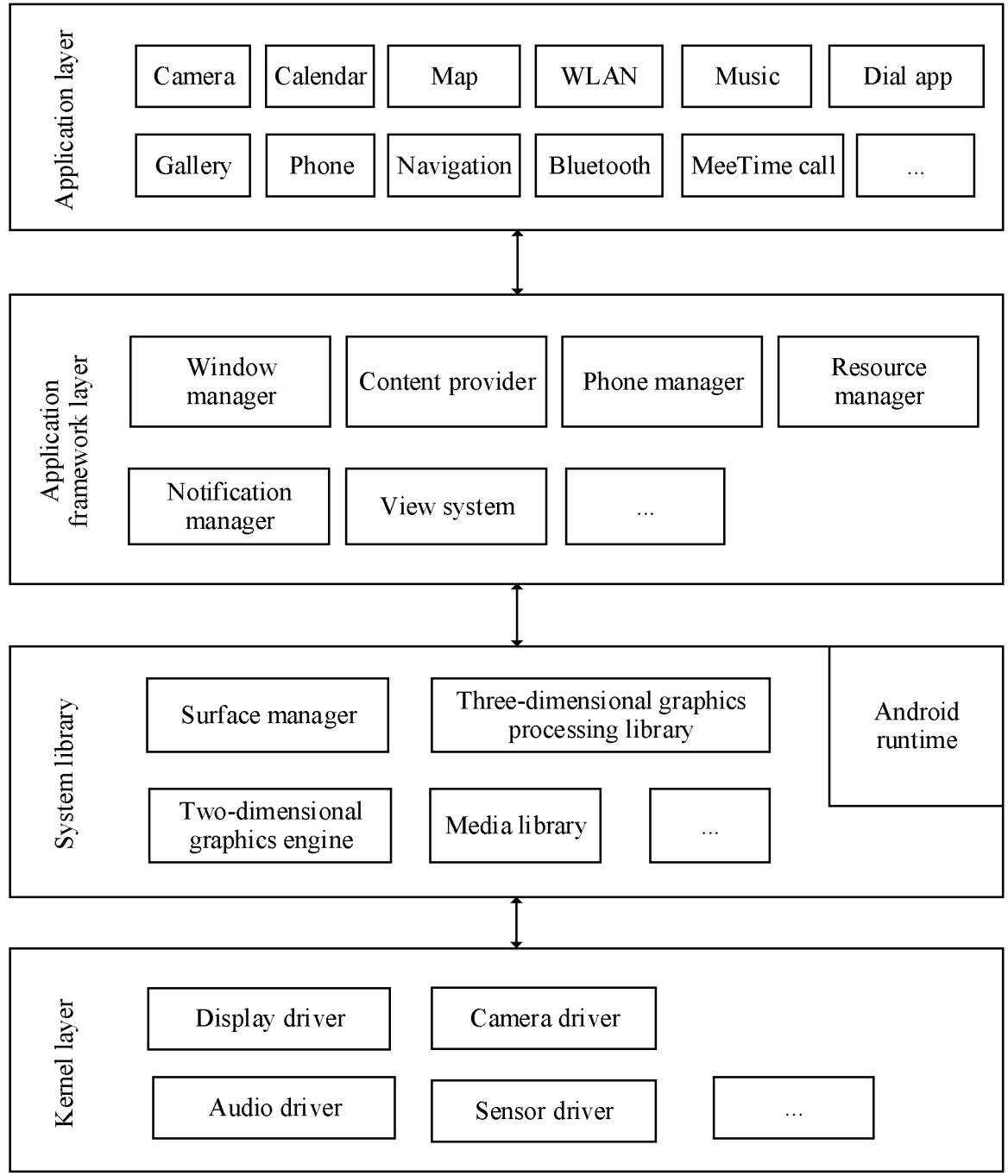
FIG. 14 is a schematic diagram of a software structure of an electronic device 1300 according to an embodiment of this application.

FIG. 14 is a block diagram of a software structure of the electronic device 1300 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 14, the application packages may include applications such as Camera, Gallery, Calendar, Phone, Map, Navigation, WLAN, Bluetooth, Music, Dial app, and MeeTime call.

The application framework layer provides an application programming interface (application programming interface, API) and a programming framework for an application at an application layer. The application framework layer includes some predefined functions.

As shown in FIG. 14, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, perform screen capture, and the like.

The content provider is used to store and obtain data, and enable the data to be accessed by an application. The data may include a video, an image, audio, calls that are made and received, a browsing history and a bookmark, a phone book, and the like.

The view system includes a visual control, for example, a control for displaying a text or a control for displaying an image. The view system may be used to construct an application. A display interface may include one or more views. For example, a display interface including an SMS message notification icon may include a text display view and an image display view.

The phone manager is used to provide a communication function of the electronic device 1300, for example, management of call statuses (including answering, declining, and the like).

The resource manager provides various resources such as a localized character string, an icon, a picture, a layout file, and a video file for an application.

The notification manager enables an application to display notification information in a status bar, and may be configured to convey a notification type message. The displayed notification information may automatically disappear after a short pause without user interaction. For example, the notification manager is configured to notify download completion, give a message notification, and the like. The notification manager may be alternatively a notification that appears in a top status bar of the system in a form of a graph or a scroll bar text, for example, a notification of an application running on the background or a notification that appears on a screen in a form of a dialog window. For example, text information is prompted in the status bar, an alert sound is played, the electronic device vibrates, or an indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playback and recording in a plurality of commonly used audio and video formats, and static image files. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the electronic device 1300 with reference to a call scenario.

When a Dial app on a calling terminal initiates a cellular call, the Dial app sends corresponding data to the mobile communication module 1050. The mobile communication module 1350 generates an invite message by using a modulator, and converts the invite message into an electromagnetic wave through the antenna 1 for radiation. The invite message is transferred to an operator network through a wireless base station, and then the operator network transfers the invite message to a called terminal. The called terminal receives the electromagnetic wave through the antenna 1, demodulates the electromagnetic wave by using a demodulator, to obtain the corresponding call data, and a phone manager of the called terminal notifies a Dial app to answer the call.

An embodiment of this application further provides a computer-readable storage medium. The computer-readable storage medium stores computer programs (which may also be referred to as instructions or codes), and when the computer programs are run, steps in the foregoing method embodiments are implemented.

An embodiment of this application provides a computer program product. The computer program product includes computer programs (which may also be referred to as instructions or codes), and when the computer programs are run on an electronic device, the electronic device is enabled to implement steps in the foregoing method embodiments.

An embodiment of this application further provides a chip system. The chip system includes a processor, the processor is coupled to a memory, and the processor executes computer programs stored in the memory, to implement steps in the foregoing method embodiments.

Optionally, the chip system may be a single chip or a chip module including a plurality of chips. Optionally, the chip system may further include a memory, and the memory is connected to the processor through a circuit or a wire. Optionally, the chip further includes a communication interface.

In the foregoing embodiments, descriptions of all embodiments have respective focuses. For a part that is not described in detail or recorded in an embodiment, refer to related descriptions in other embodiments.

It should be understood that sequence numbers of the steps do not mean execution sequences in the foregoing embodiments. The execution sequences of the processes should be determined based on functions and internal logic of the processes, and should not constitute any limitation on the implementation processes of embodiments of this application.

In addition, in the descriptions of the specification and claims of this application, the terms "first", "second", "third", and the like are merely intended for the purpose of differentiated description, but shall not be understood as an indication or an implication of relative importance. Referring to "an embodiment", "some embodiments", or the like in the specification of this application indicates that one or more embodiments of this application include a specific feature, structure, or characteristic described with reference to embodiments. Therefore, in this specification, statements "in an embodiment", "in some embodiments", "in some other embodiments", "in other embodiments", and the like that appear at different places do not necessarily mean referring to a same embodiment, instead, the statements mean referring to "one or more but not all of embodiments", unless otherwise specifically emphasized in other ways.

In conclusion, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A call method, applied to a first terminal device, wherein the first terminal device is installed with a first application serving as a VoIP client, and the method comprises:

detecting, by the first terminal device, a first operation;

sending, by the first terminal device, a first call request to a network device in response to the first operation, wherein the first call request is a call request initiated to a target number;

determining, by the first terminal device, that a target condition is met, the target condition comprising a failure to establish an initial call connection; and in response to the determining, hanging up, by the first terminal device, a call corresponding to the first call request to end the call, and sending a second call request to a VoIP server using the first application to start a separate call, wherein the second call request is a VoIP call request to the target number, and the second call request indicates the VoIP server to initiate a VoIP call to a second terminal device associated with the target number.

2. The method according to claim 1, wherein after the detecting the first operation, the method further comprises:

displaying, by the first terminal device, a first interface in response to the first operation, wherein the first interface comprises the target number and a first button, and the first button can be used to hang up a call.

3. The method according to claim 2, wherein after the determining that the target condition is met, the method further comprises:

displaying, by the first terminal device, first prompt information in the first interface, wherein the first prompt information provides an option to switch to a VoIP call;

detecting, by the first terminal device, a second operation, wherein the second operation indicates the first terminal device to switch to the VoIP call; and in response to the second operation, triggering, by the first terminal device, the step of hanging up the call corresponding to the first call request, and sending the second call request to the VoIP server using the first application.

4. The method according to claim 2, wherein after the hanging up the call corresponding to the first call request, and sending the second call request to the VoIP server using the first application, the method further comprises:

displaying, by the first terminal device, second prompt information in the first interface, wherein the second prompt information indicates that the first terminal device has switched to the VoIP call.

5. The method according to claim 1, wherein determining that the target condition is met comprises:

determining, by the first terminal device, that a first preset condition is met;

in response to the first preset condition being met, obtaining, by the first terminal device, related information associated with the target number;

determining, by the first terminal device, based on the related information, that a second preset condition is met; and in response to the second preset condition being met, determining, by the first terminal device, that the target condition is met.

6. The method according to claim 5, wherein the determining that the first preset condition is met comprises:

when a first message returned by the network device is received, determining that the first preset condition is met, wherein the first message indicates that an attempt to page the target number fails; or when time detected by a timer exceeds a preset time threshold, determining that the first preset condition is met, wherein the timer is configured to detect time from call initiation to ringing.

7. The method according to claim 5, wherein the obtaining related information associated with the target number comprises:

sending a query request to the VoIP server using the first application, wherein the query request carries the target number; and receiving, from the VoIP server, the related information associated with the target number.

8. The method according to claim 5, wherein the related information comprises first information, second information, third information, and fourth information, the first information describes whether the target number is stored on the VoIP server, the second information describes whether a second application is in an online state, the third information describes a signal status of an operator network of the second terminal, and the fourth information describes whether the target number has been subscribed to a call forwarding service; and the determining, based on the related information, that the second preset condition is met comprises:

when the target number is stored on the VoIP server, the second application is in the online state, a signal of the operator network of the second terminal is in an out-of-service state, and the target number has not been subscribed to the call forwarding service, determining that the second preset condition is met, wherein the second terminal device is installed with the second application serving as a VoIP client.

9. The method according to claim 1, wherein after the detecting the first operation, the method further comprises:

displaying, by the first terminal device, a second interface, wherein the second interface comprises third prompt information prompting a user to select between one or more call options including a cellular call option and a VoIP call option; and when detecting an operation on the cellular call option, entering, by the first terminal device, the step of sending the first call request to a network device in response to the first operation; or when detecting an operation on the VoIP call option, sending, by the first terminal device, a third call request to the VoIP server using the first application, wherein the third call request is a VoIP call request to the target number, and the third call request indicates the VoIP server to initiate a VoIP call to the second terminal device associated with the target number.

10. A terminal device, comprising a memory, a processor, a first application capable of serving as a VoIP client, and a computer program that is stored in the memory and that can be run on the processor, wherein when executing the computer program, the program enables the processor to:
- detect a first operation;
- send a first call request to a network device in response to the first operation, wherein the first call request is a call request initiated to a target number;
- determine that a target condition is me, the target condition comprising a failure to establish an initial call connection t; and
- in response to the determining, hang up a call corresponding to the first call request to end the call, and send a second call request to a VoIP server using the first application to start a separate call, wherein the second call request is a VoIP call request to the target number, and the second call request indicates the VoIP server to initiate a VoIP call to a second terminal device associated with the target number.

11. The terminal device according to claim 10, wherein when executing the computer program, the program enables the processor further to:
- display a first interface in response to the first operation, wherein the first interface comprises the target number and a first button, and the first button can be used to hang up a call.

12. The terminal device according to claim 11, wherein after the determining that the target condition is met, when executing the computer program, the program enables the processor further to:
- display first prompt information in the first interface, wherein the first prompt information provides an option to switch to a VoIP call;
- detect a second operation, wherein the second operation indicates the first terminal device to switch to the VoIP call; and
- in response to the second operation, trigger the step of hanging up the call corresponding to the first call request, and send the second call request to the VoIP server using the first application.

13. The terminal device according to claim 11, wherein after the hanging up the call corresponding to the first call request, and sending the second call request to a VoIP server using the first application, when executing the computer program, the program enables the processor further to:
- display second prompt information in the first interface, wherein the second prompt information indicates that the first terminal device has switched to the VoIP call.

14. The terminal device according to claim 10, wherein the determining that the target condition is met comprises:
- determining that a first preset condition is met;
- in response to the first preset condition being met, obtaining related information associated with the target number;
- determining, based on the related information, that a second preset condition is met; and
- in response to the second preset condition being met, determining that the target condition is met.

15. The terminal device according to claim 14, wherein the determine that a first preset condition is met comprises:
- when a first message returned by the network device is received, determining that the first preset condition is met, wherein the first message indicates that an attempt to page the target number fails; or when time detected by a timer exceeds a preset time threshold, determining that the first preset condition is met, wherein the timer is configured to detect time from call initiation to ringing.

16. The terminal device according to claim 14, wherein the obtaining related information associated with the target number comprises:
- sending a query request to the VoIP server using the first application, wherein the query request carries the target number; and
- receiving, from the VoIP server, the related information associated with the target number.

* * * * *